(12) United States Patent
Park et al.

(10) Patent No.: US 10,685,624 B2
(45) Date of Patent: Jun. 16, 2020

(54) ELECTRONIC APPARATUS AND METHOD FOR OUTPUTTING CONTENT

(71) Applicant: Samsung Electronics Co., Ltd., Suwon-si (KR)

(72) Inventors: Jong Won Park, Suwon-si (KR); Andrew Chang, San Jose, CA (US); Chang Won Ryu, Suwon-si (KR); Sung Su Park, Seoul (KR); Soo Hyun Jho, Yongin-si (KR); Yoon Lee, Seoul (KR); Sun Young Kim, Seoul (KR); Yong Joo Park, Seoul (KR); Young Hoon Eom, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 15/591,285

(22) Filed: May 10, 2017

(65) Prior Publication Data

US 2017/0243563 A1    Aug. 24, 2017

Related U.S. Application Data

(63) Continuation of application No. 14/478,341, filed on Sep. 5, 2014, now Pat. No. 9,691,358.

(Continued)

(30) Foreign Application Priority Data

Jan. 29, 2014    (KR) .................. 10-2014-0011675

(51) Int. Cl.
*H04N 5/74* (2006.01)
*G09G 5/12* (2006.01)
(Continued)

(52) U.S. Cl.
CPC ............... *G09G 5/12* (2013.01); *G06F 3/011* (2013.01); *G06F 3/04817* (2013.01);
(Continued)

(58) Field of Classification Search
CPC .. H04N 9/3147; H04N 9/3179; H04N 13/363; H04N 21/4122; H04N 5/74;
(Continued)

(56) References Cited

U.S. PATENT DOCUMENTS 5,459,645 A * 10/1995 Sattler .................... G01D 11/28
349/11
5,793,361 A * 8/1998 Kahn .................. G06F 3/03542
345/1.3
(Continued)

FOREIGN PATENT DOCUMENTS

CN         1918624      2/2007
CN       101647273      2/2010
(Continued)

OTHER PUBLICATIONS

Australian Examination Report dated Nov. 18, 2016 in Australian Patent Application No. 2014315789.
(Continued)

*Primary Examiner* — Michael J Eurice
(74) *Attorney, Agent, or Firm* — Staas & Halsey LLP

(57) ABSTRACT

An electronic apparatus and a method of outputting content of the electronic apparatus outputs a synchronized content to a display apparatus and a projection-type display apparatus and a method of outputting a content of the electronic apparatus. The electronic apparatus includes an input/output unit connected with a display apparatus and a projection-type display apparatus, and a control unit configured to control the input/output unit, wherein the control unit outputs a synchronized content to the display apparatus and the
(Continued)

projection-type display apparatus through the input/output unit.

16 Claims, 61 Drawing Sheets

Related U.S. Application Data

(60) Provisional application No. 61/874,098, filed on Sep. 5, 2013.

(51) Int. Cl.
| | | |
|---|---|---|
| H04N 5/445 | (2011.01) | |
| H04N 7/15 | (2006.01) | |
| H04N 13/398 | (2018.01) | |
| G06F 3/14 | (2006.01) | |
| G06F 3/01 | (2006.01) | |
| H04N 21/414 | (2011.01) | |
| G06F 3/0481 | (2013.01) | |
| H04N 21/43 | (2011.01) | |
| G06F 3/0488 | (2013.01) | |
| G09G 3/00 | (2006.01) | |
| G09G 3/20 | (2006.01) | |
| G06F 3/147 | (2006.01) | |
| G06F 1/16 | (2006.01) | |
| H04N 21/41 | (2011.01) | |
| H04N 21/422 | (2011.01) | |
| H04N 21/431 | (2011.01) | |

(52) U.S. Cl.
CPC ........ *G06F 3/04883* (2013.01); *G06F 3/1423* (2013.01); *G06F 3/1446* (2013.01); *G09G 3/001* (2013.01); *G09G 3/2096* (2013.01); *H04N 5/44582* (2013.01); *H04N 7/15* (2013.01); *H04N 13/398* (2018.05); *H04N 21/41407* (2013.01); *H04N 21/4307* (2013.01); *G06F 1/1605* (2013.01); *G06F 1/1639* (2013.01); *G06F 3/147* (2013.01); *G06F 3/1454* (2013.01); *G09G 2300/026* (2013.01); *G09G 2320/10* (2013.01); *G09G 2340/04* (2013.01); *G09G 2340/0407* (2013.01); *G09G 2354/00* (2013.01); *G09G 2360/04* (2013.01); *G09G 2370/022* (2013.01); *H04N 21/4122* (2013.01); *H04N 21/41415* (2013.01); *H04N 21/42204* (2013.01); *H04N 21/4316* (2013.01)

(58) Field of Classification Search
CPC ...... H04N 9/3185; G03B 37/04; G03B 35/20; G06F 1/1645; G06F 3/1423; G06F 3/1446
See application file for complete search history.

(56) References Cited

U.S. PATENT DOCUMENTS

| | | | |
|---|---|---|---|
| 6,084,553 A | 7/2000 | Walls | |
| 6,128,131 A * | 10/2000 | Tang | H04N 9/12 348/383 |
| 6,247,815 B1 * | 6/2001 | Inova | G03B 21/28 353/30 |
| 6,343,862 B1 * | 2/2002 | Sawai | G02B 3/0056 349/8 |
| 6,561,651 B1 * | 5/2003 | Kubota | G03B 21/28 348/E9.012 |
| 6,611,241 B1 * | 8/2003 | Firester | H04N 9/12 345/1.1 |
| 6,690,337 B1 * | 2/2004 | Mayer, III | G06F 1/1601 345/1.1 |
| 6,804,406 B1 * | 10/2004 | Chen | G06T 3/4038 345/1.3 |
| 7,675,504 B1 * | 3/2010 | Smith | G06F 3/0325 345/156 |
| 9,141,329 B1 | 9/2015 | Reicher | |
| 9,858,027 B2 * | 1/2018 | Antipa | G06F 3/1446 |
| 2001/0022651 A1 * | 9/2001 | Kubota | G03B 21/10 353/94 |
| 2002/0041364 A1 * | 4/2002 | Ioka | H04N 9/3147 353/69 |
| 2002/0080302 A1 * | 6/2002 | Dubin | G02F 1/13336 349/73 |
| 2002/0089518 A1 | 7/2002 | Shigeta | |
| 2002/0144264 A1 * | 10/2002 | Broadus | H04N 5/44543 725/39 |
| 2002/0167458 A1 * | 11/2002 | Baudisch | G06F 3/1438 345/1.1 |
| 2002/0167459 A1 * | 11/2002 | Baudisch | G06F 3/1438 345/1.3 |
| 2002/0167460 A1 * | 11/2002 | Baudisch | G06F 3/1438 345/3.3 |
| 2002/0167531 A1 * | 11/2002 | Baudisch | G06F 3/1438 345/611 |
| 2003/0015632 A1 | 1/2003 | Dunn | |
| 2003/0079226 A1 * | 4/2003 | Barrett | H04N 7/163 725/46 |
| 2003/0100965 A1 | 5/2003 | Sitrick | |
| 2003/0151562 A1 * | 8/2003 | Kulas | G06F 3/1446 345/1.1 |
| 2003/0194683 A1 * | 10/2003 | Vorst | G09B 9/30 434/38 |
| 2003/0223113 A1 * | 12/2003 | Starkweather | G03B 21/62 359/451 |
| 2003/0229549 A1 | 12/2003 | Wolinsky | |
| 2003/0229900 A1 | 12/2003 | Reisman | |
| 2003/0233129 A1 | 12/2003 | Matos | |
| 2004/0017394 A1 | 1/2004 | Adachi | |
| 2004/0090424 A1 * | 5/2004 | Hurley | G09G 5/00 345/169 |
| 2004/0158864 A1 | 8/2004 | Kakemura | |
| 2004/0207719 A1 | 10/2004 | Tervo | |
| 2004/0244042 A1 * | 12/2004 | Billmaier | H04N 5/44543 725/110 |
| 2005/0024592 A1 * | 2/2005 | Eguchi | G03B 21/26 353/30 |
| 2005/0071430 A1 * | 3/2005 | Kobayashi | G09B 5/06 709/205 |
| 2005/0091302 A1 | 4/2005 | Soin | |
| 2005/0093868 A1 | 5/2005 | Hinckley | |
| 2005/0117121 A1 * | 6/2005 | Meerleer | G06F 3/14 353/30 |
| 2005/0122484 A1 | 6/2005 | Rodriguez, Jr. | |
| 2005/0206854 A1 * | 9/2005 | Katase | G02B 6/08 353/79 |
| 2006/0139233 A1 * | 6/2006 | Neale | G06T 5/006 345/1.1 |
| 2006/0256035 A1 | 11/2006 | Kondo | |
| 2007/0040786 A1 | 2/2007 | Chung | |
| 2007/0081207 A1 * | 4/2007 | Bimber | G03H 1/22 359/9 |
| 2007/0150924 A1 | 6/2007 | Ichinose | |
| 2007/0200791 A1 | 8/2007 | Meyers | |
| 2007/0257927 A1 * | 11/2007 | Sakanishi | G09G 5/005 345/581 |
| 2007/0258059 A1 * | 11/2007 | Park | G02B 26/0816 353/100 |
| 2008/0055325 A1 | 3/2008 | Seigneret | |
| 2008/0080302 A1 * | 4/2008 | Takahashi | B01F 11/0071 366/158.5 |
| 2008/0165081 A1 * | 7/2008 | Lawther | G06F 3/1423 345/1.2 |
| 2008/0246781 A1 * | 10/2008 | Surati | H04N 5/74 345/690 |
| 2009/0021162 A1 * | 1/2009 | Cope | G09G 3/30 313/511 |
| 2009/0021496 A1 | 1/2009 | Silzars | |
| 2009/0089824 A1 | 4/2009 | Beyabani | |

(56) References Cited

U.S. PATENT DOCUMENTS

| | | | |
|---|---|---|---|
| 2009/0167855 A1* | 7/2009 | Kummer | H04N 5/4403 348/114 |
| 2009/0243957 A1 | 10/2009 | Ni | |
| 2009/0273540 A1* | 11/2009 | Schultz | H04N 5/2253 345/1.3 |
| 2009/0303384 A1 | 12/2009 | Inoue | |
| 2009/0315839 A1* | 12/2009 | Wilson | G06F 17/5009 345/173 |
| 2010/0045705 A1 | 2/2010 | Vertegaal | |
| 2010/0060664 A1 | 3/2010 | Kilpatrick, II | |
| 2010/0064244 A1 | 3/2010 | Kilpatrick, II | |
| 2010/0066643 A1 | 3/2010 | King | |
| 2010/0110038 A1* | 5/2010 | Mo | G06F 3/044 345/174 |
| 2010/0111491 A1* | 5/2010 | Kamoto | G06F 3/1446 386/207 |
| 2010/0245535 A1* | 9/2010 | Mauchly | G06T 15/20 348/14.08 |
| 2010/0328336 A1 | 12/2010 | Si | |
| 2011/0050595 A1* | 3/2011 | Lundback | G06F 3/0416 345/173 |
| 2011/0086703 A1* | 4/2011 | Miller | G07F 17/3211 463/31 |
| 2011/0199389 A1 | 8/2011 | Lu | |
| 2011/0205432 A1 | 8/2011 | Mevissen | |
| 2012/0040720 A1 | 2/2012 | Zhang et al. | |
| 2012/0069131 A1* | 3/2012 | Abelow | G06Q 10/067 348/14.01 |
| 2012/0146925 A1* | 6/2012 | An | G06F 3/03547 345/173 |
| 2012/0146926 A1* | 6/2012 | An | G06F 3/03547 345/173 |
| 2012/0256854 A1* | 10/2012 | Lee | G06F 1/1643 345/173 |
| 2012/0268422 A1 | 10/2012 | Hirakawa et al. | |
| 2012/0270649 A1* | 10/2012 | Griswold | G02B 27/2278 463/31 |
| 2013/0113683 A1* | 5/2013 | Kitajima | G03B 37/04 345/1.2 |
| 2013/0171980 A1* | 7/2013 | Park | H04N 21/4126 455/420 |
| 2013/0181884 A1* | 7/2013 | Perkins | H04N 9/3147 345/1.3 |
| 2013/0207998 A1 | 8/2013 | Aoki | |
| 2014/0313423 A1 | 10/2014 | Johnson | |
| 2015/0312515 A1* | 10/2015 | Rivera | G03B 21/00 348/745 |
| 2015/0381902 A1* | 12/2015 | Bao | H04N 7/147 348/14.07 |
| 2016/0086379 A1 | 3/2016 | Sadi | |
| 2016/0125778 A1* | 5/2016 | Antipa | G06F 3/1446 345/619 |
| 2017/0011708 A1* | 1/2017 | Roberts | H04N 5/268 |

FOREIGN PATENT DOCUMENTS

| | | |
|---|---|---|
| CN | 102682740 | 9/2012 |
| CN | 103155692 | 6/2013 |
| EP | 1256873 | 11/2002 |
| JP | 63123018 A * | 5/1988 |
| KR | 10-2005-0081860 | 8/2005 |
| RU | 2389067 | 4/2006 |

OTHER PUBLICATIONS

Partial European Search Report dated Nov. 23, 2016 in European Patent Application No. 14842796.6.
Australian Office Action dated Jul. 15, 2016 in Australian Patent Application No. 2014315789.
International Search Report dated Dec. 12, 2014 in International Application No. PCT/KR2014/008418.
US Corrected Notice of Allowance dated Mar. 9, 2017 in U.S. Appl. No. 14/478,341.
US Notice of Allowance dated Feb. 10, 2017 in U.S. Appl. No. 14/478,341.
U.S. Office Action dated Oct. 12, 2016 in U.S. Appl. No. 14/478,341.
U.S. Office Action dated Apr. 8, 2016 in U.S. Appl. No. 14/478,341.
U.S. Appl. No. 14/478,341, filed Sep. 5, 2014, Jong Won Park, et al., Samsung Electronics Co., Ltd.
Russian Decision on Grant dated Oct. 9, 2017 in Russian Patent Application No. 2016107812/08.
European Communication dated Nov. 23, 2017 in European Patent Application No. 14842796.6.
Russian Office Action dated May 15, 2017 in Russian Patent Application No. 2016107812.
Chinese Office Action dated Jul. 4, 2018 in Chinese Patent Application No. 201480049264.4.
European Summons to Attend Oral Proceedings dated Dec. 7, 2018 in European Patent Application No. 14842796.6.
Chinese Office Action dated Mar. 14, 2019 in Chinese Patent Application No. 201480049264.4.
Indian Office Action dated Mar. 17, 2020 in Indian Patent Application No. 201627011656.
European Office Action dated Mar. 2, 2020 in European Patent Application No. 14842796.6.
European Communication dated Feb. 25, 2020 in European Patent Application No. 14842796.6.

* cited by examiner

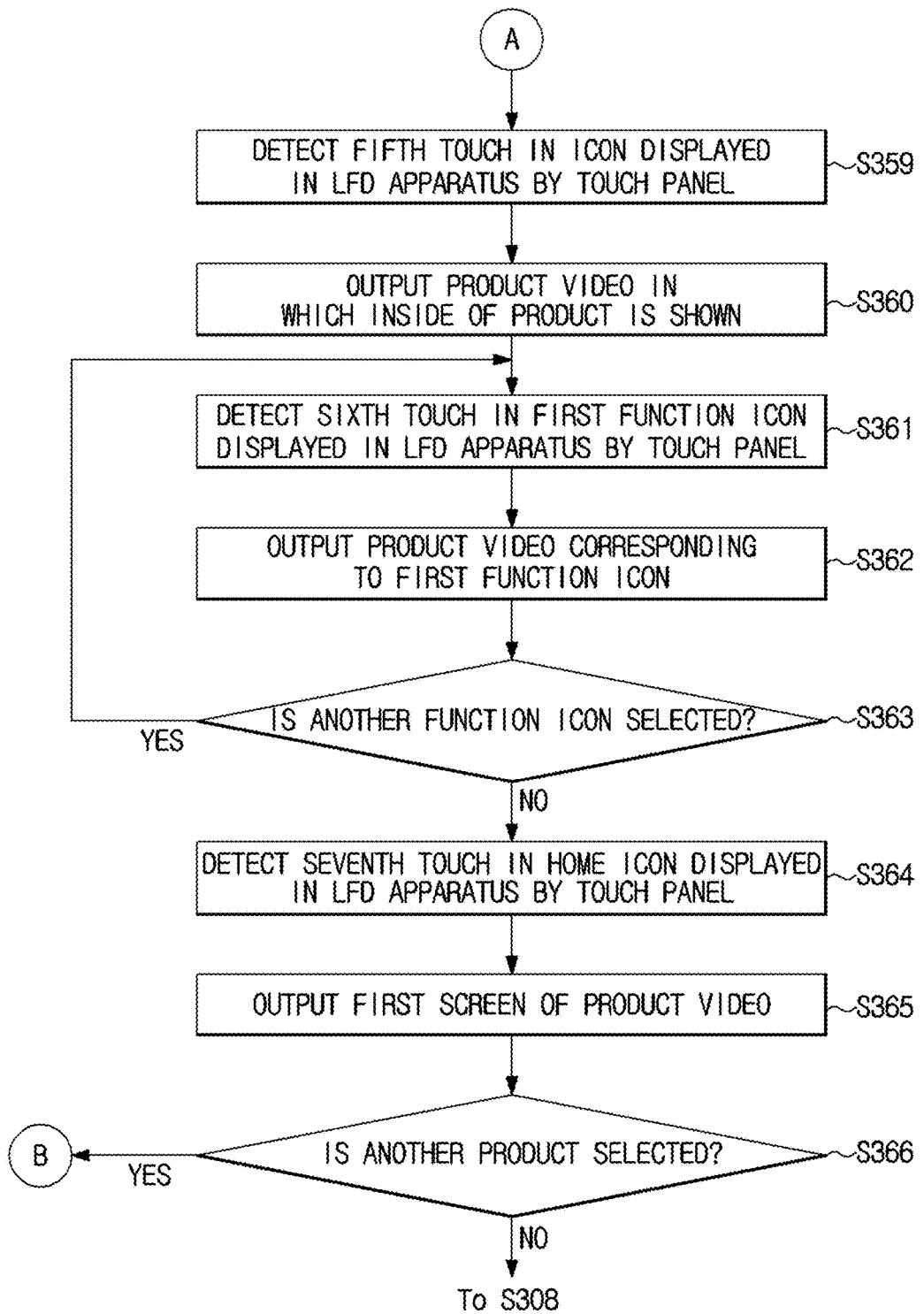

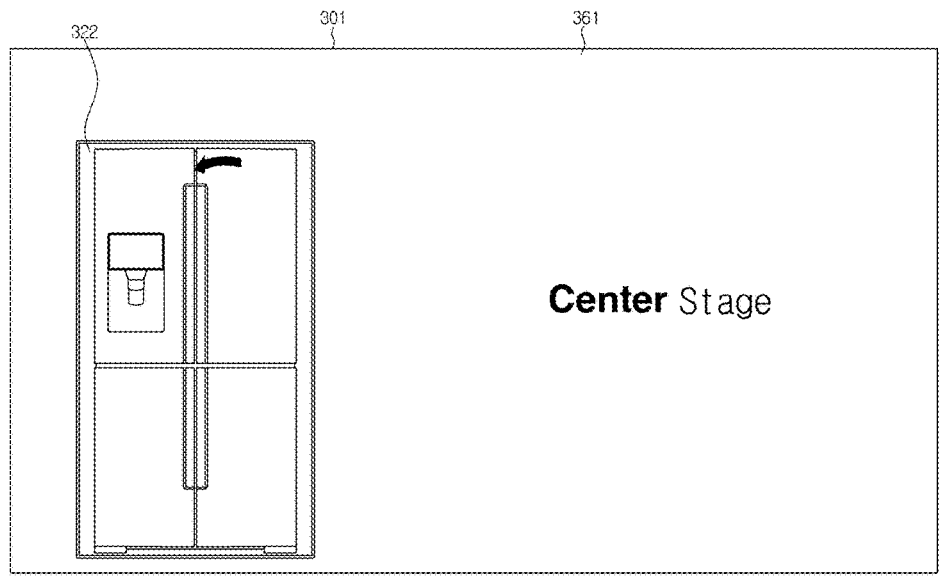

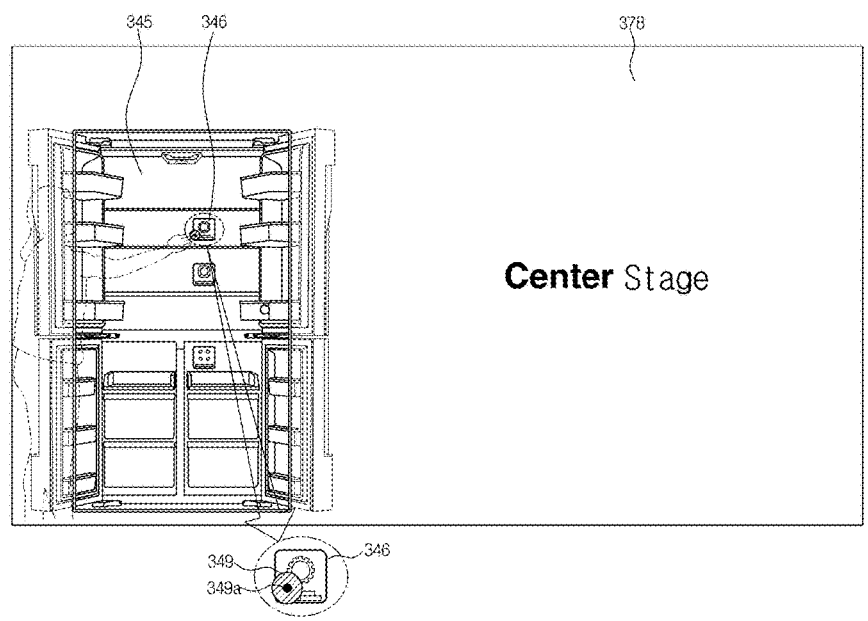

ELECTRONIC APPARATUS AND METHOD FOR OUTPUTTING CONTENT

CROSS-REFERENCE TO RELATED APPLICATIONS

This application is a continuation of U.S. patent application Ser. No. 14/478,341 filed Sep. 5, 2014 in the U.S. Patent and Trademark Office, which claims the benefit of Korean Patent Application No. 10-2014-0011675, filed on Jan. 29, 2014 in the Korean Intellectual Property Office and U.S. patent application No. 61/874098, filed on Sep. 5, 2013 in the U.S. Patent and Trademark Office, the disclosures of which are incorporated herein by reference.

BACKGROUND

1. Field displaying a content of the same, and more particularly, to an electronic apparatus which outputs a synchronized content to a display apparatus and a projection-type display apparatus in response to a user's approach and/or user's touch, and a method of outputting a content of the same.

2. Description of the Related Art

It is common to display actual products in a shop so that users can experience consumer electronics and electronic products. It is difficult to provide detailed information about main functions of products to users through these actual products, and therefore printed materials or videos for these products are additionally used.

In recent years, in order to provide various services and functions to users, consumer electronics and display apparatuses have increased in size and volume, and the time between release dates thereof has been gradually shortened. It is not easy to change and display the consumer electronics and display apparatuses with increased sizes and volumes in accordance with the release dates in the shop with a limited space.

SUMMARY

Therefore, it is an aspect of the present invention to provide an electronic apparatus which outputs, to a display apparatus and a projection-type display apparatus, a synchronized content having a different resolution in an idle state, a synchronized content having a different resolution corresponding to a user's approach detected by a proximity sensor, a synchronized content having a different resolution corresponding to the user's touch detected by a touch panel, and the like in response to the user's approach and/or touch.

Additional aspects of the invention will be set forth in part in the description which follows and, in part, will be obvious from the description, or may be learned by practice of the invention.

In accordance with one aspect of the present invention, an electronic apparatus includes: an input/output unit in communication with a display apparatus and a projection-type display apparatus; and a control unit configured to control the input/output unit, wherein the control unit outputs a synchronized content to the display apparatus and the projection-type display apparatus through the input/output unit.

In accordance with another aspect of the present invention, an electronic apparatus includes: an input/output unit in communication with a single display apparatus having a screen of a first diagonal length and a plurality of display apparatuses each having a screen of a second diagonal length smaller than the first diagonal length; and a control unit configured to control the input/output unit, wherein the control unit outputs a first content among synchronized contents to the display apparatus having the screen of the first diagonal length through the input/output unit, and outputs a second content among the synchronized contents to the plurality of display apparatuses each having the screen of the second diagonal length.

In accordance with still another aspect of the present invention, an electronic apparatus includes: an input/output unit in communication with a single display apparatus coupled to a touch panel to detect touch and to another display apparatus having the same diagonal length as that of the single display apparatus; and a control unit configured to control the input/output unit, wherein the control unit outputs a synchronized content to the single display apparatus coupled to the touch panel and to the other display apparatus through the input/output unit.

In accordance with yet another aspect of the present invention, a method of outputting a content of an electronic apparatus, includes: outputting a first synchronized content to a connected display apparatus and a connected projection-type display apparatus; detecting a user's approach; and outputting a second synchronized content to the display apparatus and the projection-type display apparatus in response to the detected user's approach.

In accordance with yet another aspect of the present invention, a method of outputting a content of an electronic apparatus, includes: outputting a first synchronized content to a connected single display apparatus having a screen of a first diagonal length and a plurality of display apparatuses each having a screen of a second diagonal length smaller than the first diagonal length; detecting a user's approach using a proximity sensor; and outputting a second synchronized content to the single display apparatus having the screen of the first diagonal length and to the plurality of display apparatuses each having the screen of the second diagonal length in response to the detected user's approach.

In accordance with yet another aspect of the present invention, a method of outputting a content of an electronic apparatus, includes: outputting a first synchronized content to a connected single display apparatus coupled to a touch panel to detect touch and to a plurality of display apparatuses each having the same diagonal length as that of the single display apparatus; detecting a user's approach using a proximity sensor; and outputting a second synchronized content to the plurality of display apparatuses in response to the detected user's approach.

In accordance with yet a further aspect of the present invention, a system for displaying content, includes: an electronic apparatus including: an input/output unit, and a control unit to control the input/output unit. The system for displaying content further includes a display apparatus in communication with the electronic apparatus, and a projection-type display apparatus in communication with the electronic apparatus. In the system for displaying content, the control unit outputs a synchronized content to the display apparatus and the projection-type display apparatus through the input/output unit.

In addition, the system further includes a single display apparatus in communication with the electronic apparatus and including a screen of a first diagonal length, and a plurality of display apparatuses each comprising a screen of a second diagonal length smaller than the first diagonal length, wherein the control unit outputs a first content among synchronized contents to the display apparatus comprising the screen of the first diagonal length through the input/output unit, and outputs a second content among the synchronized contents to the plurality of display apparatuses each comprising the screen of the second diagonal length.

Moreover, the single display apparatus further includes a touch panel to detect touch.

In accordance with another aspect of the present invention, a system for displaying content includes an electronic apparatus including an input/output unit, and a control unit configured to control the input/output unit. The system for displaying content further includes a single display apparatus in communication with the electronic apparatus and including a screen of a first diagonal length, and a plurality of display apparatuses each comprising a screen of a second diagonal length smaller than the first diagonal length, wherein the control unit outputs a first content among synchronized contents to the display apparatus including the screen of the first diagonal length through the input/output unit, and outputs a second content among the synchronized contents to the plurality of display apparatuses each comprising the screen of the second diagonal length.

In accordance with a further aspect of the present invention, a system for displaying content includes an electronic apparatus including an input/output unit, and a control unit that controls the input/output unit. Moreover, the system for displaying content further includes a single display apparatus in communication with the electronic apparatus and coupled to a touch panel to detect touch, and another display apparatus in communication with the electronic apparatus and including the same diagonal length as that of the single display apparatus, wherein the control unit outputs a synchronized content to the single display apparatus coupled to the touch panel and to the other display apparatus through the input/output unit.

BRIEF DESCRIPTION OF THE DRAWINGS

These and/or other aspects of the invention will become apparent and more readily appreciated from the following description of the embodiments, taken in conjunction with the accompanying drawings of which:

FIGS. 3A to 3C are schematic flowcharts illustrating a method of displaying a screen of an electronic apparatus in accordance with an embodiment of the present invention;

DETAILED DESCRIPTION

Figure 1A:
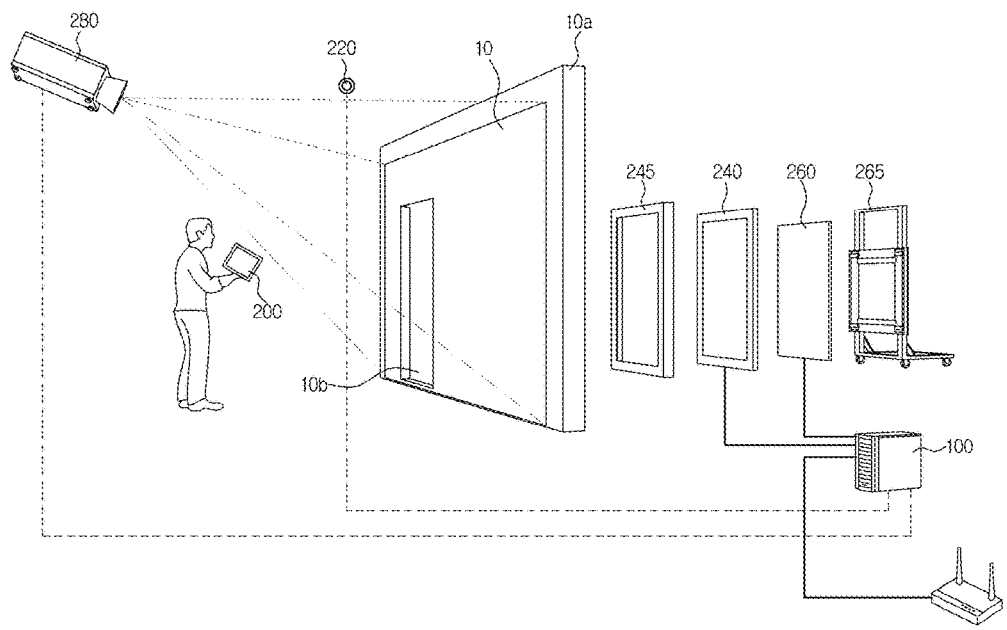
FIGS. 1A and 1B are schematic diagrams illustrating an overall system for displaying a screen of an electronic apparatus in accordance with an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Hereinafter, exemplary embodiments of the present invention will be described in detail. However, the present invention is not limited to the exemplary embodiments disclosed below, but may be implemented in various forms. The following exemplary embodiments are described in order to enable those of ordinary skill in the art to embody and practice the invention.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

"Touch" may be generated by a part of a user's body, such as one of the fingers including the thumb, or by a touchable input unit (for example, a stylus or the like), for example. The "touch" may include hovering by one of the fingers including the thumb or the touchable input unit. In addition, the "touch" may include a single touch or a multi-touch.

"Consecutive movement of the touch" may include a consecutive movement of the single touch or a consecutive movement of the multi-touch.

"Content" may be used as a term including an idle video output in an idle state of the electronic apparatus which is output from a display apparatus and/or a projection-type display apparatus by the control of an electronic apparatus, a hooking video output in response to the detected user's approach, a product video corresponding to features of a product, and a hooking user interface (UI) or a product UI, for example. The content may be stored in the electronic apparatus, the display apparatus and/or the projection-type display apparatus. The electronic apparatus may output the content and control signals stored in a storage unit of the electronic apparatus to the display apparatus and the projection-type display apparatus. The electronic apparatus may output the control signals for outputting the content stored in the display apparatus and/or projection type display apparatus, to the display apparatus and/or the projection type display apparatus.

A Resolution of the Content may include an Ultra High Definition (UHD) and a Full High Definition (FHD), for example. In addition, the "content" may include videos, images, texts, or web documents. The content may include a video that is a set of still images.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1B:
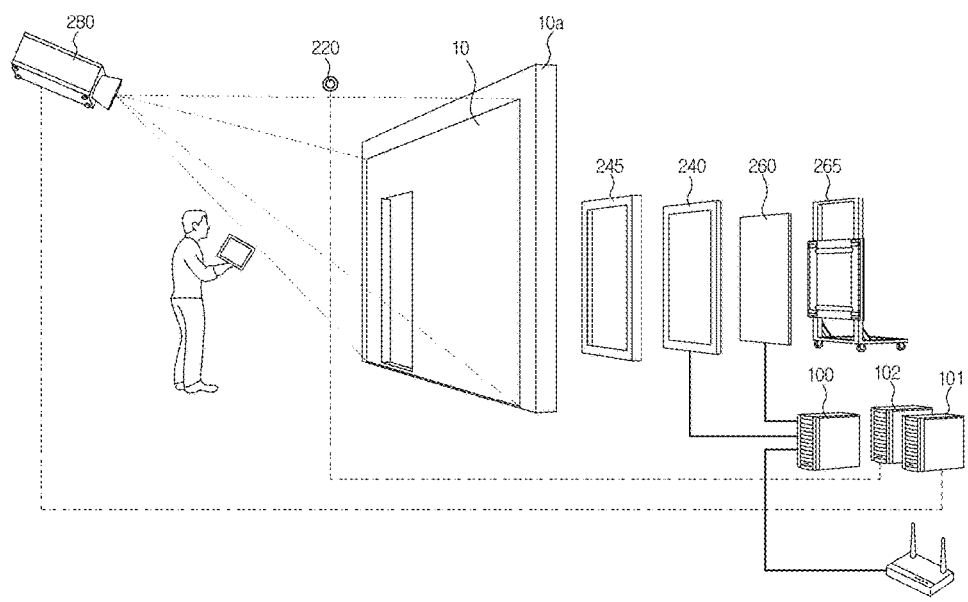

FIGS. 1A and 1B are schematic diagrams illustrating an overall system for displaying a screen of an electronic apparatus in accordance with an embodiment of the present invention.

Referring to FIG. 1A, components for displaying a screen of an electronic apparatus 100 may include a screen 10, the electronic apparatus 100, a portable apparatus 200, a proximity sensor 220, a touch panel 240, a support frame 245, a large format display (LFD) apparatus 260, a fixed stand 265, and a projection-type display apparatus (for example, a projector 280).

A wall 10a may include the screen 10. The screen 10 may be positioned on the surface of the wall 10a facing the projector 280. Alternatively, the screen 10 may be positioned independently of the wall 10a. The screen 10 may include a screen using a white wall surface or a white film or fiber with uniform reflection and less glare. The screen 10 displays content (for example, a content having a resolution of full high definition (FHD, 1920×1080 pixels) or more) projected from the projector 280. In the embodiment of the present invention, a 2K-resolution content may be used as the term referring to a content having a resolution of FHD or more. In the embodiment of the present invention, the "content" may be used as the term including an idle video, a hooking video, a product video, a hooking UI, a product UI, or the like which is output from a display apparatus and/or a projection-type display apparatus by control of the electronic apparatus. The resolution of the content may include an UHD or a FHD. In addition, the "content" may include videos, images, texts, web documents, for example.

The screen 10 may include a material in which a gain indicating a reflection coefficient of light projected on the screen is large and an angle indicating left/right viewing angles at which the reflection coefficient is constantly maintained is in a range of approximately 20° to 60°.

In the wall 10a, an opening 10b through which the LFD apparatus 260 is inserted may be formed. An area of the opening 10b is smaller than an area of the screen 10. The opening 10b may be positioned closer to either the left side or the right side of the screen 10. In addition, the opening 10b may be positioned at the central area of the screen 10.

The electronic apparatus 100 may be wirelessly connected, or connected through a wired connection, to some or all of the components of the system. The electronic apparatus 100 may be electrically connected and/or in communication with some or all of the components of the system. The electronic apparatus 100 may control the connected components (for example, the LFD apparatus, the projector, etc.). The electronic apparatus 100 will be described below in detail with reference to FIGS. 2A and 2B.

The portable apparatus 200 may be remotely connected to or may be in communication with the electronic apparatus 100 to manage and control the system. The portable apparatus 200 and the electronic apparatus 100 may be connected with each other in a wired or wireless manner using a network connection apparatus (for example, a router or a sharer). The portable apparatus 200 may manage the electronic apparatus 100 and the components which are connected with the electronic apparatus 100 using a centerstage management system (CMS) application installed in the portable apparatus 200 or the electronic apparatus 100. The portable apparatus 200 may transmit control signals to the connected electronic apparatus 100. The control signals may include control signals capable of outputting contents to the LFD apparatus 260 and the projector 280 and control signals capable of downloading contents from the outside to the electronic apparatus 100.

The proximity sensor 220 detects a user approaching a set area (for example, within approximately 1 m from the screen 10) of the screen 10 or the LFD apparatus 260 as non-contact or contact. The proximity sensor 220 which detects the user's approach may transmit analog or digital signals corresponding to the detected user's approach to the electronic apparatus 100.

Various types of the proximity sensors 220 may be provided. The proximity sensor 220 may include a magnetic type proximity sensor, an inductance type proximity sensor, a high-frequency oscillation type proximity sensor, a capacitive type proximity sensor, an infrared type proximity sensor, a camera for closed circuit TV (CCTV), and the like.

The proximity sensor 220 may be provided at a position (for example, a position where the shadow of the proximity sensor 220 is not displayed on the screen 10) where the proximity sensor 220 is not interfering with the content projected from the projector 280. In addition, the proximity sensor 220 may be positioned in an area between the screen 10 and a user.

The touch panel 240 receives a touch of the user. The touch panel 240 may receive a single-touch or multi-touch by a user's body (for example, fingers including the thumb) or an input unit (for example, a stylus which is not shown). The input unit is not limited as long as it can detect a touch input on the touch panel 240 corresponding to various touch detection methods.

The touch panel 240 may transmit analog signals corresponding to the input user's touch to a touch panel controller (not shown). The touch panel controller may convert the received analog signals to transmit the converted signals to the electronic apparatus 100. The electronic apparatus 100 may calculate a position (for example, X and Y coordinates) corresponding to the user's touch using the received signals.

The touch panel 240 may be implemented as a capacitive type touch panel, a resistive type touch panel, an infrared type touch panel, or an acoustic type touch panel, but the touch panel 240 is not limited thereto.

The touch panel 240 is positioned between the support frame 245 and the LFD apparatus 260. The touch panel 240 may be coupled to a bezel or back cover (not shown) of the LFD apparatus 260 (for example, using adhesive, adhesive tape, or a joint member such as a screw, and the like).

The touch panel 240 may be integrally formed with the LFD apparatus 260. The touch panel 240 may be implemented in a top area (for example, on-cell scheme) of a display unit (not shown) of the LFD apparatus 260 or an inner area (for example, in-cell scheme) of the display unit (not shown) of the LFD apparatus 260. The thickness when the touch panel 240 and the LFD apparatus 260 are integrated with each other may be reduced compared to the thickness when the touch panel 240 and the LFD apparatus 260 are separately formed. A weight supported by the support frame 245 when the touch panel 240 and the LFD apparatus 260 are integrated with each other may be also reduced compared to a weight supported by the support frame 245 when the touch panel 240 and the LFD apparatus 260 are separately formed. In addition, a size (for example, a depth of the support frame 245 is reduced) of the support frame 245 may be also minimized when the touch panel 240 and the LFD apparatus 260 are integrated with each.

The support frame 245 may accommodate the coupled touch panel 240 and LFD apparatus 260. The support frame 245 may support the coupled touch panel 240 and LFD apparatus 260. In addition, the support frame 245 may be fitted into the opening 10b of the wall 10a. The vertical and horizontal widths of the support frame 245 are small so as to minimize (for example, to reduce) the interference with the content projected from the projector 280.

The LFD apparatus 260 displays a synchronized content received from the electronic apparatus 100. The content received from the electronic apparatus 100 is synchronized with the content output from the projector 280. The content displayed in the LFD apparatus 260 may be a content having an UHD resolution (for example, approximately 4,000×2,000 pixels) that is approximately four times an FHD resolution. The UHD resolution may include 4,096×2,160 pixels or 3,840×2,160 pixels, for example.

In the embodiment of the present invention, a 4K-resolution content may be used as the term referring to a content having a resolution of UHD or more. The LFD apparatus 260 may be a display apparatus capable of outputting a content having the UHD resolution. In addition, the LFD apparatus 260 may be a display apparatus capable of outputting a content having the FHD resolution.

In the embodiment of the present invention, a diagonal length of a display screen of the LFD apparatus 260 may be approximately 1,520 mm (60 inches) or more. In the embodiment of the present invention, a diagonal length of a display screen of a Small Format Display (SFD) apparatus may be smaller than the diagonal length of the display screen of the LFD apparatus 260. In addition, the SFD apparatus refers to a display apparatus capable of outputting a content resolution equal to or lower than the resolution of the content displayed in the LFD apparatus 260. For example, when the diagonal length of the display screen of the LFD apparatus 260 is approximately 2,150 mm (85 inches), a diagonal length of a display screen of an SFD apparatus 290 may be approximately 1,160 mm (46 inches).

In the embodiment of the present invention, the display apparatus having a same diagonal length of the display screen may have a diagonal length of a display screen having a margin of approximately ±50 mm. For example, when the diagonal length of the display screen is approximately 2,150 mm, the display apparatus having the same diagonal length of the display screen may have a diagonal length of a display screen of approximately 2,100 mm to 2,200 mm.

While the LFD apparatus 260 outputs the 4K-content resolution, the SFD apparatus 290 may output a 2K-content resolution. The SFD apparatus 290 may be a display apparatus capable of outputting a content having an FHD resolution. In addition, the SFD apparatus 290 may display the same 4K-content resolution as that of the LFD apparatus 260, and its diagonal length may be shorter than the diagonal length of the LFD apparatus 260. In the embodiment of the present invention, the diagonal length of the display screen of the SFD apparatus 290 may be approximately 1,160 mm (46 inches).

The screen of the content output from the LFD apparatus 260 may be the same as the screen of the content projected from the projector 280 to the screen 10. The content output from the LFD apparatus 260 may have the same screen as that of the content projected from the projector 280 to the screen 10, and have a different resolution from that of the content projected from the projector 280 to the screen 10. The content displayed in the LFD apparatus 260 may be displayed with a brightness (for example, brighter) different than the brightness of the same content projected from the projector 280 to the screen 10. The screen of the content displayed in the LFD apparatus 260 may be a part of the screen of the synchronized content projected from the projector 280 to the screen 10.

The content which is received from the electronic apparatus 100 and is output to the LFD apparatus 260 is synchronized with the content projected from the projector 280 to the screen 10.

A variety of types and sizes of products (for example, a refrigerator, a washing machine, an electric range, etc.) which can be displayed in the LFD apparatus 260 may be provided. The size (horizontal length (width) X vertical length (height): approximately 2,004×1,085 mm) of the LFD apparatus 260 may be larger than an actual size (approximately 908×1850 mm) of the displayed product (for example, a refrigerator). For example, the size (for example, an area of the screen) of the LFD apparatus 260 is larger than the actual size (for example, an area of the entire surface of the product) of the displayed product by approximately 1.05 times or more. The size of the LFD apparatus 260 may be larger than the actual size (approximately 686×990 mm) of the displayed product (for example, an area of an entire surface of a washing machine) by approximately 2.5 times or more. In addition, the size of the LFD apparatus 260 may be larger than the actual size (approximately 740×920 mm) of the displayed product (for example, an area of an entire surface of an electric range) by approximately 2.5 times or more. In addition, in the case of a small-sized product such as a mobile phone, a note PC, or a tablet PC, the SFD apparatus 290 as well as the LFD apparatus 260 having a screen size larger than the small-sized product may be applied. The term "large-size" has a relative meaning, and may be used as the term referring to a display apparatus having a screen having a size larger than the size of the product displayed on the screen.

The LFD apparatus 260 having the size (horizontal length'vertical length) larger than the size of the displayable product may be selected to be positioned at the opening 10*b* of the wall 10*a*.

Through the system including the LFD apparatus 260 and the projection-type display apparatus 280, products having various kinds and sizes may be introduced, and therefore the number of products, the size of the space, and costs may be reduced when compared to an actual showroom. In addition, through the system including the LFD display apparatus 260 and the projection-type display apparatus 280, products having various kinds and sizes may be introduced to users in a single place without burdening the users with the need to move around the inside of the showroom, thereby providing a new shopping experience.

The LFD apparatus 260 may be supported by the fixed stand 265. The LFD apparatus 260 coupled to the touch panel 240 may be supported by the fixed stand 265. The LFD apparatus 260 integrally formed with the touch panel 240 may be supported by the fixed stand 265. In addition, the support frame 245, the touch panel 240, and the LFD apparatus 260 may be supported by the fixed stand 265.

The projector 280 enlarges a synchronized 2K-resolution content received from the electronic apparatus 100 and projects the enlarged content to the screen 10. The content received from the electronic apparatus 100 is synchronized with the content output to the LFD apparatus 260. In addition, the projector 280 may enlarge a 4K-resolution content received from the electronic apparatus 100 and projects the enlarged content to the screen 10. The projector 280 may have a brightness of approximately 3000 ANSI lumens or more to correspond to the resolution of the projected content. When the resolution of the content is increased, the brightness (for example, ANSI lumens) of the projector 280 may be increased. The projection-type display apparatus may include the projector 280.

The synchronized content may denote two contents. For example, a content screen output from the LFD apparatus 260 may be a part of a content screen output from the projector 280. This may be easily determined when comparing a size (for example, horizontal length×vertical length) of the screen 10 and a screen size (for example, horizontal length×vertical length) of the LFD apparatus 260.

The synchronized content output from the LFD apparatus 260 may be a content of the 4K-resolution, and the synchronized content output from the projector 280 is a low-resolution content compared to the content output from the LFD apparatus 260. The synchronized low-resolution content output from the projector 280 and the synchronized high-resolution content output from the LFD apparatus 260 may be overlapped and displayed on the screen 10. In addition, the low-resolution content in which a screen area corresponding to the screen of the LFD apparatus 260 is masked may be output from the projector 280. The high-resolution content may be output to the screen of the LFD apparatus 260, separately from the low-resolution content including the masked screen area output from the projector 280.

Referring to FIG. 1B, most of components 200 to 280 are the same as those in FIG. 1A. The electronic apparatus 100 of FIG. 1A may be reconfigured as the electronic apparatus 100 connected with the touch panel 240 and the LFD apparatus 260, a first electronic apparatus 101 connected with the projector 280, and a second electronic apparatus 102 connected with the proximity sensor 220. The electronic apparatus 100, the first electronic apparatus 101, and the second electronic apparatus 102 may be connected with each other in a wired or wireless manner. When signals corresponding to a user's approach are received from the second electronic apparatus 102, the electronic apparatus 100 may control the second electronic apparatus 102 to output a synchronized content corresponding to the user's approach from the LFD apparatus 260 and the projector 280.

It will be readily understood by those persons skilled in the art that a component of the system connected with the first electronic apparatus 101 and the second electronic apparatus 102 may be changed. In addition, the first electronic apparatus 101 and the second electronic apparatus 102 may be implemented as a single third electronic apparatus (not shown, 103). The third electronic apparatus may be connected with the proximity sensor 220 and the projector 280. The third electronic apparatus may be connected with the electronic apparatus 100 in a wired or wireless manner. The electronic apparatus 100 may control the third electronic apparatus.

The components shown in FIG. 1B are substantially the same as those of FIG. 1A, and thus repeated descriptions thereof will be omitted.

Figure 1C:
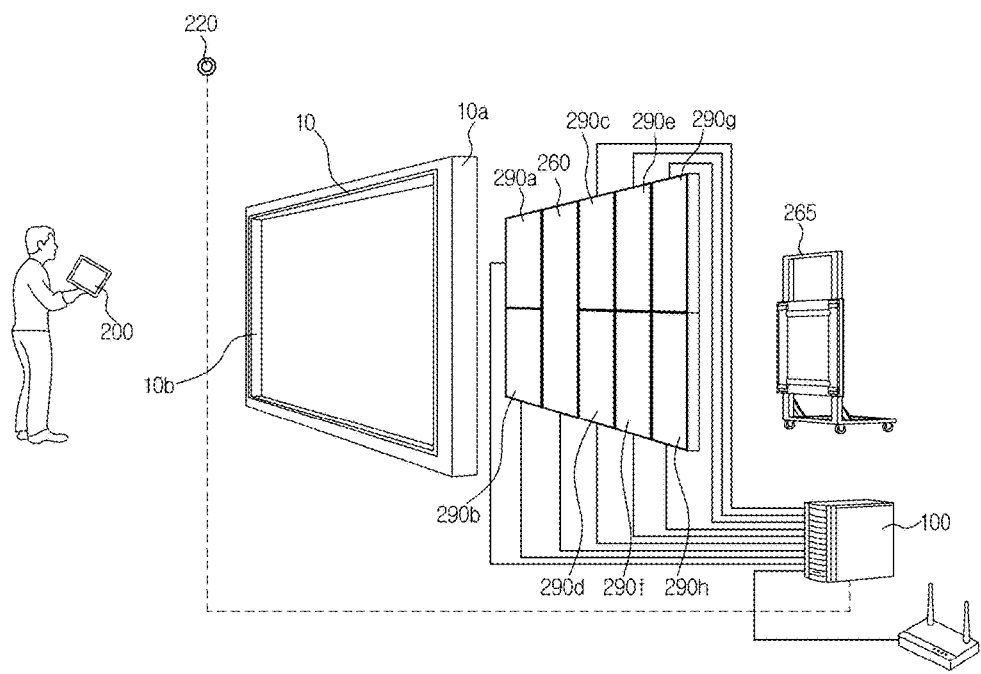
FIGS. 1C and 1D are schematic diagrams illustrating an overall system for displaying a screen of an electronic apparatus in accordance with another embodiment of the present invention.
Figure 1D:
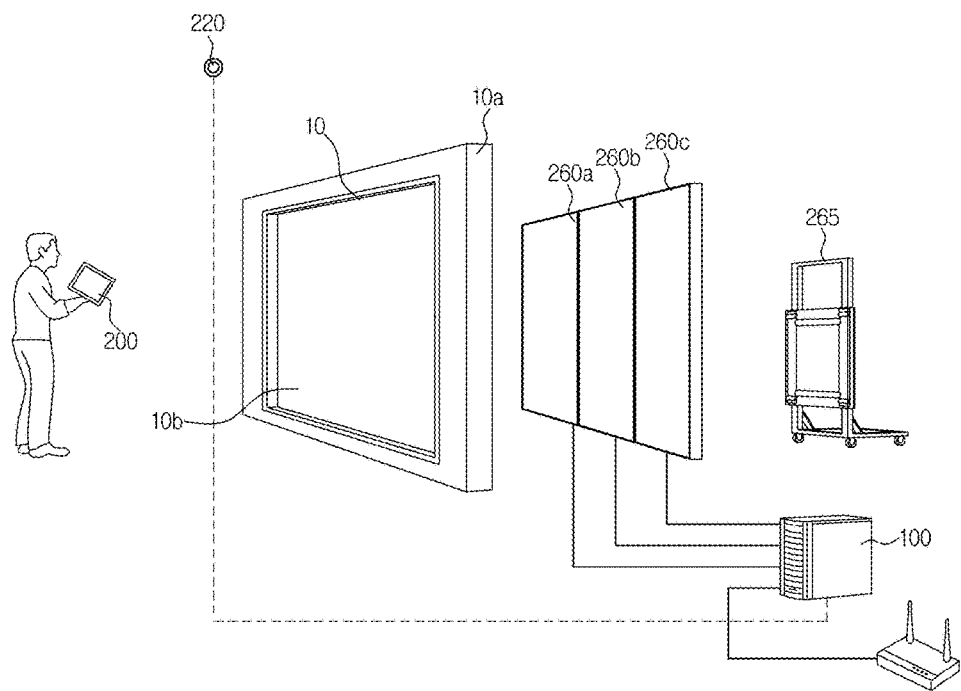

FIGS. 1C and 1D are schematic diagrams illustrating an overall system for displaying a screen of an electronic apparatus in accordance with another embodiment of the present invention.

Referring to FIG. 1C, components for displaying the screen of the electronic apparatus include a wall 10a, an electronic apparatus 100, a portable apparatus 200, a proximity sensor 220, a touch panel (not shown), a support frame (not shown), an LFD apparatus 260, a fixed stand 265, and a plurality of SFD apparatuses 290a to 290h. The touch panel 240 shown in FIG. 1B may be coupled to the LFD apparatus 260. In addition, the touch panel 240 may be integrally formed with the LFD apparatus 260.

An opening formed on the wall 10a to accommodate the LFD apparatus 260 and the plurality of SFD apparatuses 290a to 290h may have an area larger than the opening 10b of FIG. 1A. The fixed stand 265 of FIG. 1C may also fix a larger number of display apparatuses and support a larger weight than the fixed stand 265 of FIG. 1A.

The electronic apparatus 100 may control connected components (for example, the LFD apparatus, the SFD apparatuses, etc.).

Referring to FIG. 1D, components for displaying the screen of the electronic apparatus include the wall 10a, the electronic apparatus 100, the portable apparatus 200, the proximity sensor 220, the touch panel (not shown), the support frame (not shown), a plurality of LFD apparatuses 260a, 260b, and 260c, the fixed stand 265. The touch panel may be coupled to a single LFD apparatus 260.

An opening formed on the wall 10a to accommodate the plurality of LFD apparatuses 260 may have an area larger than that of the opening 10b of FIG. 1A. The fixed stand 265 of FIG. 1D may also fix a larger number of display apparatuses and support a larger weight than the fixed stand 265 of FIG. 1A.

The electronic apparatus 100 may control connected components (for example, the plurality of LFD apparatuses, etc.).

At least one component may be added or deleted in response to the performance of the components of the system shown in FIGS. 1A to 1D. In addition, it will be readily understood by those persons skilled in the art that mutual positions of the components may be changed to correspond to the performance or structure of the system.

Figure 2A:
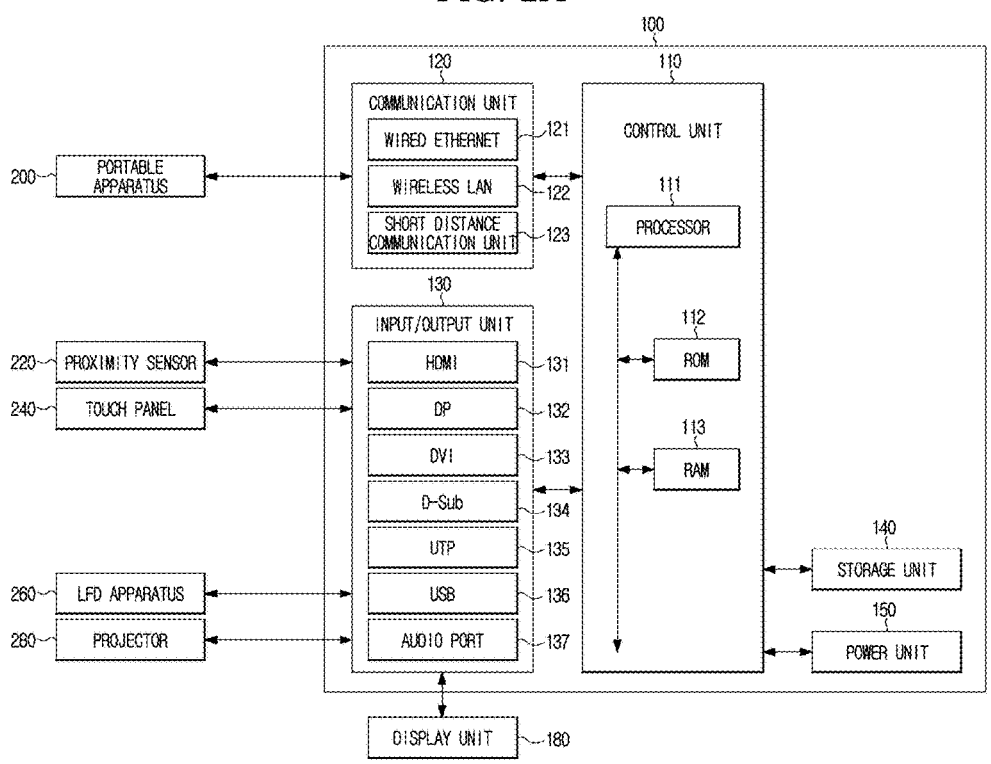
FIGS. 2A and 2B are schematic block diagrams illustrating an electronic apparatus in accordance with an embodiment of the present invention.
Figure 2B:
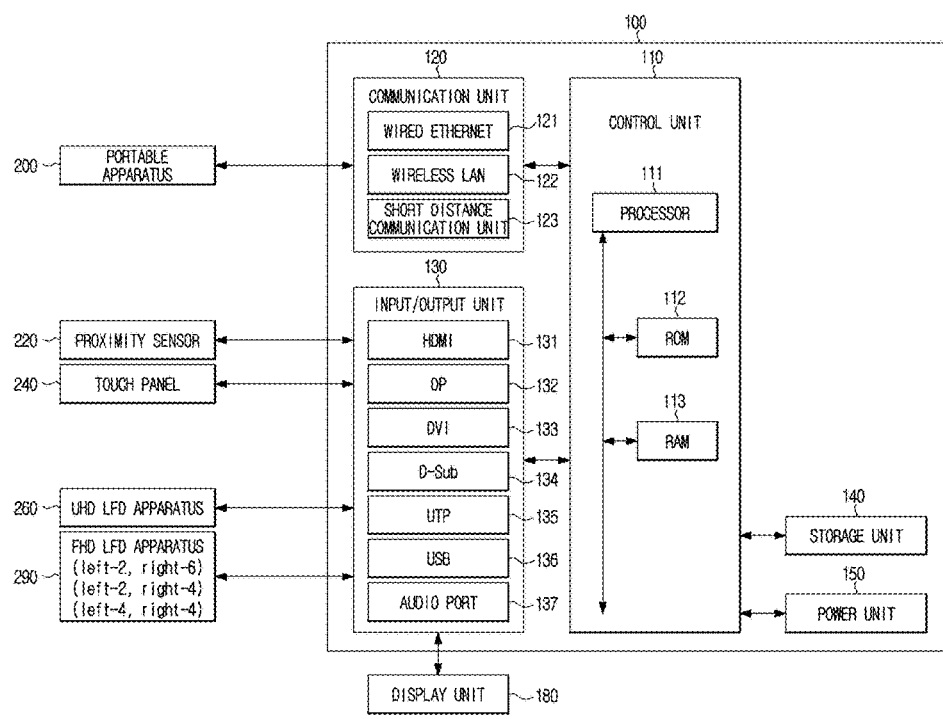

FIGS. 2A and 2B are schematic block diagrams illustrating an electronic apparatus in accordance with an embodiment of the present invention.

Referring to FIG. 2A, the electronic apparatus 100 may be connected to an external apparatus using a communication unit 120 or an input/output unit 130 in a wired or wireless manner. The external apparatus may include the portable apparatus 200, the proximity sensor 220, the touch panel 240, a network connection apparatus, a display unit 180, the LFD apparatus 260, or the projector 280. The display apparatus including the LFD apparatus 260 and/or the SFD apparatus 290 may be implemented by an analog TV, a digital TV, a 3D-TV, a smart TV, an LED TV, an OLED TV, a plasma TV, a monitor, a curved TV having a screen that has a fixed curvature, a flexible TV having a screen that has a fixed curvature, a bent TV, or a variable TV which can change a curvature of a screen by a user's input, but it is not limited thereto, which will be readily understood by those persons skilled in the art.

The external apparatus may include another LFD apparatus (not shown), another SFD apparatus (not shown), a mobile phone (not shown), a smart phone (not shown), a tablet PC (not shown), an electronic blackboard (not shown), and a server (not shown).

The electronic apparatus 100 may include a control unit 110, the communication unit 120, the input/output unit 130, a storage unit 140, and a power unit 150. In addition, the electronic apparatus 100 may include a sensor (not shown, for example, an illumination sensor, a temperature sensor, or the like) capable of detecting an internal state or an external state of the electronic apparatus 100.

The control unit 110 may include a processor 111, a ROM 112 in which a control program capable of controlling the electronic apparatus 100 is stored, and a RAM 113 that stores signals or data input from the outside or is used as a storage area corresponding to various operations performed in the electronic apparatus 100.

The control unit 110 controls overall operations of the electronic apparatus 100 and a signal flow between all of the internal components 120 to 150 of the electronic apparatus 100, and performs a function of processing data. The control unit 110 controls a power source which supplies to the internal components 110 to 140 from the power unit 150. In addition, when satisfying a user's input and/or a condition set and stored in advance, the control unit 110 may perform an operation system (OS) and various applications which are stored in the storage unit 140.

The processor 111 may include a graphic processing unit (GPU, not shown) for graphic processing of an image or moving picture. The processor 111 may be implemented in the form of System on Chip (SoC) including a core (not shown) and a GPU. The processor 111 may include a single core, a dual core, a triple core, a quad core, or a multiple thereof.

The control unit 110 may include a graphic processing board (not shown) including a graphic processor (not shown), a RAM (not shown), or a ROM (not shown) formed on a separate circuit board electrically connected with the control unit 110. In addition, the processor 111, the ROM 112, and the RAM 113 may be mutually connected through an internal bus.

The "control unit" in the embodiments of the present invention may be used as the term referring to a component including the processor 111, the ROM 112, and the RAM 113. The "control unit" may be used as the term referring to a component including the processor 111, the ROM 112, the RAM 113, and the graphic processing board (not shown).

According to the embodiment of the present invention, the control unit may output various types of content so as to be displayed in the LFD apparatus 260 and the projector 280.

According to the embodiment of the present invention, the control unit may output a first synchronized content to the connected display apparatus and projection-type display apparatus, and change the first content into a second synchronized content in response to the user's approach detected by the proximity sensor to thereby output the second content to the display apparatus and the projection-type display apparatus.

The control unit may change the second content into a third synchronized content in response to the user's touch detected by the touch panel to thereby output the third content to the display apparatus and the projection-type display apparatus.

The control unit may receive control signals from a portable apparatus through a communication unit connectable to the portable apparatus.

The control unit may output a high-resolution content among the synchronized contents to the display apparatus, and output a low-resolution content to the projection-type display apparatus when comparing the resolution of the content which outputs to the display apparatus.

The control unit may output either visual feedback or audio feedback to the display apparatus and the projection-type display apparatus in response to the detected user's approach.

The control unit may output the first synchronized content to a single display apparatus, having a display screen of a first diagonal length, and a plurality of display apparatuses, each having a display screen of a second diagonal length smaller than the display screen of the first diagonal length and positioned in a left direction and a right direction based on the display apparatus having the display screen of the first diagonal length, wherein the single display apparatus is connected to the plurality of display apparatuses, and change the first content into a second synchronized content in response to the user's approach detected by the proximity sensor to thereby output the second content to the single display apparatus having the display screen of the first diagonal length and the plurality of display apparatuses having the display screen of the second diagonal length.

The control unit may output the first synchronized content to a connected single display apparatus having a screen with a first diagonal length and a plurality of display apparatuses having a screen with a second diagonal length smaller than the first diagonal length, and change the first content into a second synchronized content in response to the user's approach detected by the proximity sensor to thereby output the second synchronized content to the single display apparatus having the display screen with the first diagonal length and the plurality of display apparatuses having the display screen with the second diagonal length.

The control unit may output the first synchronized content to the single display apparatus having the same diagonal length and being coupled to the touch panel capable of detecting touch and the remaining display apparatuses positioned an one-dimensional array of 1×N in one direction with respect to the single display apparatus, and change the first content into a second synchronized content in response to the user's approach detected by the proximity sensor to thereby output the second content to the plurality of display apparatuses.

The control unit may output the first synchronized content to the single display apparatus coupled to the touch panel capable of detecting touch and the display apparatus having the same diagonal length as that of the single display apparatus, and change the first content into the second synchronized content in response to the user's approach detected by the proximity sensor to thereby output the second content to the plurality of display apparatuses.

It will be readily understood by those persons skilled in the art that the configuration and operation of the control unit may be implemented in various ways according to embodiments of the present invention.

The communication unit 120 may connect the electronic apparatus 100 with an external apparatus in accordance with control by the control unit. The control unit may perform downloading or web-browsing on applications from the external apparatus connected through the communication unit 120.

In the embodiment of the present invention, the portable apparatus 200 may be connected with the electronic apparatus 100 through the communication unit 120. The communication unit 120 may receive signals corresponding to remote control from the portable apparatus 200 in accordance with control by the control unit.

The communication unit 120 may include one of a wired Ethernet 121, a wireless local area network (wireless LAN) 122, and a short distance communication unit 123 in accordance with performance and a structure of the electronic apparatus 100. The communication unit 120 may include a combination of the wired Ethernet 121, the wireless LAN 122, and the short distance communication unit 123. The wireless LAN 122 may be wirelessly connected to an access point (AP) in a place where the AP (not shown) is provided, in accordance with control by the control unit. The wireless LAN 122 supports the wireless LAN standard (IEEE802.11x) of the Institute of Electrical and Electronics Engineers (IEEE). The short distance communication unit 123 may include Bluetooth, Bluetooth low energy, infrared data association (IrDA), ultra wideband (UWB), near field communication (NFC), or the like.

The input/output unit 130 may connect the electronic apparatus 100 to the external apparatus in accordance with control by the control unit.

The input/output unit 130 may receive signals corresponding to user's approach (for example, from the proximity sensor 220) and/or user touch (for example, from the touch panel 240) from the external apparatus in accordance with control by the control unit.

The input/output unit 130 may output contents corresponding to the user's approach and/or the user touch to the LFD apparatus 260 and the projector 280 in accordance with the control by the control unit. The input/output unit 130 may output contents corresponding to the user's approach and/or the user touch to the plurality of LFD apparatuses 260 and the SFD apparatus 290 in accordance with the control by the control unit. In addition, the input/output unit 130 may output the content corresponding to the user's approach and/or touch in accordance with control of the control unit, to the plurality of display apparatuses 260.

The input/output unit 130 may output audio (for example, voice or sound) corresponding to the content output to the external apparatus in accordance with the control by the control unit. In addition, the input/output unit 130 may output a UI of a CMS application to the display unit 180 in accordance with the control by the control unit.

The input/output unit 130 may include a high-definition multimedia interface (HDMI) port 131, a display port 132, a digital video interface (DVI) port 133, a D-subminiature (D-sub) port 134, an unshielded twisted pair (UTP) cable port 135, a USB jack 136, and an audio out port 137. The audio out port 137 may output audio to a speaker (not shown) or a headphone (not shown).

The input/output unit 130 according to the embodiment of the present invention may output visual feedback corresponding to the output of the content to the LFD apparatus 260 and the projector 280, the LFD apparatus 260 and the SFD apparatus 290, or the plurality of LFD apparatuses 260 in accordance with the control by the control unit. The input/output unit 130 according to the embodiment of the present invention may output audio feedback corresponding to the output of the content to the speaker in accordance with the control by the control unit.

At least one component may be added to or deleted from the components (for example, 131 to 137) shown in the input/output unit 130 in response to the performance of the electronic apparatus 100. In addition, it will be readily understood by those persons skilled in the art that positions (for example, 131 to 137) of the components may be changed to correspond to the performance or structure of the electronic apparatus 100.

The storage unit 140 may store a variety of data, programs, or applications which are used for driving and controlling the electronic apparatus 100 in accordance with the control by the control unit. The storage unit 140 may store input/output signals or data corresponding to driving each of the communication unit 120, the input/output unit 130, and the power unit 150.

The storage unit 140 may store control programs capable of controlling the electronic apparatus 100 and the control unit, dedicated applications initially provided from a manufacturer, general-purpose applications downloaded externally, UI related applications, objects (for example, an image, text, an icon, a button, etc.) capable of providing UI, user information, documents, databases, or related data.

The "storage unit" in the embodiment of the present invention may be used as the term including the storage unit 140, the ROM 112 of the control unit, the RAM 113, or a memory card (for example, a micro SD card or USB memory, not shown) mounted in the electronic apparatus 100. In addition, the storage unit may include a nonvolatile memory, a volatile memory, a hard disk drive (HDD), or a solid state drive (SSD).

The storage unit may include a communication module, an input/output module, a storage module, a power module, a display control module, a portable apparatus module, a proximity sensor module, a touch panel module, a related database (DB), or the like, which is not shown. The unshown modules and DB of the storage unit may be implemented in the form of hardware or software in order to perform a communication control function, an input/output control function, a display control function, a portable apparatus control function, a proximity sensor control function, a touch panel control function, a storage control function, a power control function, or a related DB control function in the electronic apparatus 100. The control unit may control the electronic apparatus 100 using the respective modules and software stored in the storage unit. In addition, the control unit may control the portable apparatus 200 connected to the electronic apparatus 100, the proximity sensor 220, the touch panel 240, the LFD apparatus 260, or the projector 280 using the modules and software stored in the storage unit.

The storage unit may store contents. For example, the storage unit may store idle videos, hooking videos, product videos, a hooking UI, or a product UI corresponding to the content. The storage unit may store content including moving pictures, images, text, or web documents.

The storage unit may store user's approach information detected by the proximity sensor 220 in accordance with the control by the control unit.

The storage unit may store position information of a plurality of touch operations corresponding to the touch (for example, first to seventh touch operations) detected by the touch panel 240 in accordance with the control by the control unit.

The storage unit may store position information of consecutive touch operations corresponding to consecutive movements of the touch detected by the touch panel 240 in accordance with the control by the control unit.

The power unit 150 supplies a power source input from the external power source to the internal components 110 to 140 of the electronic apparatus 100 in accordance with the control by the control unit. In addition, the power unit 150 may supply the power source to one or more batteries (not shown) positioned inside the electronic apparatus 100 in accordance with the control by the control unit.

Referring to FIG. 2B, most of the components may be the same as those shown in FIG. 2A. The projector 280 of FIG. 2A may be changed to the SFD apparatus 290 which has a size smaller than the LFD apparatus 260.

The control unit may output a synchronized content to the LFD apparatus 260 and the SFD apparatuses 290*a* to 290*h*.

The synchronized content in FIG. 2A corresponds to the LFD apparatus 260 and the projector 280. The synchronized content in FIG. 2B may correspond to the LFD apparatus 260 and the SFD apparatus 290, and include the synchronized content output to the SFD apparatuses 290 by corresponding to the number of the SFD apparatuses 290.

The control unit may divide and synchronize contents in accordance with the number of the plurality of SFD apparatuses 290 through the input/output unit 130 using an installed multiple display control (MDC, not shown) application to thereby transmit the divided and synchronized contents. For example, when the number of SFD apparatuses 290 is 4, the content output to the SFD apparatus 290 may be divided into 4 synchronized contents. When the number of SFD apparatuses 290 is 6, the content may be divided into 6 synchronized contents. In addition, when the number of SFD apparatuses 290 is 8, the content may be divided into 8 synchronized contents.

The control unit may control various environmental settings such as contrast, brightness, sharpness, color control, and the like with respect to the content output by a user's input in the MDC application.

The SFD apparatus 290 may be positioned in various arrays in the left direction and the right direction with respect to the LFD apparatus 260. For example, the SFD display apparatuses 290 may be positioned in a two-dimensional left array (2×1 array) and a two-dimensional right array (2×1 array) with respect to the LFD display apparatus 260. The SFD apparatus 290 may be positioned in a two-dimensional left array (2×2 array) and a two-dimensional right array (2×2 array) with respect to the LFD apparatus 260, for example. In addition, the SFD apparatus 290 may be positioned in a two-dimensional left array (2×1 array) and a two-dimensional right array (2×3) array with respect to the LFD apparatus 260, for example. It will be readily understood by those persons skilled in the art that the SFD apparatuses 290 are not limited to the above-described arrays, and may be positioned in various arrays with respect to the LFD apparatus 260.

In addition, the projector 280 of FIG. 2A may be changed to another LFD apparatus (see FIG. 1D) having the same screen size as that of the LFD apparatus 260. The control unit may output the synchronized content to the plurality of LFD apparatuses 260. The synchronized content corresponds to the LFD apparatus 260a and other LFD apparatuses 260b and 260c and corresponds to the number of the other LFD apparatuses 260b and 260c, and thereby includes the synchronized content output to the other LFD apparatuses 260b and 260c.

The control unit may divide and synchronize the contents in accordance with the number of the plurality of LFD apparatuses through the input/output unit 130 using an installed MDC application to thereby transmit the divided and synchronized contents. For example, when the number of the other LFD apparatuses is 2, the contents output to the other LFD apparatuses may be divided into 2 synchronized contents. When the number of the other LFD apparatuses is 3, the contents may be divided into 3 synchronized contents.

The control unit may control various environmental settings such as contrast, brightness, sharpness, color control, and the like with respect to the contents output by the user's input in the MDC application.

Other LFD display apparatuses may be positioned in one direction of the left direction and the right direction with respect to the LFD apparatus 260a. For example, the other LFD apparatuses may be positioned in one-dimensional 1×2 array (for example, 260a and 260b array or 260b and 260a array), 1×3 array (for example, 260a, 260b, and 260c array, or 260b 260a, and 260c array) or 1×4 array (for example, 260a, 260b, 260c, and 260d array, or 260b 260a, 260c, and 260d array) in the left direction or the right direction with respect to the LFD apparatus 260a. It will be readily understood by those persons skilled in the art that the LFD apparatuses are not limited to the above-described arrays, and may be positioned in various arrays with respect to the LFD apparatus 260a.

Most of components of FIG. 2B may be substantially the same as those of FIG. 2A and repeated description thereof will be omitted.

At least one component may be added to or deleted from the components (for example, 110 to 150) shown in the electronic apparatus 100 of FIGS. 2A and 2B in response to the performance of the electronic apparatus 100. In addition, it will be readily understood by those persons skilled in the art that positions (for example, 110 to 150) of the components may be changed to correspond to the performance or structure of the electronic apparatus 100.

Figure 3A:
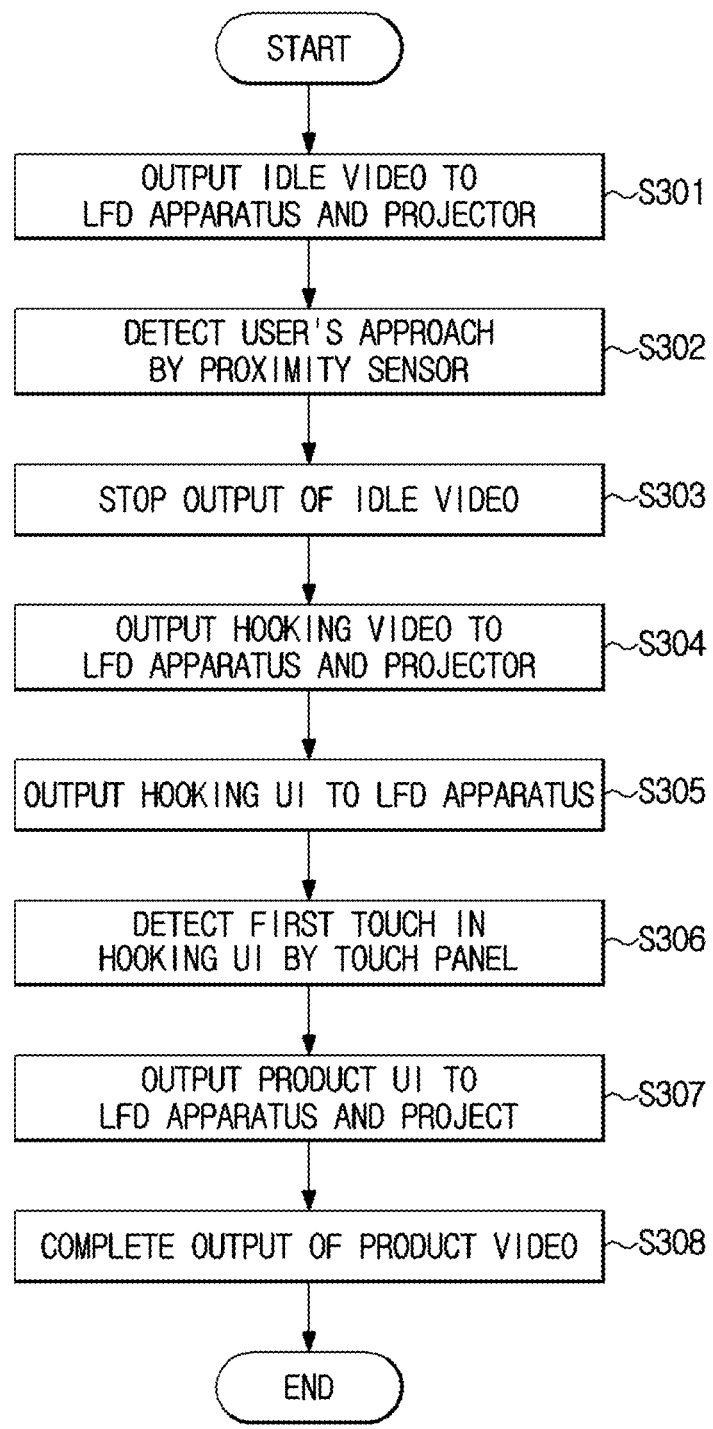
Figure 3B:
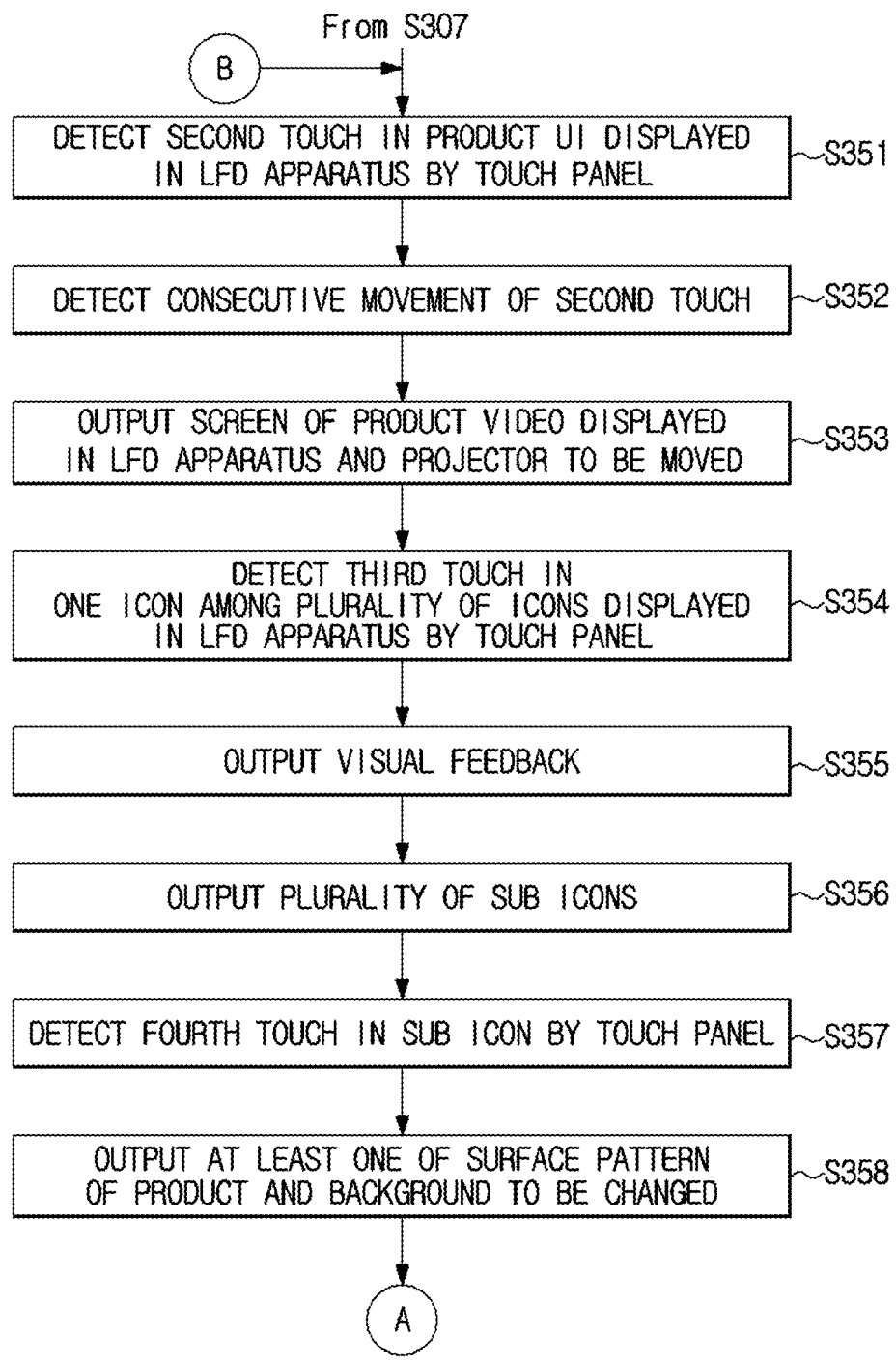

FIGS. 3A to 3C are schematic flowcharts illustrating a method of displaying a screen of an electronic apparatus in accordance with one embodiment of the present invention. In the embodiments of the present invention, "FIG. 3" may be used as the term including FIGS. 3A to 3C.

FIGS. 4 to 6 are diagrams illustrating an example of a screen output in an electronic apparatus in accordance with an embodiment of the present invention.

In operation S301 of FIG. 3A, an idle video 300 is output to the LFD apparatus and the projector.

Figure 4A:
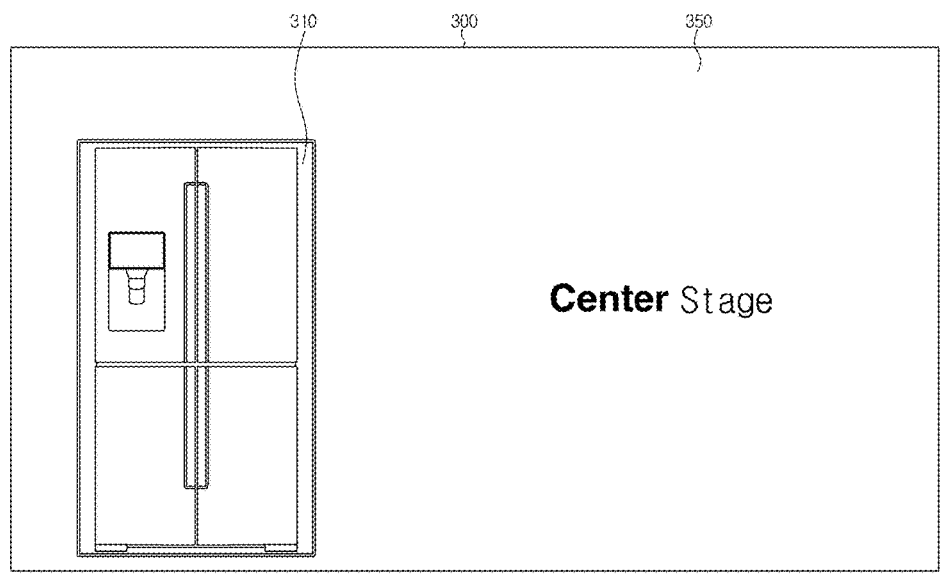
FIGS. 4A to 4J, 5A to 5Z, 5AA to 5AD, 6A to 6J are diagrams illustrating an example of a screen output in an electronic apparatus in accordance with an embodiment of the present invention.

In FIG. 4A, the idle video 300 output from the LFD apparatus 260 and the projector 280 is displayed. The idle video 300 may be output in an idle state in which a user does not approach or does not touch during booting of the electronic apparatus 100 for a determined time (for example, one minute which is changeable).

A first screen (for example, home screen) of the idle video 300 may be displayed on the screen 10 and the LFD apparatus 260 by the control by the control unit. The idle video 300 may include an idle video 310 output from the LFD apparatus 260 and an idle video 350 output from the projector 280 to be displayed on the screen 10. When the reproduction of the output idle video 300 is completed, the control unit may display first screens 310 and 350 and repeatedly reproduce the idle video 300.

The control unit outputs the synchronized idle video 300 to the LFD apparatus 260 and the projector 280. In addition, the control unit may output the idle video 300 into the LFD apparatus 260 and the projector 280. The idle video 300 output from the electronic apparatus 100 may be a 4K-resolution video 310 and a 2K-resolution video 350. The synchronized idle video 300 may include screens displayed in FIGS. 4A to 4J which are output from the LFD apparatus 260 and the projector 280. The synchronized idle video 300 may include the idle videos 310 to 312 output from the LFD apparatus 260 and the idle videos 350 to 353 output from the projector 280.

The control unit may output an idle image (not shown) which is a still image to the LFD apparatus 260 and the projector 280. The idle image may be a synchronized 4K-resolution image (not shown) and 2K-resolution image (not shown). When the electronic apparatus 100 and the components 220 to 280 are connected, the control unit may output an idle web document (not shown) to the LFD apparatus 260 and the projector 280. The idle web document may be a synchronized 4K-resolution image and 2K-resolution image The idle video 300 may be constituted of the idle video and the idle image together. The control unit may output the synchronized idle video or idle image to the LFD apparatus 260, and output the other one to the projector 280. The content output to the LFD apparatus 260 may be a 4K-resolution content, and the content output to the projector 280 may be a 2K-resolution content.

Figure 4B:
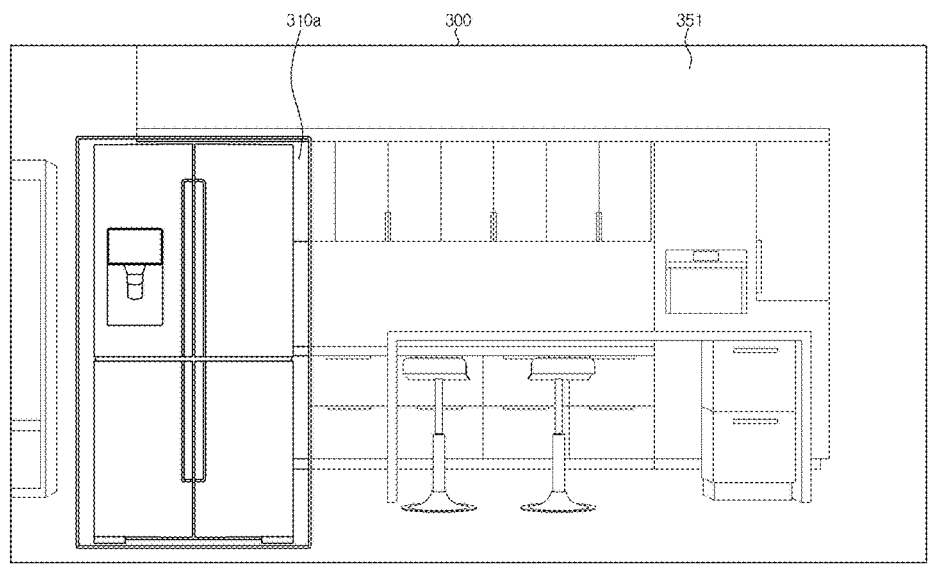

Referring to FIG. 4B, the synchronized idle video output from the LFD apparatus 260 and the projector 280 may be changed in accordance with the reproduced idle video 300. In FIG. 4B, the control unit outputs the reproduced idle videos 310a and 351 to the LFD apparatus 260 and the projector 280. The synchronized idle videos 310a and 351 are displayed on the LFD apparatus 260 and the screen 10.

The screen size of the idle video 310a displayed on the LFD apparatus 260 may be smaller than the size of the screen of the idle video 351 output from the projector 280.

The changed idle videos 310a and 351 may correspond to a kitchen in the home where a product (for example, a refrigerator) displayed on the LFD apparatus 260 is positioned. The "change of the idle video" may be used as the term including a change (or conversion) in the screen included in the idle video. The changed idle video may correspond to a laundry room in the home where a product (for example, a washing machine) displayed on the LFD apparatus 260 is positioned.

Figure 4C:
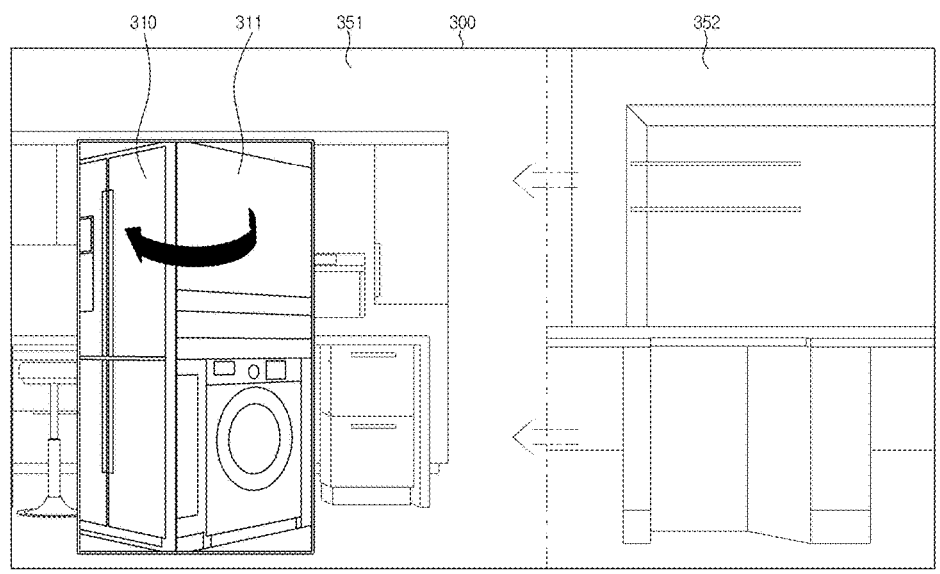
Figure 4D:
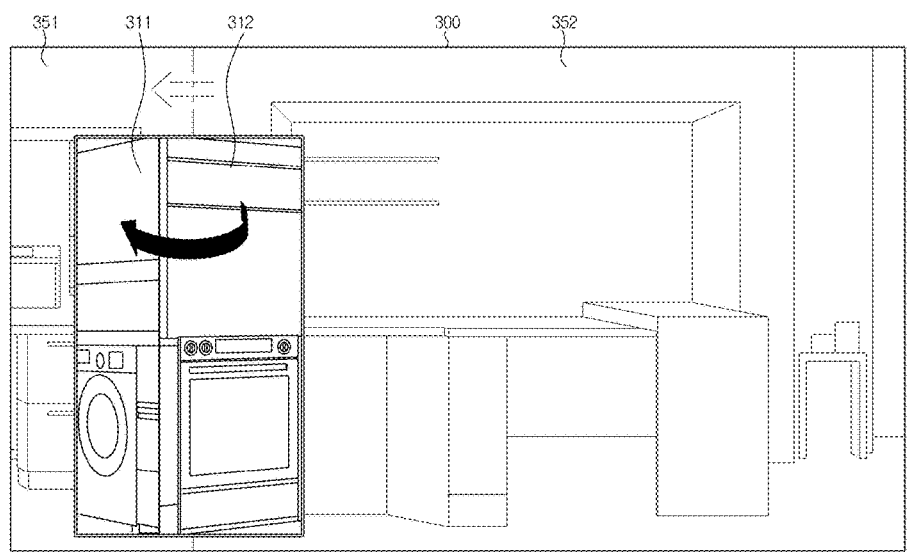
Figure 4E:
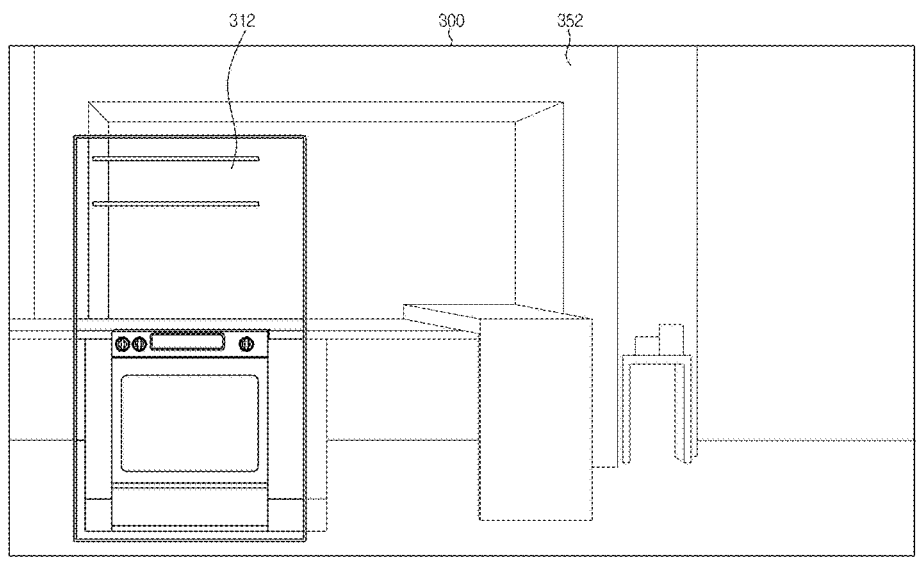

Referring to FIGS. 4C to 4E, as the idle video 300 is reproduced, the synchronized idle videos output from the LFD apparatus 260 and the projector 280 may be changed. The control unit may output the product displayed on the LFD apparatus 260 in such a manner that the product can be changed (for example, a refrigerator 310→a washing machine 311→an electric range 312). The changed idle video 310a may correspond to the change of the product displayed on the LFD apparatus 260.

The control unit may output visual feedback corresponding to the change of the product (310 ->312) in the LFD apparatus 260. The visual feedback may include rotation in the left direction or rotation in the right direction with respect to the product 310. In addition, the visual feedback may include effects such as fading, dissolving, wiping, pushing, covering, and arbitrary effects.

In addition, the control unit may output the product displayed on the LFD apparatus 260 so as to be changed directly to the electric range 312, not via the refrigerator 310.

The control unit may output the changed idle video 352 to the projector 280 in accordance with the change of the product in the LFD apparatus 260. The changed idle video 352 may correspond to a kitchen in the home where the product (for example, electric range) is positioned.

The control unit may output visual feedback corresponding to the changed idle video 352 in the projector 280. The visual feedback may include fading in the right direction or fading in the right direction. In addition, the visual feedback may include effects such as dissolving, wiping, pushing, covering, or arbitrary effects.

When the change of the product is completed (for example, the electric range is displayed) in the LFD apparatus 260, the control unit may complete the visual feedback corresponding to the changed idle video 352 in the projector 280. In addition, the completion time of the product changed in the LFD apparatus 260 may have a degree of margin of approximately ±1 seconds compared to the completion time of the visual feedback corresponding to the changed idle video output from the projector 280.

The number (3, for example, 310→311→312) of products output from the LFD apparatus 260 may be different from the number of the changed idle videos (2, 351→352) output from the projector 280. In addition, the number (2, for example, 310→312) of the products displayed on the LFD apparatus 260 and the number of the changed idle videos (2, 351→352) output from the projector 280 may be the same.

The actual size of the product (for example, electric range) displayed on the LFD apparatus 260 may be smaller than the actual size of the LFD apparatus 260 (for example, 50% or less).

Figure 4F:
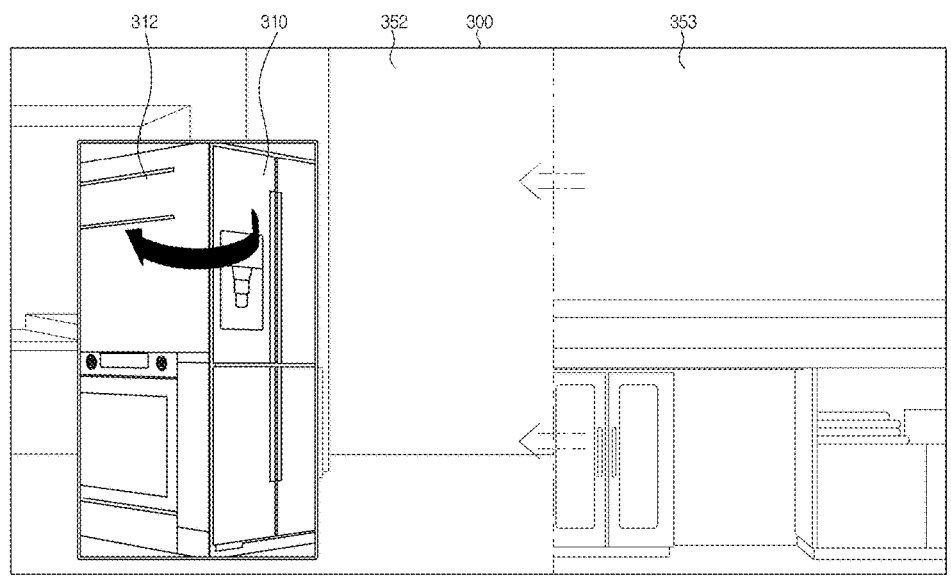
Figure 4G:
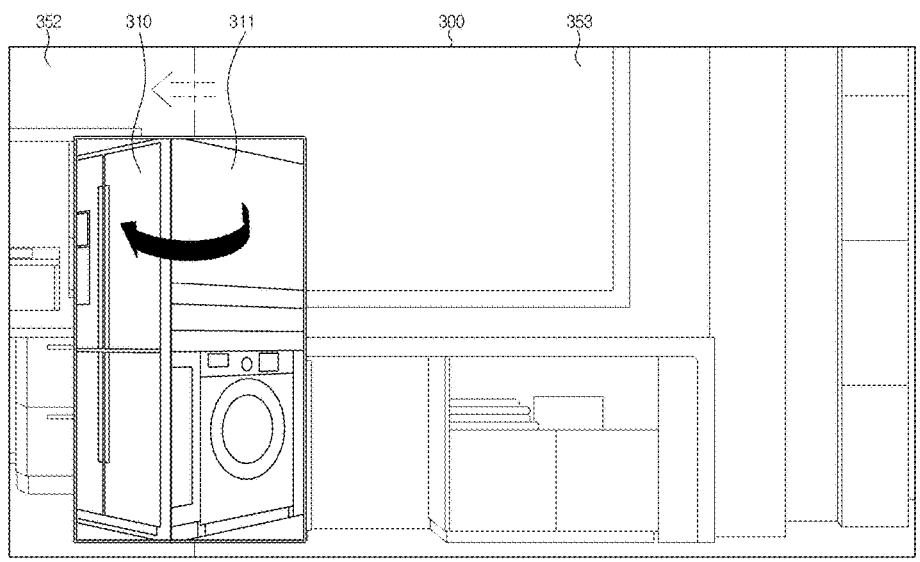
Figure 4H:
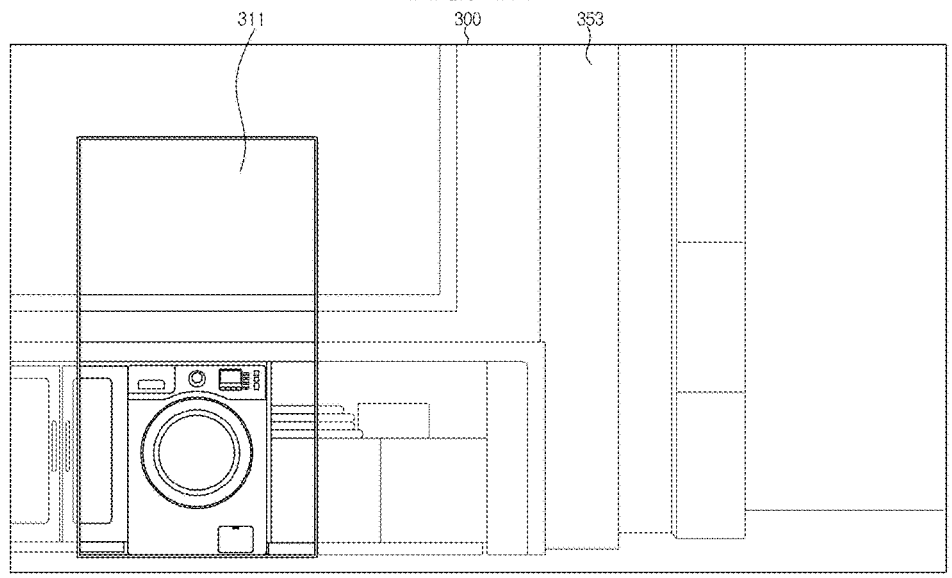

Referring to FIGS. 4F and 4H, in the similar manner as in FIGS. 4C to 4E, the synchronized idle videos output from each of the LFD apparatus 260 and the projector 280 may be changed. The control unit may output the product displayed on the LFD apparatus 260 so as to be changed (for example, electric range 312→refrigerator 310→washing machine 311).

The control unit may output visual feedback (for example, rotation in the left direction or rotation in the right direction with respect to the product) corresponding to the product change in the LFD apparatus 260. In addition, the control unit may output the product displayed on the LFD apparatus 260 so as to be changed from the electric range 312 directly to the washing machine 311.

The control unit may output the changed idle video 353 to the projector 280 in accordance with the product change in the LFD apparatus 260. The changed idle video 353 may correspond to the washing machine in the home where the product (for example, the washing machine) is positioned.

The control unit may output visual feedback corresponding to the changed idle video 353 in the projector 280. The visual feedback may include fading in the left direction or fading in the right direction.

The actual size of the product (for example, washing machine) displayed on the LFD apparatus 260 may be smaller than the actual size of the LFD apparatus 260 (for example, 50% or less).

The change in the idle video of FIGS. 4F to 4H may be substantially the same as the changed in the idle video of FIGS. 4C to 4E, and thus repeated descriptions thereof will be omitted.

Figure 4I:
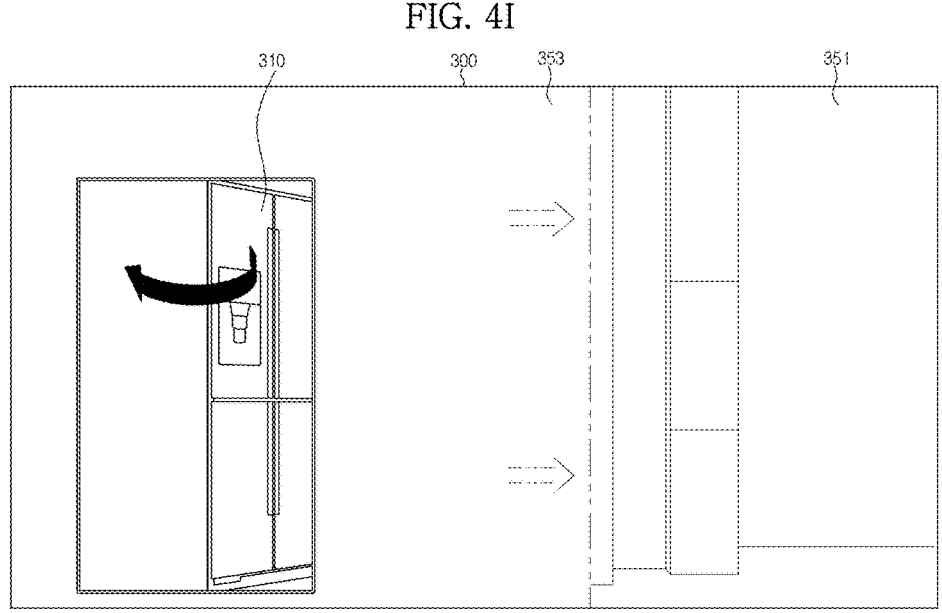
Figure 4J:
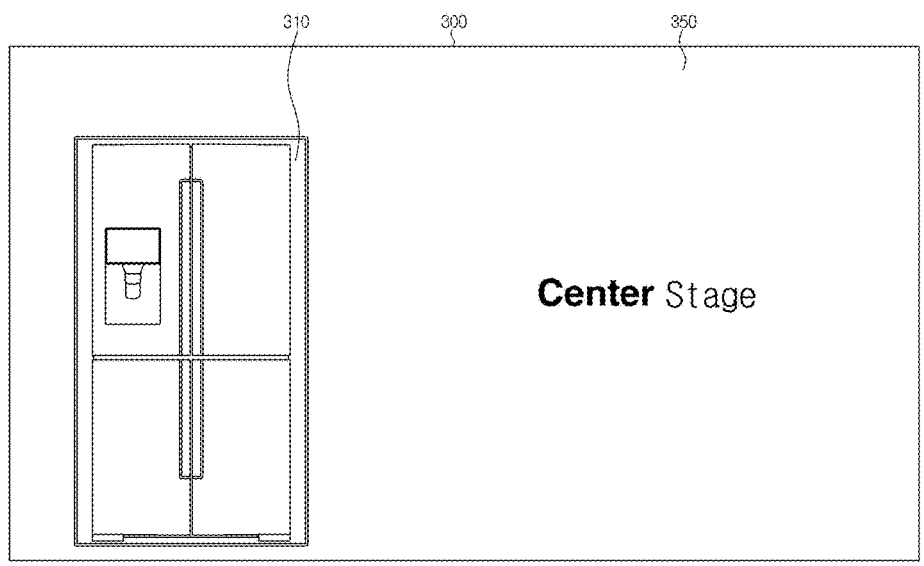

Referring to FIGS. 4I and 4J, in the similar manner as in FIGS. 4C and 4E, the idle video output from each of the LFD apparatuses 260 and the projector 280 is changed. The control unit outputs the product displayed on the LFD apparatus 260 so as to be changed (for example, washing machine 311→refrigerator 310). The control unit may output visual feedback corresponding to the product change in the LFD apparatus (for example, rotation in the left direction or rotation in the right direction with respect to the product).

The control unit may output the changed idle video 350 to the projector 280 in accordance with the product changed in the LFD apparatus 260. The changed idle video 350 may correspond to the kitchen in the home where the product (for example, the refrigerator) is positioned.

The control unit may output visual feedback corresponding to the changed idle video 350 in the projector 280. The visual feedback may include fading in the left direction or fading in the right direction.

The change in the idle video of FIGS. 4I and 4J may the substantially the same as the change in the idle video of FIGS. 4C and 4E, and thus repeated descriptions thereof will be omitted.

When a user does not approach the screen 10, the control unit may repeatedly reproduce the idle video output to the LFD apparatus 260 and the projector 280.

As the number of the products displayed on the LFD apparatus 260 is increased, the number of times of change in the screen of the synchronized idle video output from the LFD apparatus 260 may be increased. The number of times of change in the screen of the synchronized idle video output from the projector 280 may be also increased in response to the number of the products displayed on the LFD apparatus 260. In addition, as the number of the products displayed on the LFD apparatus 260 is increased, the entire reproduction time of the synchronized idle video output from the LFD apparatus 260 and the projector 280 may be increased.

In operation S302 of FIG. 3A, user's approach is detected by the proximity sensor.

The user approaches the screen 10. The proximity sensor 220 detects the user's approach to the screen 10 as non-contact or contact. The proximity sensor 220 may transmit analog signals or digital signals corresponding to the user's approach to the control unit.

The control unit may receive signals transmitted from the proximity sensor 220 through the input/output unit 130. The control unit may store the user's approach information corresponding to the user's approach in the storage unit. The stored user's approach information may include an identification (ID) for history management, a detection time of the user's approach, a sensor ID that detects the user's approach (for example, a plurality of sensor IDs when the plurality of proximity sensors are provided).

In operation S303 of FIG. 3A, the output of the idle video is stopped.

Figure 5A:
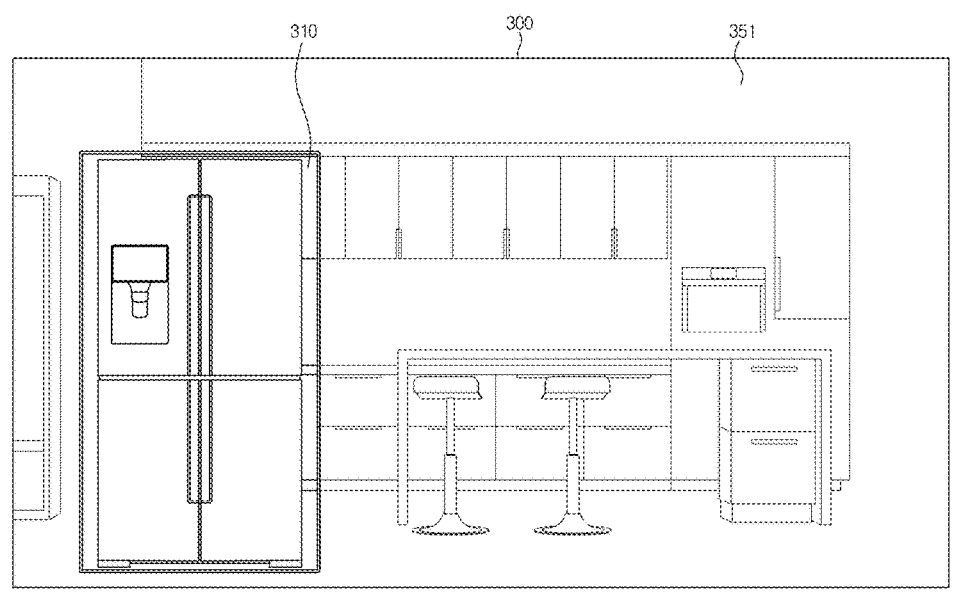

Referring to FIG. 5A, the output of the idle video is stopped in the LFD apparatus 260 and the projector 280.

When the user's approach is detected while the idle video 300 is output (for example, FIGS. 4A to 4J), the control unit stops the output of the idle video 300 output to the LFD apparatus 260 and the projector 280. In addition, when the user's approach is detected while the idle video 300 is output (for example, FIGS. 4A to 4J), the control unit may stop the output of the idle video 300 output to one of the LFD apparatus 260 and the projector 280. For example, the control unit may stop both the idle video output to one of the LFD apparatus 260 and the projector 280 and the idle video output to the LFD apparatus 260 and the projector 280.

In operation S304 of FIG. 3A, a hooking video is output to the LFD apparatus and the projector.

Figure 5B:
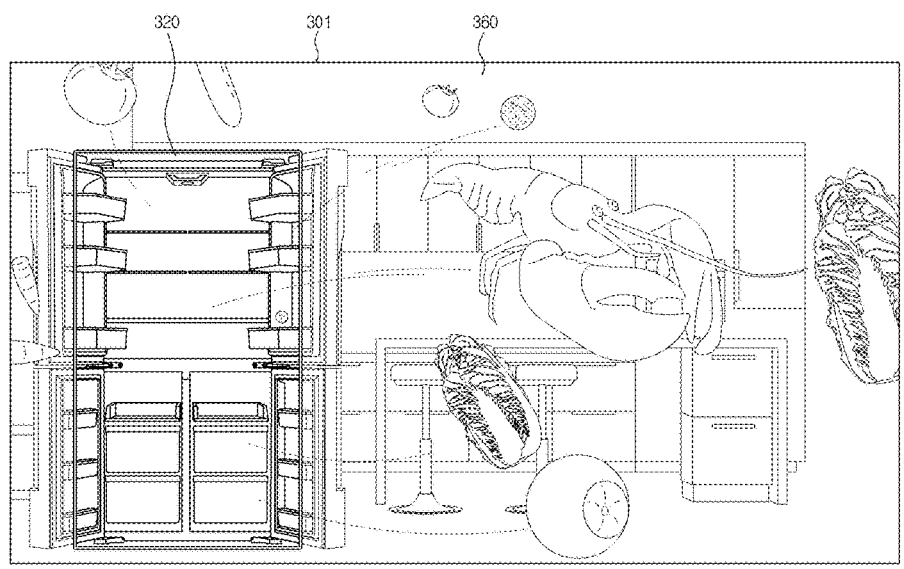
Figure 5C:
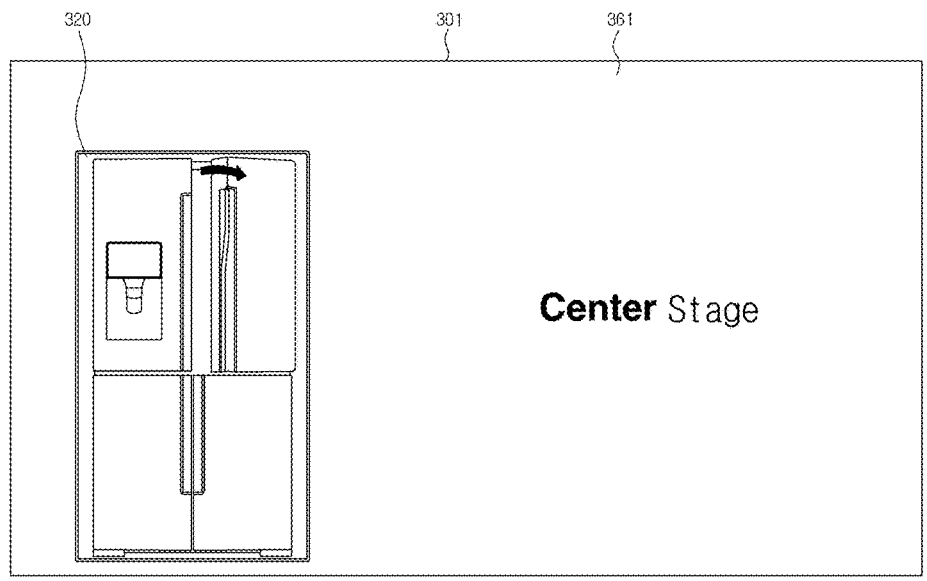

Referring to FIGS. 5B and 5C, a hooking video 301 is output through the LFD apparatus 260 and the projector 280. The control unit outputs the hooking video 301 to the LFD apparatus 260 and the projector 280 in response to the user's approach. The hooking video 301 may include a hooking video 320 output from the LFD apparatus 260 and hooking videos 360 and 361 output from the projector 280. The screen size of the hooking video 320 displayed on the LFD apparatus 260 may be smaller than the screen size of each of the hooking videos 360 and 351 output from the projector 280.

The hooking video 301 may be output from the LFD apparatus 260 and the projector 280 in such a manner that various food material, vegetables, fruits, and the like are sucked into a storage space of the product (for example, the refrigerator with all its doors opened) displayed on the LFD apparatus 260 while looking as if they are sucked into a vortex. The doors of the refrigerator into which the various food materials, vegetables, or fruits are all sucked are all closed and then at least one of the doors may be slightly opened. The slight opening of the upper right door of the refrigerator means that the output of the hooking video 301 is completed. In addition, when the slight opening of the upper right door of the refrigerator is output and "center stage" is output from the projector 280, it means that the output of the hooking video 301 is completed. In addition, when the doors of the refrigerator are all closed as shown in FIG. 4J, the output of the hooking video 301 may be completed.

It will be readily understood by those persons skilled in the art that various hooking videos (for example, sudden disappearing and the like) as well as the hooking video 301 which is sucked into the vortex may be displayed. The user who approaches the screen 10 may have interest in and fun with the product by the displayed hooking video 301.

The hooking video 301 may be distinct from the idle video 300 shown in FIGS. 4A to 4j. The idle video is a video output in a standby state which is an idle stage, and the hooking video 301 is a video output in an intermediate stage from the idle stage to a product stage.

The content output from the electronic apparatus 100 may be classified into 3 stages. The 3 stages may include an idle stage (not shown), a hooking stage (not shown), and a product stage (not shown).

In addition, one stage may include 3 layers. The 3 layers may be an interaction layer (not shown) corresponding to the user's touch, a player layer (not shown) corresponding to content output, and a sensor and UI layer (not shown) corresponding to the user's approach. One or two layers may be activated in the single stage. In addition, the 3 layers may be all activated in the single stage.

In the idle stage which is the first stage, only the player layer that is the top layer in the idle stage is activated. The player layer may output the idle video 300 to the LFD apparatus 260 and the projector 280 in accordance with the control by the control unit.

When the user's approach is detected by the proximity sensor 220, the idle stage is changed to the hooking stage which is the second stage. In the hooking stage, the player layer which outputs the hooking video and the sensor and UI layer which receives a user's input are respectively activated. In the hooking stage, the sensor and UI layer is changed to the top layer overlapping the player layer to be displayed in accordance with the control by the control unit.

The sensor and UI layer may include a hooking UI for user's input (for example, touch or hovering). The hooking UI may include icons, buttons, images, or text. The size (horizontal length X vertical length) of the hooking UI of the sensor and UI layer may be the same as the size (horizontal length X vertical length) of the hooking video output from the player layer. In addition, the coordinate origin (0, 0) the hooking UI of the sensor and UI layer may be the same as the coordinate origin (0, 0) of the hooking video output from the player layer. A margin except an icon area, a button area, an image area, or a text area included in the hooking UI may be transparently displayed.

When a user's input is detected by the hooking UI, the hooking stage is changed to the product stage which is the third stage in accordance with the control by the control unit. In the product stage, the interaction layer which displays the product UI and the player layer which displays the product video are activated. In the product stage, the interaction layer is changed to the top layer overlapping the player layer in accordance with the control by the control unit. The interaction layer may include a product UI for the user's input (for example, touch or hovering). The product UI may include icons, buttons, images, or text. The size (horizontal length X vertical length) of the product UI from the product layer may be the same as the size (horizontal length X vertical length) of the product video output from the player layer. In addition, the coordinate origin (0, 0) of the product UI layer may be the same as the coordinate origin (0, 0) of the product video output from the player layer. Even in the product UI after operation S304 of FIG. 3A, the coordinate origin (0, 0) of the product UI layer and the coordinate origin (0, 0) of the product video output from the player layer may be implemented as the same. A margin except an icon area, a button area, an image area, or a text area included in the product UI may be transparently displayed.

When a user's input is detected by the icon of the product UI, the control unit may output a product video, corresponding to the icon where the user's input is detected, to the player layer. When the product video is output in the player layer, the player layer is the top layer. When the output of the product video is completed, the interaction layer is changed again to be the top layer in place of the player layer.

When the user's input is not detected within a set time (for example, one minute which is changeable) in the product UI, the control unit may change the product stage to the idle stage. The control unit outputs the idle video in the idle stage.

In operation S305 of FIG. 3A, a hooking UI is output to the LFD apparatus.

Figure 5D:
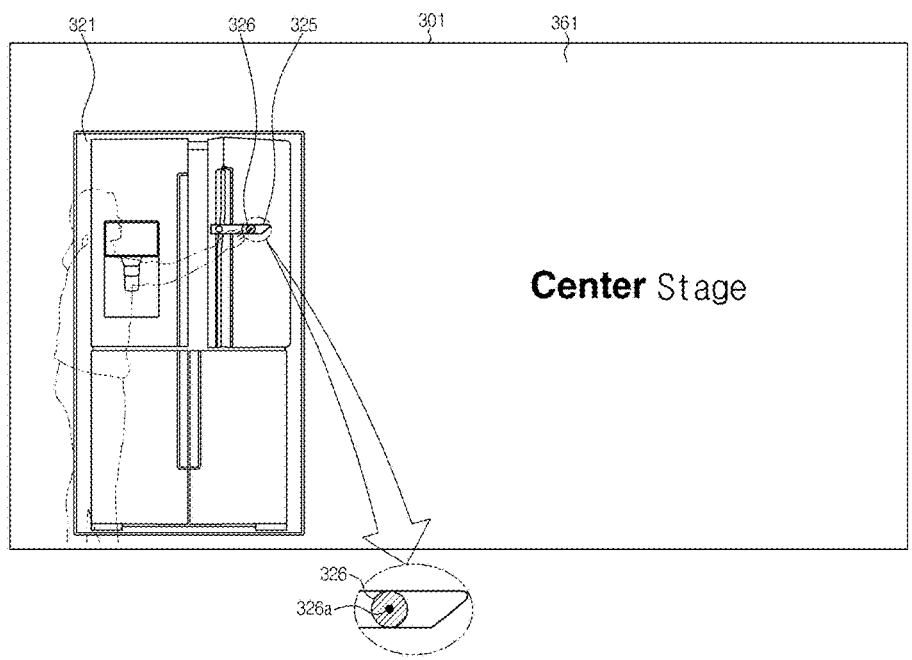

Referring to FIG. 5D, the control unit outputs a hooking UI 321 to the LFD apparatus 260 in response to the detected user's approach.

The hooking UI 321 which is the top layer in the hooking stage may include icons, buttons, images, or text which can receive the user's input. The hooking UI 321 may overlap on the hooking video 301 output in the player layer to be displayed. The hooking UI 321 may include an icon 325 corresponding to "Touch to Start". In the hooking UI 321, a margin except the icon 325 may be transparently displayed. When the interaction layer is displayed, the player layer may be positioned as the lower layer than the interaction layer.

The control unit may output the hooking UI 321 to the LFD apparatus 260 and the projector 280 in response to the detected user's approach.

In operation S306 of FIG. 3A, a first touch is detected in the hooking UI by the touch panel.

Referring to FIG. 5D, a user performs the first touch on the icon 325 displayed on the hooking UI 321. The control unit may detect the first touch 326 using the touch panel 240 and a touch panel controller (not shown). The control unit may receive a first touch position 326a (for example, X1 and Y1 coordinates) corresponding to the first touch 326 from the touch panel controller.

The control unit may store first touch position information corresponding to the first touch position 326a in the storage unit. The stored first touch position information may include an ID for history management, a touch position, a touch detection time, touch information (for example, touch pressure, touch direction, touch duration time, and the like). It will be readily understood by those persons skilled in the art that the first touch position information stored may differ in accordance with a scheme of the touch panel 240.

The first touch 326 may be generated by one of the fingers including the thumb or a touchable input unit. The first touch 326 may include hovering, and may be a single touch or a multi-touch.

In operation S307 of FIG. 3A, the product UI is output to the LFD apparatus and the projector.

Referring to FIG. 5E, the output of the hooking video is stopped in the LFD apparatus 260 and the projector 280.

When the first touch is detected in the hooking UI 321, the control unit outputs a hooking video 322 in which the upper right door of the refrigerator is closed, to the LFD apparatus 260. The control unit stops the output of the hooking video 322 output to the LFD apparatus 260 and the output of a hooking video 361 output to the projector 280.

Figure 5F:
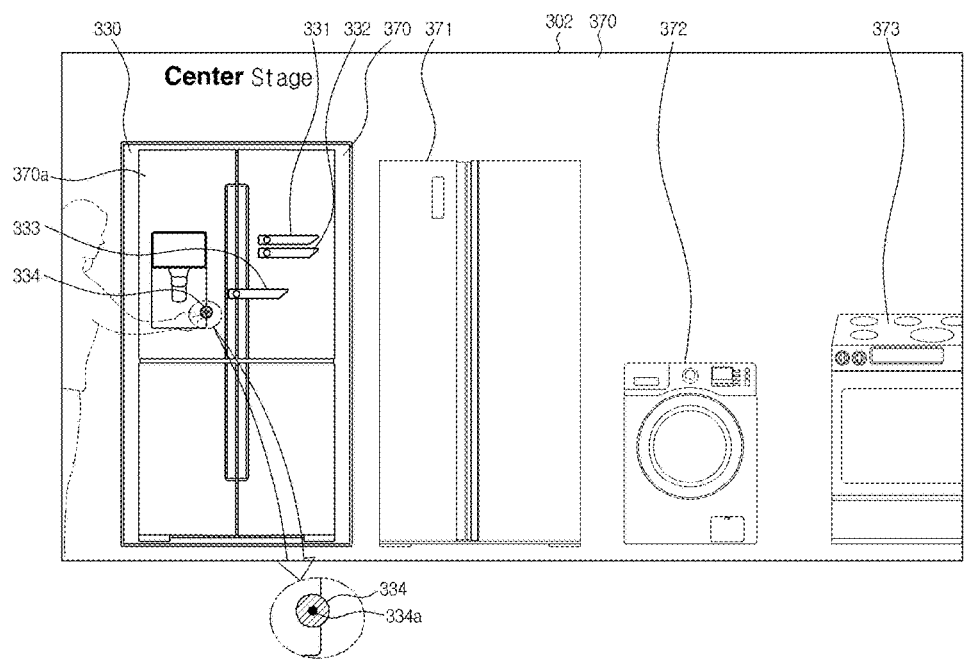

Referring to FIG. 5F, a product video 302 is output through the LFD apparatus 260 and the projector 280. The control unit outputs the product video 302 to the LFD apparatus 260 and the projector 280 in response to the detected first touch 326. The product video 302 may include a product video 370 output from the LFD apparatus 260 and a product video 370 output from the projector 280.

The control unit outputs a product UI 330 to the LFD apparatus 260. The control unit may output the product UI 330 output from the LFD apparatus 260 so as to overlap on the product video 370. The screen size of the product video 370 displayed on the LFD apparatus 260 may be smaller than the size of the screen of the product video 370 output from the projector 280.

The control unit may output the synchronized product video 370 through each of the LFD apparatus 260 and the projector 280. The control unit may output the product video 370 which is synchronized and has a different resolution, to the LFD apparatus 260 and the projector 280. The product video 370 which is synchronized and has the different resolution may be a 4K-resolution video or a 2K-resolution video.

The product UI 330 that is the top layer in the product stage may include icons corresponding to a size 331, a timeless design 332, and see inside 333. A margin except areas of icon 331 to 333 included in the product UI may be transparently displayed.

It will be readily understood by those persons skilled in the art that the number of icons displayed on the product UI 330 and positions of the icons may be changed in accordance with a type and function of the product.

A variety of products which are initially displayed on the LFD apparatus 260 may be provided in the product video 370. For example, the initially displayed products may include a refrigerator 370a, a side-by-side type refrigerator 371, a washing machine 372, and an electric range 373. In addition, the initially displayable products may include other products (for example, air conditioner, vacuum cleaner, air freshener, etc.).

A detailed display method corresponding to operation S307 of FIG. 3A will be described in FIGS. 3B and 3C.

FIGS. 3B and 3C are flowcharts illustrating operation S307 of FIG. 3A.

In operation S351 of FIG. 3B, a second touch is detected in the product UI displayed on the LFD apparatus by the touch panel.

Referring to FIG. 5F, a user performs a second touch 334 on the product UI 330. The user performs the second touch 334 on an area (for example, margin) in which the icons 331 to 333 of the product UI 330 are not present.

The control unit may detect the second touch 334 by the touch panel 240 and the touch panel controller (not shown). The control unit may receive a second touch position 334a (for example, X2 and Y2 coordinates) corresponding to the second touch 334 from the touch panel controller.

The control unit may store second touch position information corresponding to the second touch position 334a in the storage unit. The stored second touch position information may include an ID for history management, a touch position, a touch detection time, and touch information (for example, touch pressure, touch direction, touch duration time, and the like). It will be readily understood by those persons skilled in the art that the second touch position information may differ in accordance with the method of touch panel 240.

The second touch 334 may be generated by one of fingers including the thumb and the touchable input unit. In addition, the second touch 334 may include hovering, and may be a single touch and a multi-touch.

In operation S352 of FIG. 3B, a consecutive movement of the second touch is detected.

Figure 5G:
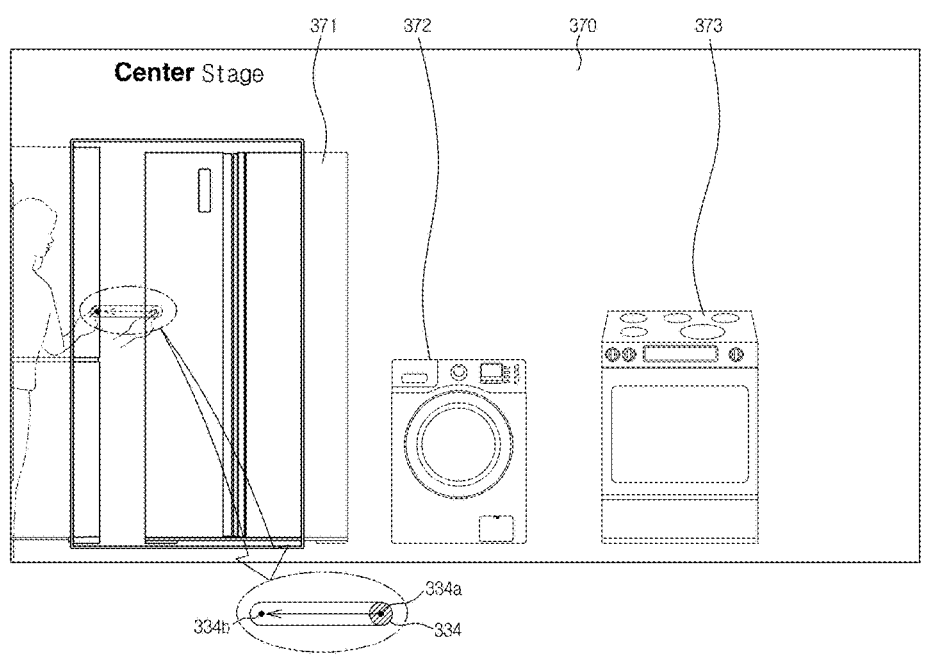

Referring to FIG. 5G, a user inputs the consecutive movement (for example, long press, dragging, swiping, flicking, which are touch gestures) of the second touch in the product UI 330. It will be readily understood by those persons skilled in the art that various gestures (for example, rotation and the like) may be included in the consecutive movement of the second touch. In addition, it will be readily understood by those persons skilled in the art that the consecutive movement of the second touch by the multi-touch may include more various gestures compared to the consecutive movement of the second touch by the single touch.

The control unit may detect the consecutive movement of the second touch 334 by the touch panel 240 and the touch panel controller (not shown). The control unit may receive, by the touch panel controller, from the initial touch position 334a to a final touch position 334b (a plurality of X and Y coordinates corresponding to the consecutive movement of the touch). The touch panel controller may detect more touches up to the final touch position 334b after the initial touch position 334a. For example, the detected touches may be 334a1, 334a2, . . . , and 334b. The final touch position 334b may refer to the final position of the second touch 334 released from the product UI 330.

The control unit may store position information of the consecutive movement of the second touch corresponding to the consecutive movement (334a to 334b) of the second touch in the storage unit. The position information of the consecutive movement of the second touch may include an ID for history management, a consecutive position of the touch, a consecutive touch gesture detection time, or touch gesture information (for example, touch gesture pressure, touch gesture direction, touch gesture duration time, etc.)

In operation S353 of FIG. 3B, a product video screen output from the LFD apparatus and the projector is output so as to be moved.

Figure 5H:
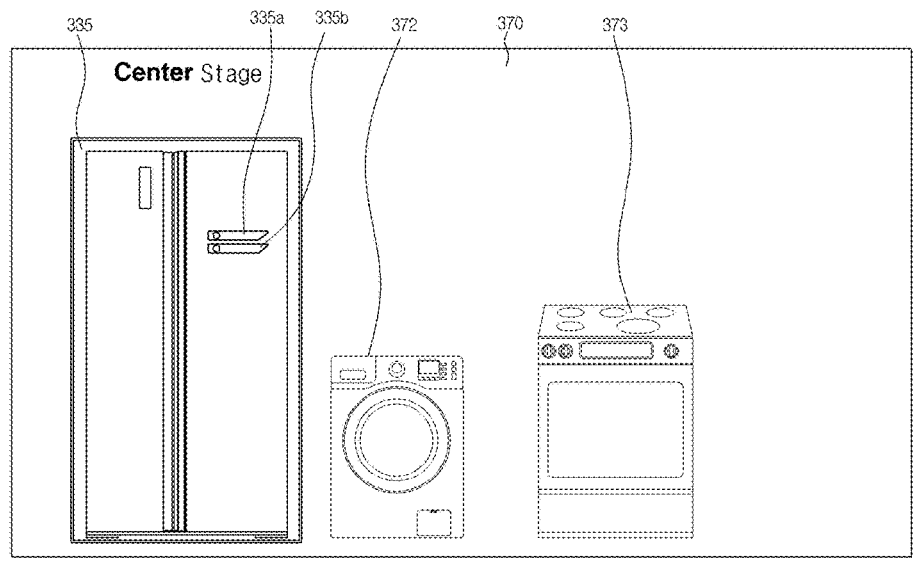
Figure 5I:
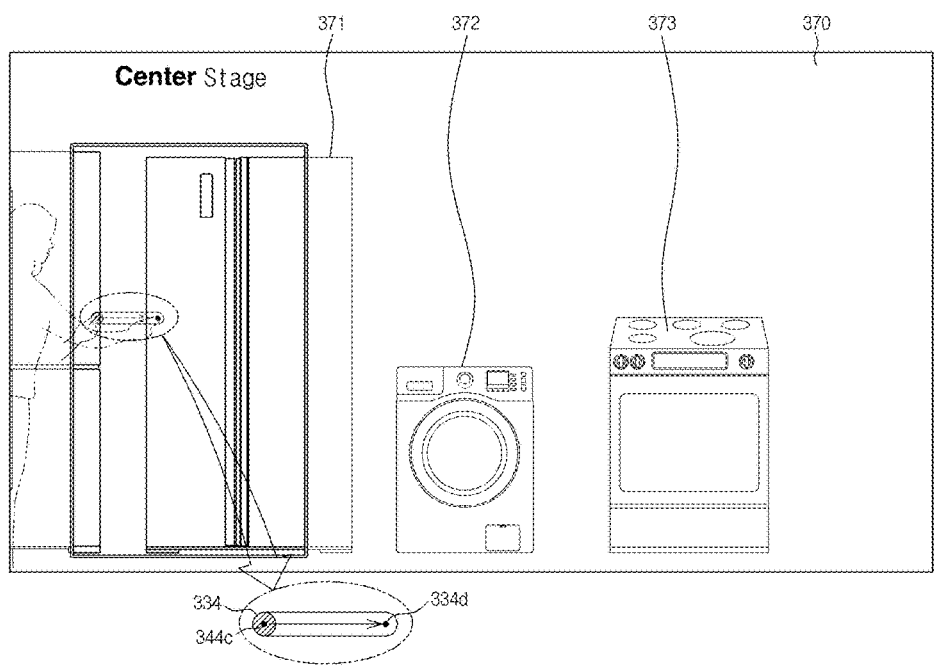

Referring to FIGS. 5G to 5I, a screen of the product video which is moved in the left direction or the right direction in accordance with a movement distance of the consecutive movement of the second touch is output. The control unit may output the screen of the product video which is moved in the left direction or the right direction in accordance with the consecutive movement of the second touch, to the LFD apparatus 260 and projector 280. The control unit may output other products 371 to 373 output from the projector 280 in the LFD apparatus 260 in accordance with the movement distance of the consecutive movement of the second touch.

In addition, when the movement distance of the consecutive movement of the second touch exceeds a set distance (for example, 200 mm), the control unit may output a product (for example, product 371 or 373 output from the projector 280) corresponding to the direction of the consecutive movement of the second touch.

When the screen of the product video is moved in the LFD apparatus 260, the control unit may not output the product UI 330. This may be equally applied to the product UI after operation S353 of FIG. 3 (when the screen of the product video is moved in the LFD apparatus 260, the product UI 330 is not output). In addition, when the screen of the product video is moved in the LFD apparatus 260, the control unit may output the product UI 330. This may be equally applied to the product UI after operation S353 of FIG. 3 (when the screen of the product video is moved in the LFD apparatus 260, the product UI 330 is also output).

Referring to FIG. 5H, when another product (for example, a side-by-side refrigerator) is displayed on the LFD apparatus 260, another product UI 335 is displayed. When the movement of the screen of the product video is completed, the control unit may output another product UI 335, corresponding to the product displayed on the LFD apparatus 260, to the LFD apparatus 260. Another product UI 335 may include icons corresponding to a size 335a and a gallery 335b. A margin except to the areas of icons 331 to 333 included in another product UI 335 may be transparently displayed.

When comparing the product UIs 330 and 335, it may be seen that the number of the icons displayed on the product UI or positions of the icons may be changed in response to a type and a function of the product.

Referring to FIG. 5I, a user inputs a consecutive movement of another second touch in the product UI 330. The control unit may detect the consecutive movement of another second touch 334 using the touch panel 240 and the touch panel controller (not shown). A screen of the product video which is moved in the left direction or the right direction is output in response to the consecutive movement (for example, from the initial touch position 334c to the final touch position 334d) of another second touch is output.

The control unit may output the screen of the product video which is moved in the right direction in response to a movement distance of the consecutive movement of another second touch, to the LFD apparatus 260 and the projector 280. The control unit may output a refrigerator 370a displayed on the left screen 10 of the LFD apparatus 260 to be moved in the LFD apparatus 260 in response to the movement distance of the consecutive movement of another second touch. The control unit may move the side-by-side refrigerator 371 in the right direction to output the moved refrigerator 371 in the projector 280.

When the consecutive movement of the second touch is continuously performed in one direction, the control unit may output the products 310, 371, 372, and 373 to the LFD apparatus 260 and the projector 280 in one direction in a looped manner.

In operation S354 of FIG. 3B, a third touch is detected by one of a plurality of icons displayed on the LFD apparatus by the touch panel.

Figure 5J:
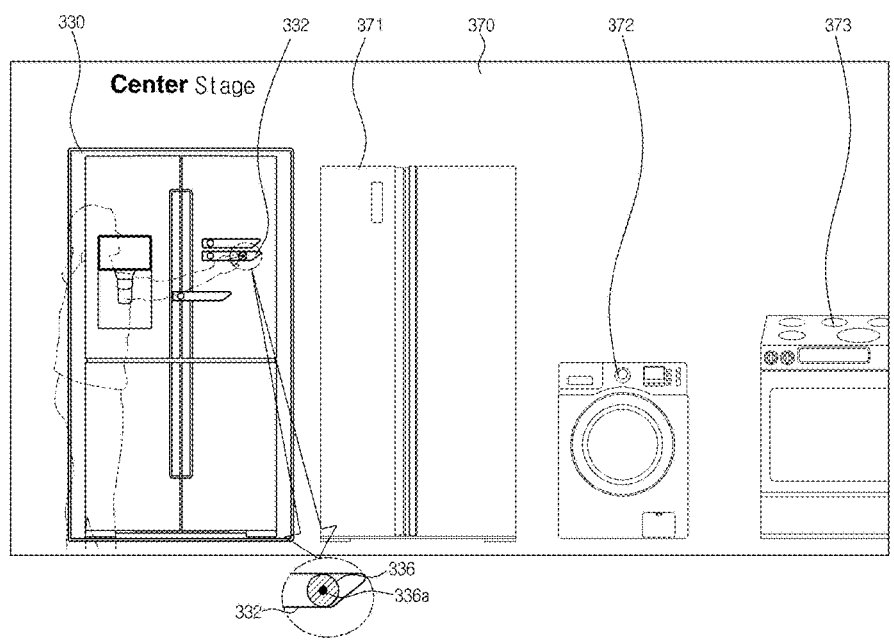

Referring to FIG. 5J, a user performs the third touch 336 on the icon 332 displayed in the product UI 330. The control unit may detect the third touch 336 using the touch panel 240 and the touch panel controller (not shown). The control unit may receive a third touch position 336a (for example, X3 and Y3 coordinates) corresponding to the third touch 336 from the touch panel controller.

The control unit may store third touch position information corresponding to the third touch position 336a in the storage unit. The stored third touch position information may include an ID for history management, a touch position, a touch detection time, and touch information (for example, touch pressure, touch direction, touch duration time, etc.). It will be readily understood by those persons skilled in the art that the stored third touch position information may differ in accordance with the method of the touch panel 240.

In operation S355 of FIG. 3B, visual feedback is output.

Figure 5K:
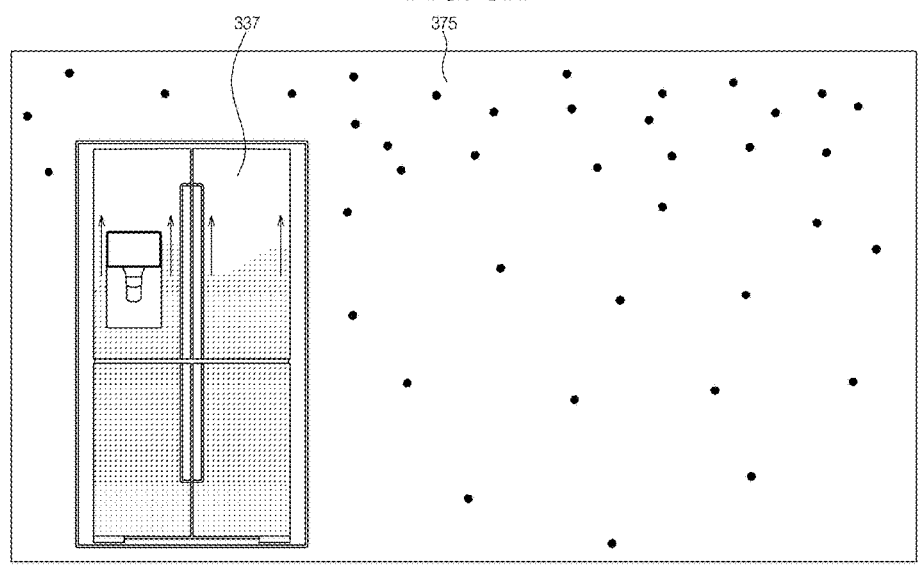
Figure 5L:
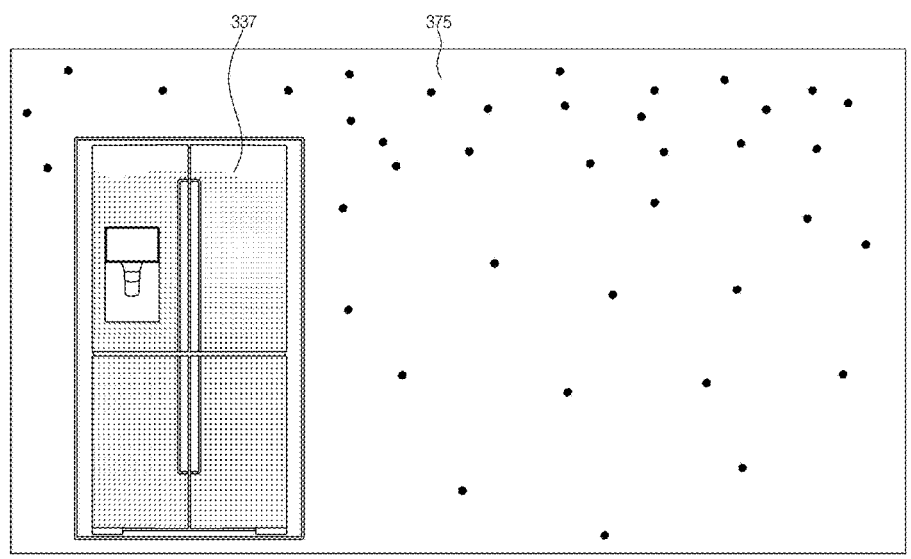

Referring to FIGS. 5K and 5L, synchronized visual feedbacks 337 and 375 are output from the LFD apparatus 260 and the projector 280. The control unit outputs the synchronized visual feedbacks 337 and 375 corresponding to the third touch 336 to the LFD apparatus 260 and the projector 280.

The visual feedbacks 337 and 375 are distinct from the product video 370. The visual feedbacks 337 and 375 may be output in such a manner that a part of the visual feedback is output from the LFD apparatus 260 and a part of the visual feedback is also output from the projector 280 with a visual effect of a flame spreading from the bottom of the LFD apparatus 260 to the top thereof. The control unit may output the synchronized feedbacks 337 and 375 from each of the LFD apparatus 260 and the projector 280. It will be readily understood by those persons skilled in the art that a visual feedback having another visual effect as well as the visual feedback corresponding to the spreading flame may be displayed.

When the visual feedbacks 337 and 375 are displayed on the LFD apparatus 260, the control unit may not output the product UI 330.

Figure 5M:
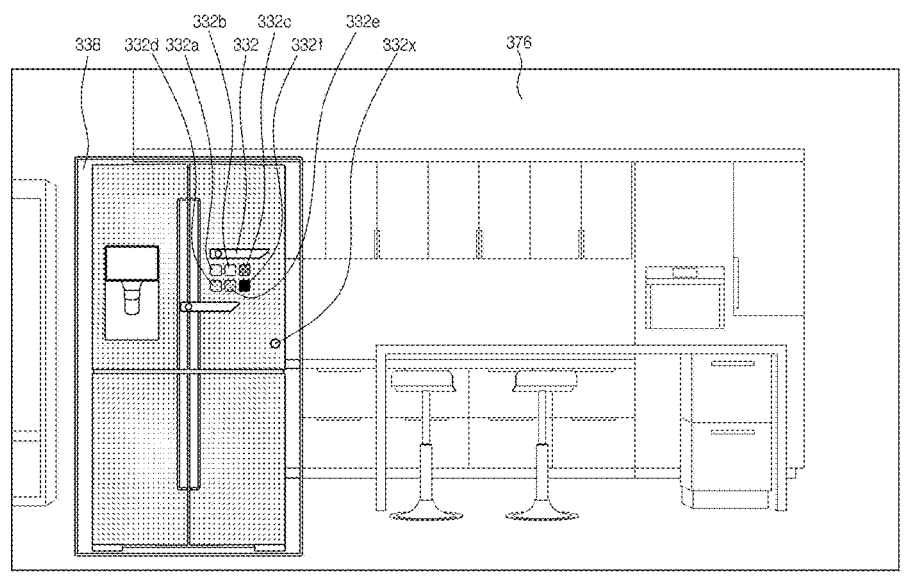

Referring to FIG. 5M, when the screen of the LFD apparatus 260 is fully filled with the spreading flame (for example, reproduction of the visual feedback is completed), the control unit may output the product UI 330.

In operation S356 of FIG. 3B, a plurality of sub icons corresponding to the third touch are output.

Figure 5N:
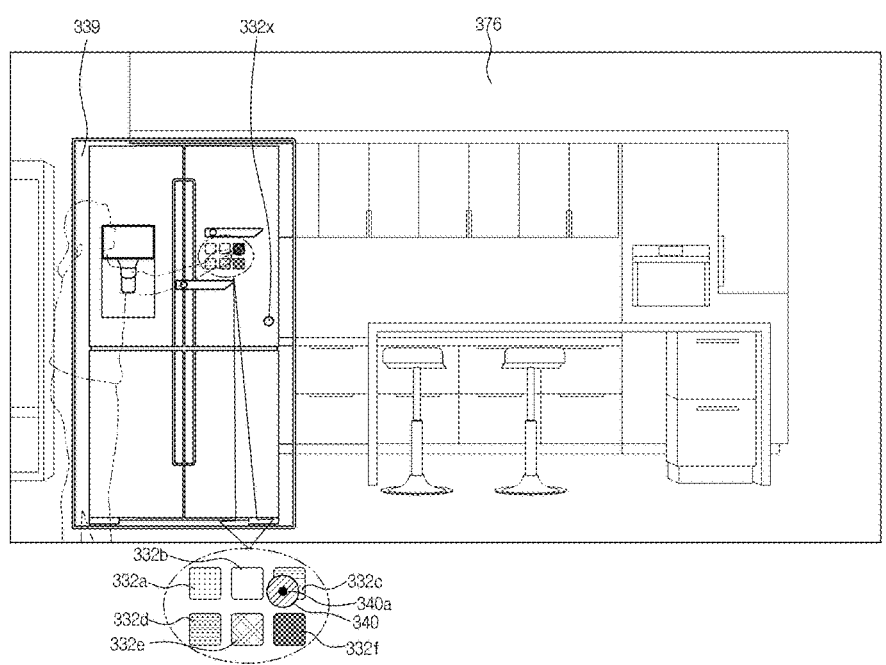
Figure 50:
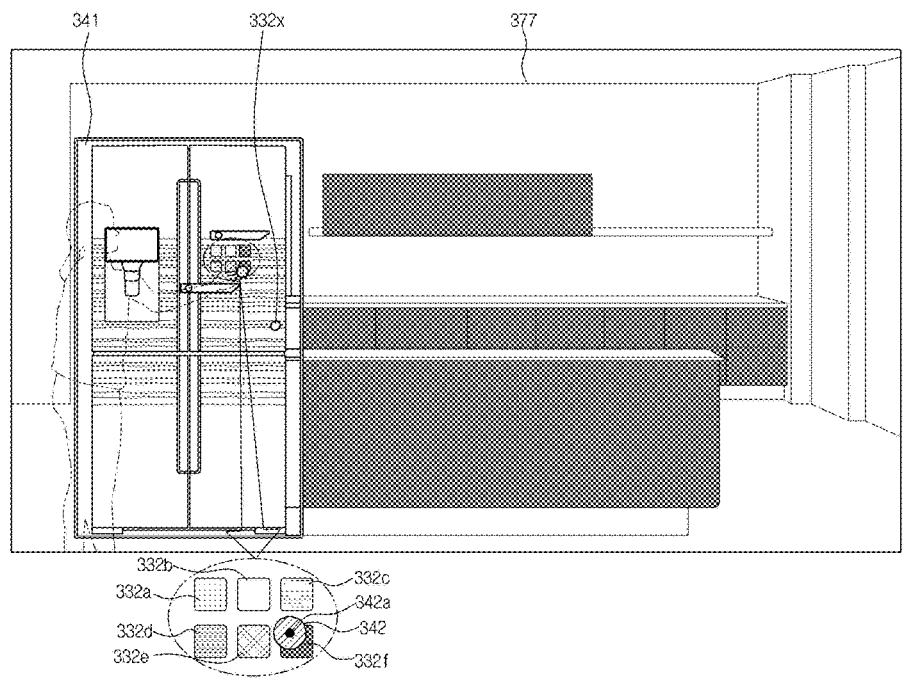

Referring to FIGS. 5M and 5N, the plurality of sub icons are displayed in the product UI 338. The control unit may output the plurality of sub icons 332a to 332f corresponding to the icon 332 in response to the detected third touch. In addition, the product UI 338 may include a home icon 332x.

Some sub icons 332a to 332c among the plurality of sub icons are icons corresponding to a timeless design pattern obtained by processing a stainless steel which is the surface material of the refrigerator. For example, the timeless design pattern may include timeless lining (not shown), timeless elegant (not shown), timeless noble (not shown), timeless pure (not shown), or timeless modern (not shown). Some sub icons 332a to 333c among the plurality of sub icons may be icons corresponding to products output from the LFD apparatus 260.

Some sub icons 332d to 332f among the plurality of sub icons correspond to a layout (for example, a disposition or color of the kitchen furniture) of the kitchen in which the refrigerator is installed. Some sub icons among the plurality of sub icons may be icons corresponding to the kitchen output from the projector 280.

In operation S357 of FIG. 3B, a fourth touch is detected from one of the sub icons by the touch panel.

Referring to FIG. 5N, a user performs a fourth touch 340 on the sub icon.

The sub icon 332c may be an icon corresponding to the timeless noble of the timeless designs. The user may perform the fourth touch on the sub icon 332f. The sub icon 332f may be an icon corresponding to the layout of the kitchen whose color is white & gray. In addition, the user may consecutively perform the fourth touch on the sub icons 332c and 332f. The user may first perform the fourth touch 340 on the sub icon 332c, and then perform the fourth touch 340 on the sub icon 332f. In addition, the user may consecutively perform the fourth touch on the sub icons 332f and 332c. The user may first performs the fourth touch 340 on the sub icon 332f, and then performs the fourth touch 340 on the sub icon 332c.

The control unit may detect the fourth touch 340 using the touch panel 240 and the touch panel controller (not shown). The control unit may receive a fourth touch position 340a (for example, X4 and Y4 coordinates) corresponding to the fourth touch 340 from the touch panel controller.

The control unit may store fourth touch position information corresponding to the fourth touch position 340a in the storage unit. The stored third touch position information may include an ID for history management, a touch position, a touch detection time, and touch information (for example, touch pressure, touch direction, or touch duration time). It will be readily understood by those persons skilled in the art that that the stored fourth position information may differ in accordance with the method of the touch panel 240.

In operation S358 of FIG. 3B, at least one of a surface pattern of the product and a background screen is changed and output.

Figure 5P:
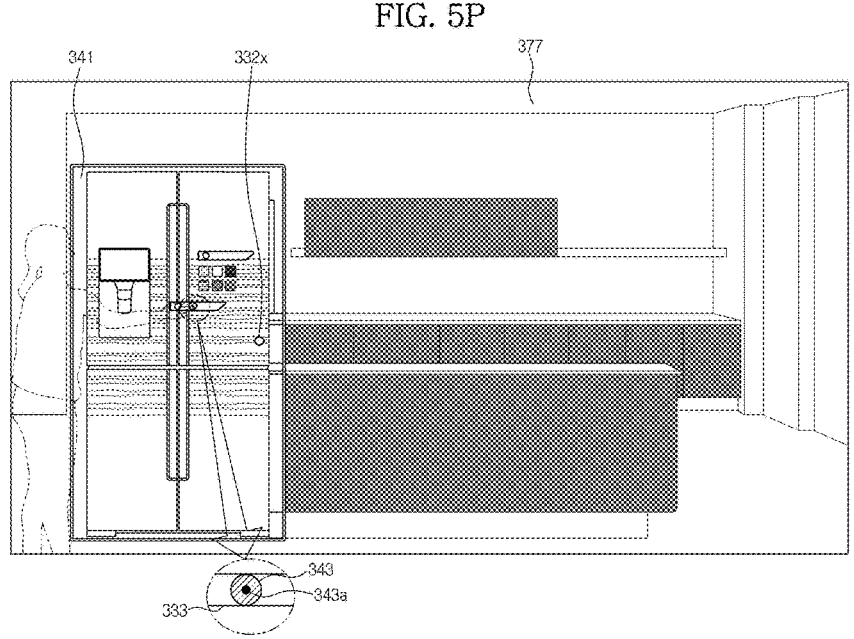

Referring to FIGS. 5O to 5P, the changed surface pattern of the product is displayed in the LFD apparatus 260. The control unit outputs the product video (for example, a refrigerator 341 in which timeless noble is applied to the surface) to the LFD apparatus 260 in response to the fourth touch 340 detected in the sub icon 332c. The control unit may output a product UI 339 to overlap the product video 341. In addition, the product UI 339 may include the home icon 332x. When the changed surface pattern of the product is displayed in the LFD apparatus 160, the control unit may output a product video 376 to the projector 280.

The control unit may output the changed product video 377 (a layout of the changed kitchen corresponding to the refrigerator) to the projector 280 in response to the detected fourth touch 340. The changed product video 377 may be a layout of the kitchen whose color is white & gray. The control unit may respectively output the synchronized product videos 341 and 377.

In addition, when a user touch on other sub icons 332a, 332b, 332d, or 332e is detected, the control unit may output the changed various timeless design patterns and the layout of the kitchen to the LFD apparatus 260 and the projector 280.

In operation S359 of FIG. 3B, a fifth touch is detected from the icon displayed on the LFD apparatus by the touch panel.

Referring to FIG. 5P, a user performs a fifth touch 343 on the see inside icon 333 of the product UI 339. The control unit may detect the fifth touch 343 using the touch panel 240 and the touch panel controller (not shown). The control unit may receive a fifth touch position 343a (for example, X5 and Y5 coordinates) corresponding to the fifth touch 343 from the touch panel controller.

The control unit may store fifth touch position information corresponding to the fifth touch position 343a in the storage unit. The stored fifth touch position information may include an ID for history management, a touch position, a touch detection time, and touch information (for example, touch pressure, touch direction, touch duration time, etc.).

In operation S360 of FIG. 3B, the product video whose inside is shown is output to the LFD apparatus.

Figure 5Q:
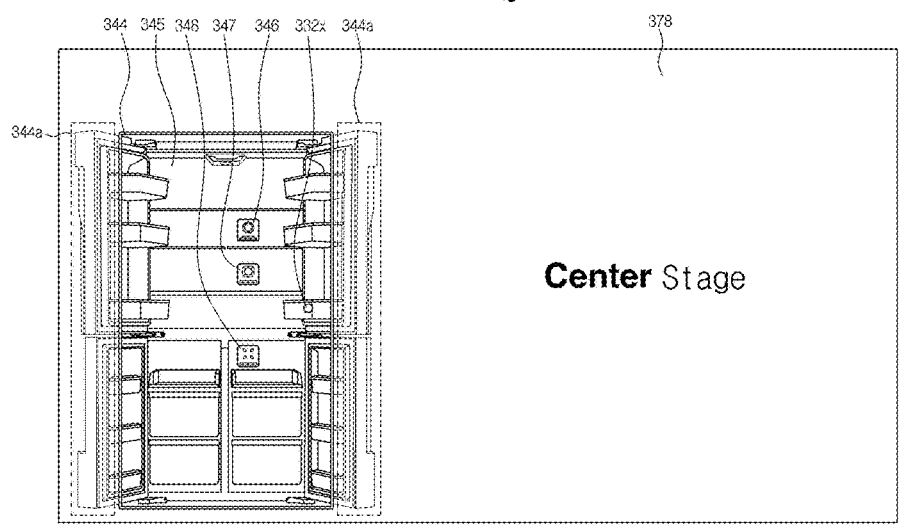

Referring to FIG. 5Q, product videos 344 and 378 are output from the LFD apparatus 260 and the projector 280. The control unit may output the synchronized videos 344 and 378 corresponding to the fifth touch 343 to the LFD apparatus 260 and the projector 280. The synchronized product videos 344 and 378 may be a video or an image corresponding to the icon 333.

The control unit may output the product video 344 capable of displaying the inside of the product (for example, the inside of the refrigerating compartment, the inside of the freezing compartment, shelves of doors of the refrigerating compartment, and shelves of doors of the freezing compartment) to the LFD apparatus 260. In addition, the control unit may output the product video capable of displaying an inner partial portion of the product (for example, the inside of the refrigerating compartment, the inside of the freezing compartment, a part of the shelves of doors of the refrigerating compartment, and a part of the shelves of doors of the freezing compartment) to the LFD apparatus 260. When the actual size of the product whose door is opened so that the inside of the product is shown is larger than the size of the LFD apparatus 260, the control unit may output the product video including an inner area adjacent to a hinge unit (not shown) connecting the doors of the refrigerator, to the LFD apparatus 260.

When the product video that displays the inner partial portion of the product is output from the LFD apparatus 260, the control unit may output the product video including the remaining portions (for example, an inner area 344*a* adjacent to the handle positioned on a side opposite the hinge unit) of the product which are not displayed on the LFD apparatus 260, to the projector 280.

The control unit overlaps a product UI 345 on the product video 344 output from the LFD apparatus 260 to thereby output the overlapped product UI 345. A plurality of icons included in the product UI 345 may be an icon corresponding to a primary feature of the product. The plurality of icons may include an icon 346 corresponding to a bacteria safe ionizer, an icon 347 corresponding to a space max which maximizes utilization of the inner space of the product, or an icon 348 corresponding to a cool select zone. In addition, the product UI 345 may include the home icon 332*x*.

The plurality of icons 346 to 348 included in the product UI 345 may be displayed on a position corresponding to the primary features of the product. For example, the icon 346 corresponding to the bacteria safe ionizer may be positioned closer to an area adjacent to the bacteria safe ionizer, compared to the other icons (for example, icons 347 and 348). The icon 348 corresponding to the cool select zone may be positioned closer to the cool select zone compared to other icons (for example, icons 346 and 347).

The plurality of icons 346 to 348 may be positioned in an intermediate area of the LFD apparatus in response to the size of the LFD apparatus 260. When the icon is positioned in an upper portion (for example, the icon is closer to the top of the LFD apparatus 260 rather than the intermediate area) with respect to the intermediate area, a user may not conveniently reach the upper portion. When the icon is positioned in a lower portion (for example, the icon is closer to the bottom of the LFD apparatus 260 rather than the intermediate area) with respect to the intermediate area, the user may have to bend his or her back or knees, causing inconvenience.

In operation S361 of FIG. 3B, a sixth touch is detected from a first function icon displayed on the LFD apparatus by the touch panel.

Referring to FIG. 5R, a user performs a sixth touch 349 on a first function icon 346 of the product UI 345. The control unit may detect the sixth touch 349 using the touch panel 240 and the touch panel controller (not shown). The control unit may receive a sixth touch position 349*a* (for example, X6 and Y6 coordinates) corresponding to the sixth touch 349 from the touch panel controller. In addition, the user may perform the sixth touch on one of other function icons 347 and 348.

The control unit may store sixth touch position information corresponding to the sixth touch position 349*a* in the storage unit. The stored sixth touch position information may include an ID for history management, a touch position, a touch detection time, and touch information (for example, touch pressure, touch direction, touch duration time, etc.).

In operation S362 of FIG. 3B, a product video corresponding to the first function icon is output.

Figure 5S:
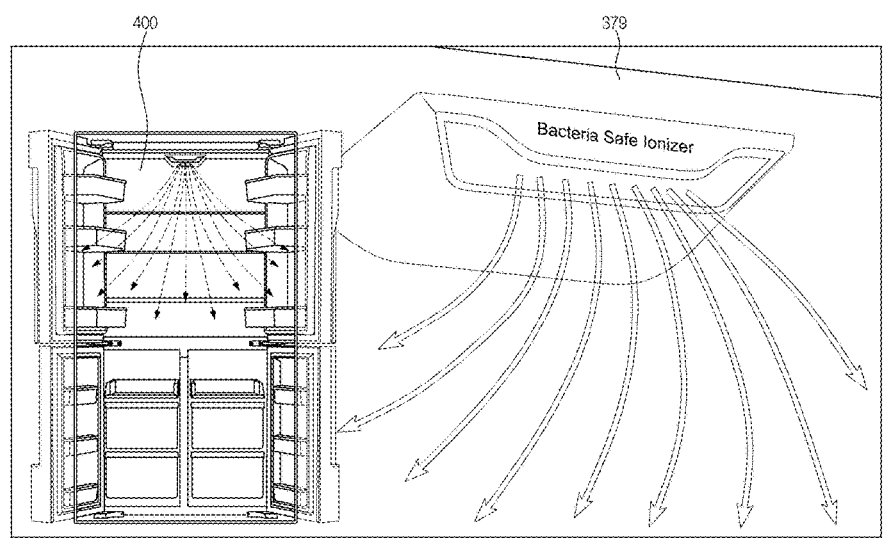

Referring to FIG. 5S, product videos 400 and 379 are output from the LFD apparatus 260 and the projector 280. The control unit may output the synchronized product videos 400 and 379 corresponding to the sixth touch 349 to the LFD apparatus 260 and the projector 280. The control unit may output the product video 400 (for example, the bacteria safe ionizer inside the product (for example, positioned in the top of the refrigerating compartment of the product)) from the LFD apparatus 260. The control unit may output the product video 379 that enlarges the bacteria safe ionizer emitting plasma ion, to the projector 280. For reference, the plasma ions emitted from the bacteria safe ionizer are invisible, in reality.

Figure 5T:
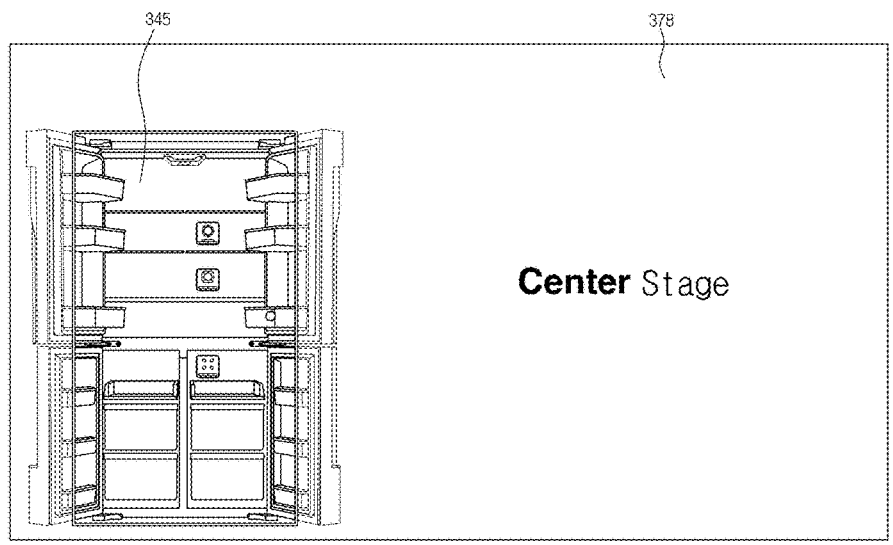
Figure 5U:
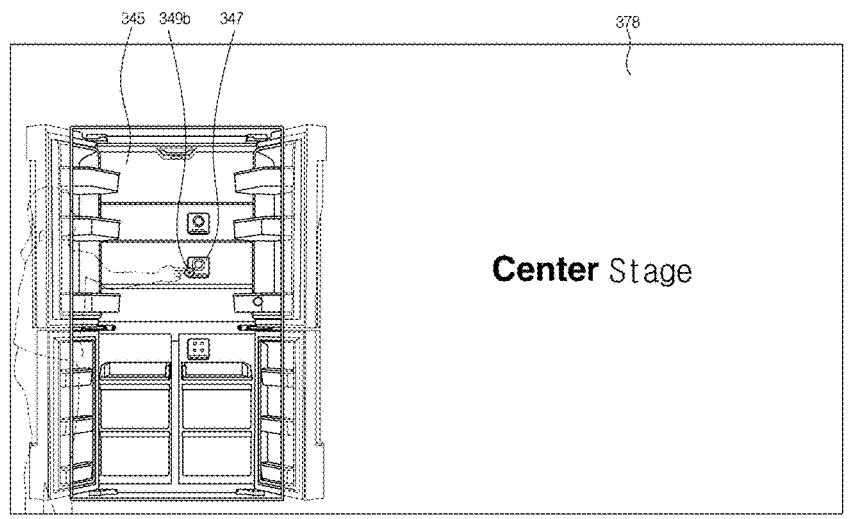

Referring to FIG. 5U, when the reproduction of the product videos 400 and 379 is completed, the control unit displays the product UI 345 again. FIG. 5T is substantially the same as FIG. 5Q.

In operation S363 of FIG. 3B, another function icon is selected.

When a user selects another function icon in the product UI 345, the corresponding process returns to operation S361 of FIG. 3B.

In operation S361 of FIG. 3B, a new sixth touch is detected in a second function icon displayed in the LFD apparatus by the touch panel.

Referring to FIG. 5U, a user performs a new sixth touch 349*b* on the second function icon 347 of the product UI 345. The control unit may detect the new sixth touch 349*b* using the touch panel and the touch panel controller (not shown). The control unit may receive a sixth touch position (not shown) (for example, other X6 and Y6 coordinates) corresponding to the new sixth touch 349*b* from the touch panel controller.

Detection of the new sixth touch 349*b* in the second function icon 347 of operation S361 of FIG. 3B may be substantially the same as the detection of the sixth touch 349 in the first function icon 346 in operation S361 of FIG. 3B, and thus repeated descriptions thereof will be omitted.

In S362 of FIG. 3B, a product video corresponding to the second function icon is output.

Figure 5V:
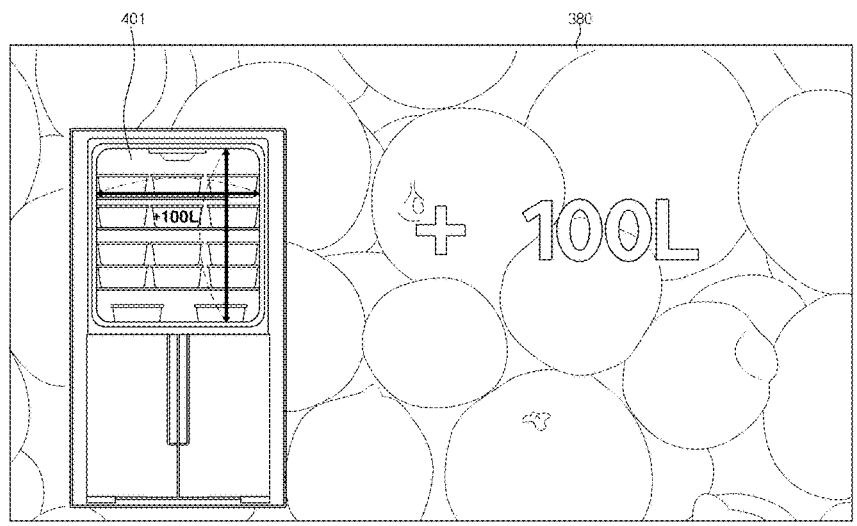

Referring to FIG. 5V, product videos 401 and 380 are displayed in the LFD apparatus 260 and the projector 280. The control unit may output the synchronized product videos 401 and 380 corresponding to the new sixth touch 349*b* to the LFD apparatus 260 and the projector 280. The control unit may output the product video 401 (for example, in a space max of the refrigerating compartment of the refrigerator in which a vertical arrow and a horizontal arrow are enlarged) from the LFD apparatus 260. The output product video 401 may include text (for example, "+100 L") corresponding to the space max. The control unit may output the product video 380 (for example, the space max is enlarged) from the projector 280. The output product video 380 may include text corresponding to the enlarged space (for example, "+100 L").

When the reproduction of the product videos 401 and 380 is completed, the control unit displays the product UI 345 again as shown in FIG. 5Q.

In operation S363 of FIG. 3B, another function icon is selected.

When a user selects the other function icon in the product UI 345, the corresponding process returns to operation S361 of FIG. 3B.

In operation S361 of FIG. 3B, a newer sixth touch is detected from a third function icon displayed on the LFD apparatus by the touch panel.

Figure 5W:
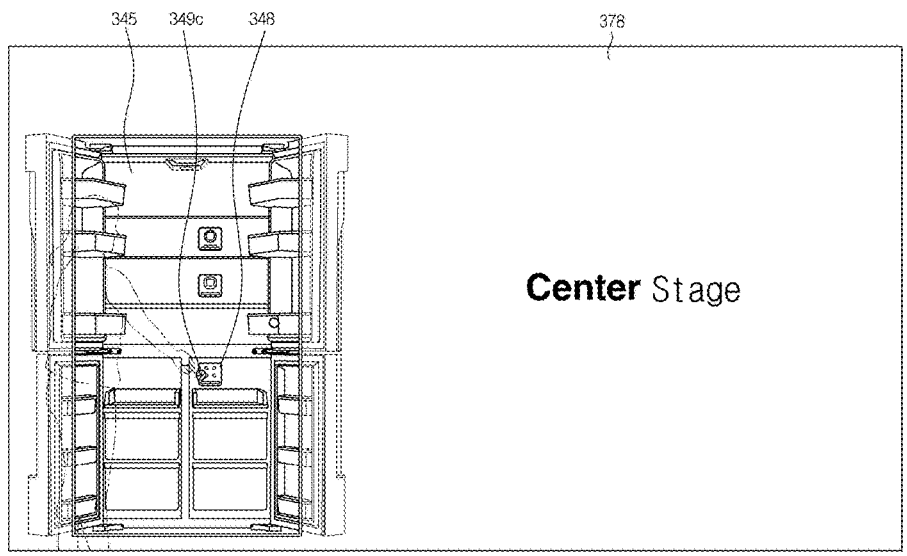

Referring to FIG. 5W, a user performs a newer sixth touch 349*c* on the third function icon 348 of the product UI 345. The control unit may detect the newer sixth touch 349*c* using the touch panel 240 and the touch panel controller (not shown). The control unit may receive a sixth touch position (not shown) (for example, other X6 and Y6 coordinates) corresponding to the newer sixth touch 349c from the touch panel controller.

Detection of the newer sixth touch 349c in the third function icon 348 of operation S361 of FIG. 3 may be substantially the same as the detection of the sixth touch 349 in the first function icon 346 in operation S361 of FIG. 3B, and thus repeated descriptions thereof will be omitted.

In operation S362 of FIG. 3B, a product UI corresponding to the third function icon is output.

Figure 5X:
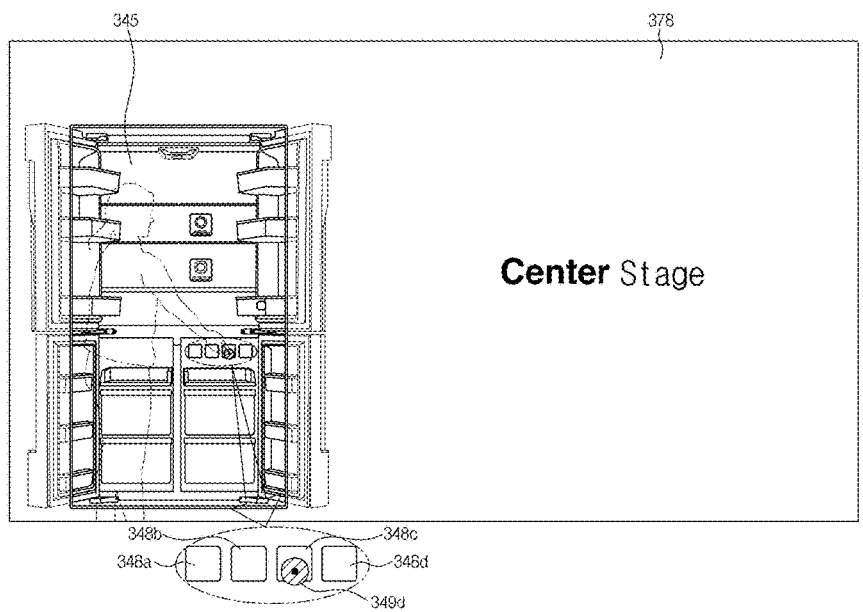

Referring to FIG. 5X, a plurality of sub icons corresponding to the third function icon in which the newer sixth touch 349c is detected is output.

The control unit outputs the plurality of sub icons 348a to 348d to the product UI 345a in response to the newer sixth touch 349c. In addition, the product UI 345a may include the home icon 332x.

The plurality of sub icons 348a to 348d may be icons corresponding to the temperature of the refrigerating compartment applied to the cool select zone. For example, the refrigerating compartment may include a temperature within a range of approximately −17 to −23° C. (348a), or of approximately −5° C. (348b), approximately −1° C. (348c), or approximately 1° C. (348d).

It will be readily understood by those persons skilled in the art that the number of the plurality of sub icons and the temperatures corresponding to the plurality of sub icons may be changed.

Figure 5Y:
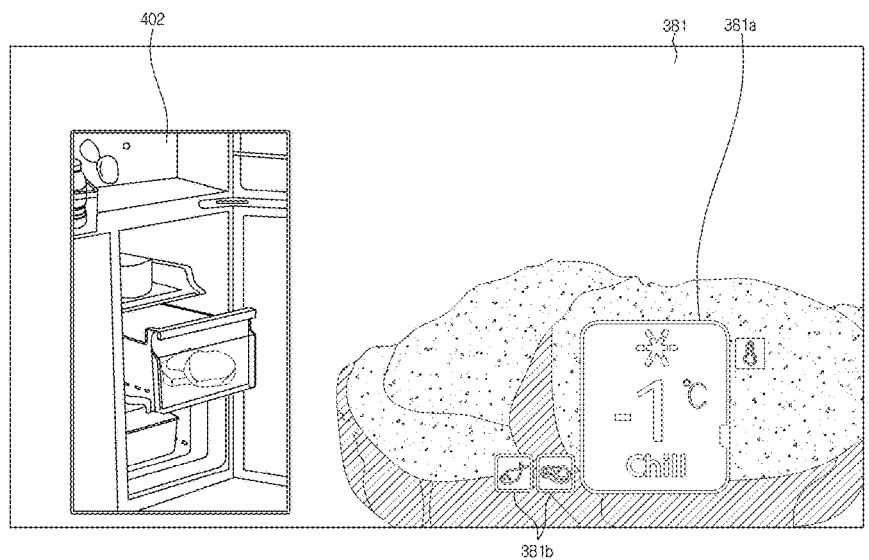

Referring to FIGS. 5X and 5Y, a user performs a touch 349d on the sub icon 348c. When the touch 349d is detected in the sub icon 348c, the control unit may output synchronized product videos 402 and 381 to the LFD apparatus 260 and the screen 10. The control unit may output a product video 402 (for example, including food material which may be stored in an opened drawer in the cool select zone) to the LFD apparatus 260. The control unit may output the product video 381 (for example, the food material stored in the drawer is enlarged) to the projector 280.

The output product video 381 may include an image 381a (for example, temperature or icon of the refrigerating compartment) corresponding to the cool select zone. In addition, the product video 381 may further include a smaller image 381b corresponding to the food material which may be stored in the cool select zone.

When the reproduction of the product videos 402 and 381 is completed, the control unit displays the sub icons 348a and 348d in the LFD apparatus 260 again.

Figure 5Z:
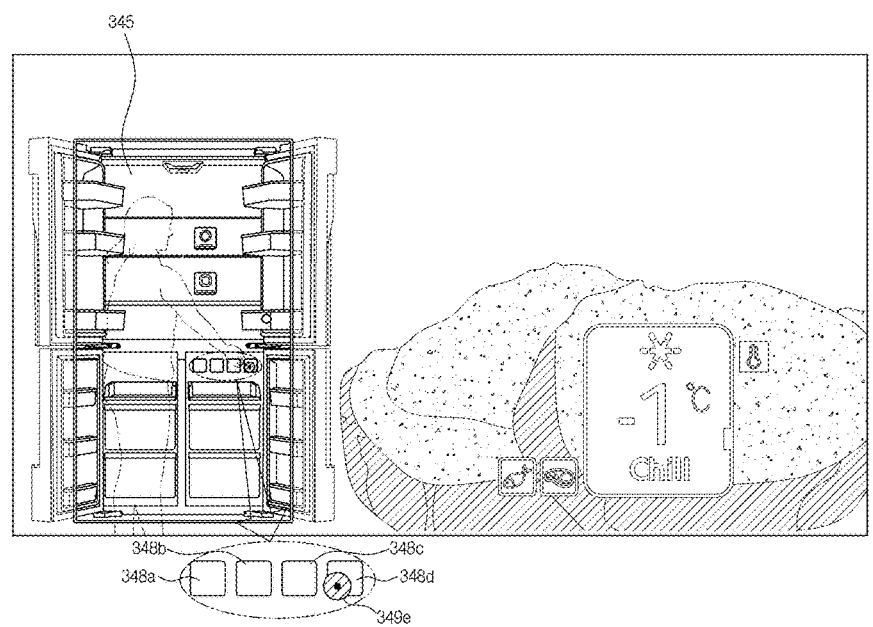
Figure 5A:
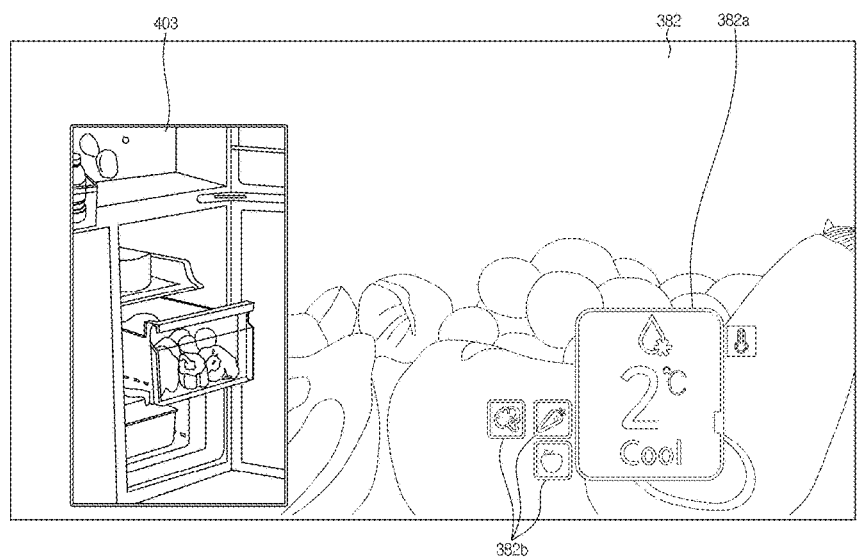
Figure 5A:
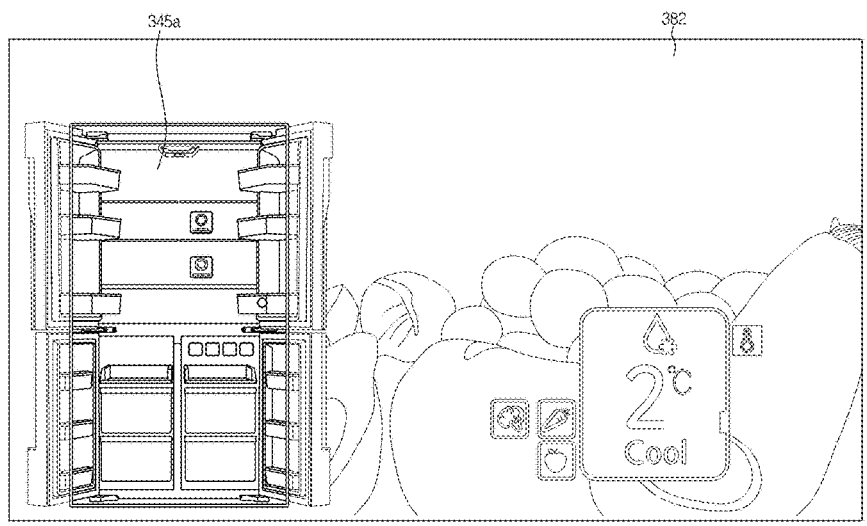
Figure 5A:
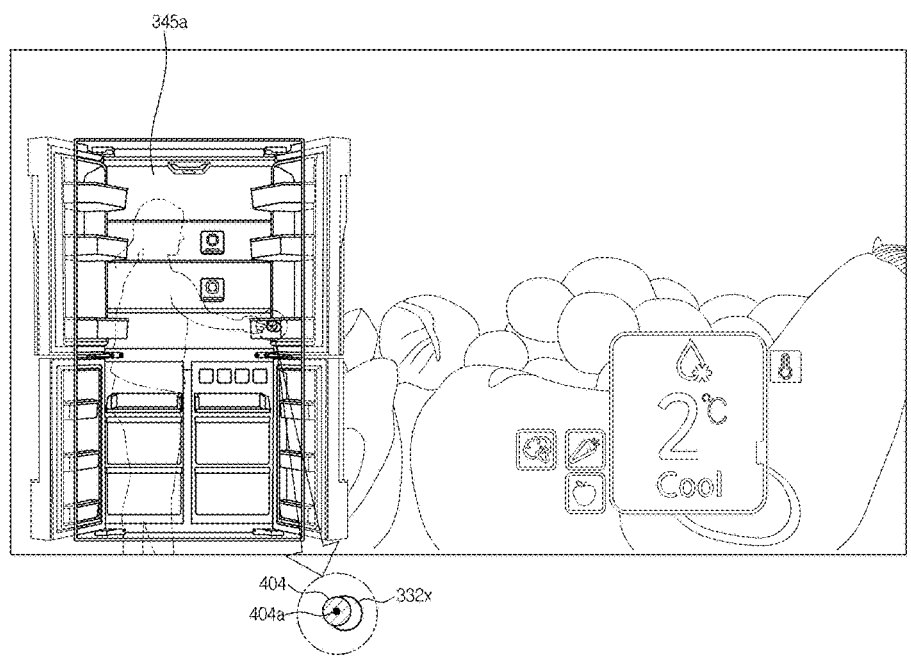
Figure 5A:
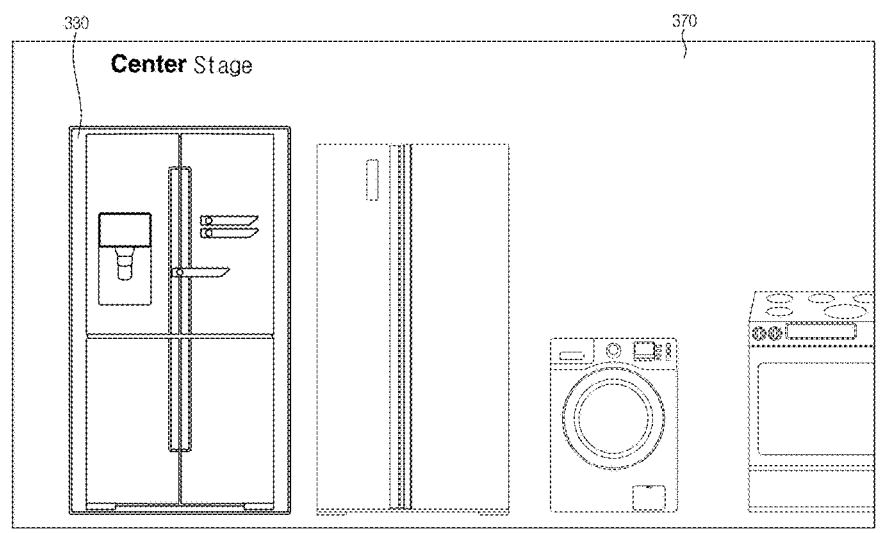

Referring to FIGS. 5Z and 5AA, a user performs a touch 349e on the sub icon 348d.

When the touch 349e is detected in the final sub icon 348d, the control unit outputs synchronized product videos 403 and 382 to the LFD apparatus 260 and the screen 10. The control unit may output the product video 403 (for example, including food material which may be stored in the opened drawer in the cool select zone) to the LFD apparatus 260. The control unit may output the product video 382 (for example, the food material stored in the drawer is enlarged) to the projector 280. The output product video 381 may include an image 382a (for example, temperature or icon of the refrigerating compartment) corresponding to the cool select zone. In addition, the product video 381 may further include a smaller image 382b corresponding to the food material which may be stored in the cool select zone.

Referring to FIG. 5AB, when the reproduction of the product videos 403 and 382 is completed, the control unit displays the sub icons 348a to 348d to the LFD apparatus again. The control unit may continuously output the product video 382 to the projector 280.

When there are no another function icons selectable in the product UI 345, the corresponding process returns to operation S364.

In operation 364 of FIG. 3B, a seventh touch is detected in a home icon displayed in the LFD apparatus by the touch panel.

Referring to FIG. 5AC, a user performs a seventh touch 404 on the home icon 332x of the product UI 345a. The control unit may detect the seventh touch 404 using the touch panel 240 and the touch panel controller (not shown). The control unit may receive a seventh touch position 404a (for example, X7 and Y7 coordinates) corresponding to the seventh touch 404 from the touch panel controller.

The control unit may store seventh touch position information corresponding to the seventh touch position 404a in the storage unit. The stored seventh touch position information may include an ID for history management, a touch position, a touch detection time, and touch information (for example, a touch pressure, a touch direction, a touch duration time, etc.).

In operation S365 of FIG. 3B, a screen of the product UI is displayed.

Referring to FIG. 5AD, the product UI 330 and the product video 370 are displayed. The control unit outputs the product UI 330 and the product video 370 corresponding to the seventh touch 404 to the LFD apparatus 260 and the projector 280. FIG. 5ad in which the product UI 330 and the product video 370 are displayed is substantially the same as FIG. 5F, and repeated descriptions thereof will be omitted.

In operation S366 of FIG. 3B, a second product is selected.

When a user selects the second product in operation S355 of FIG. 3B, the corresponding process returns to operation S351.

In operations S351 to S362 of FIG. 3B, when a selection of the second product 371 (for example, side-by-side refrigerator) corresponding to the consecutive movement of the touch and a plurality of touches (for example, from new third touch to new seventh touch) are input, the control unit may output the corresponding respective product UI and product video to the LFD apparatus 260 and the projector 280.

In operations S351 to S362 of FIG. 3B, an output of the product UI and the product video corresponding to the side-by-side refrigerator 371 may be substantially the same as the output of the product UI and product video corresponding to the refrigerator in operations S351 to S362 of FIG. 3, and thus repeated descriptions thereof will be omitted.

As described in FIG. 5F, the number of icons displayed on the product UI and positions of the icons may be changed in accordance with a type and a function of the product corresponding to the product video. For example, the product UI may include one of a size icon and a gallery icon. In addition, the product UI may include both the size icon and the gallery icon.

Figure 6A:
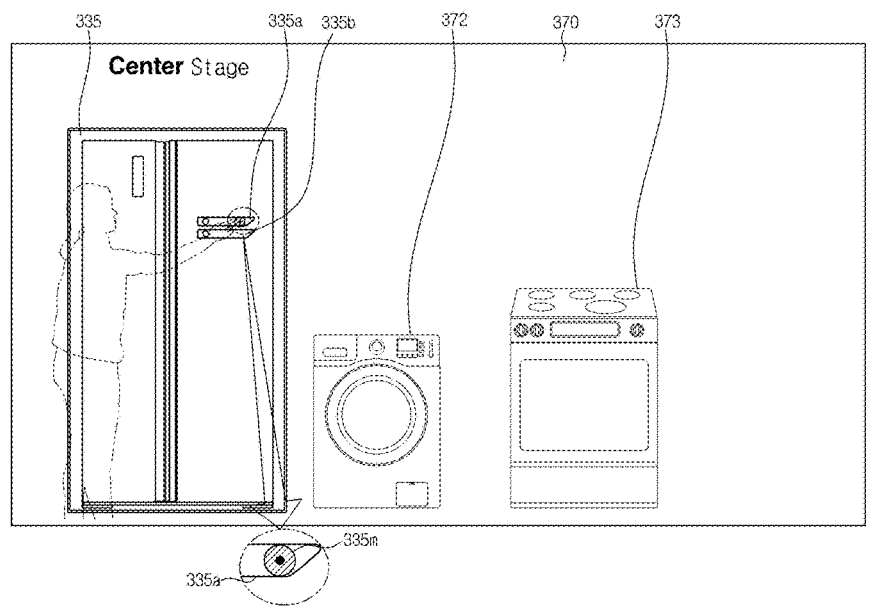

Referring to FIG. 6A, a user performs a touch 335m on an icon 335a (for example, a size icon) of the product UI 335. The control unit may detect the touch 335m using the touch panel 240 and the touch panel controller (not shown).

Figure 6B:
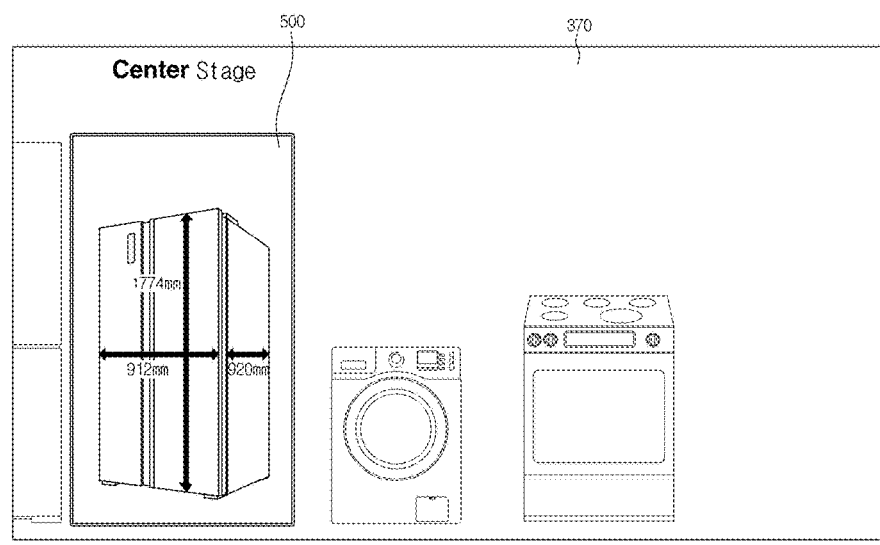

Referring to FIG. 6B, the control unit outputs a product video 500 corresponding to the detected touch 335m to the LFD apparatus 260. The control unit may output the product video 500 corresponding to the actual size (approximately 912×1774×920 mm) of the side-by-side refrigerator to the LFD apparatus 260. In addition, the control unit may output the product video 500 obtained by reducing the actual size (for example, 70 to 95% of the actual size) of the side-by-side refrigerator to the LFD apparatus 260. In addition, the control unit outputs the product video 370 through the projector 280.

Figure 6C:
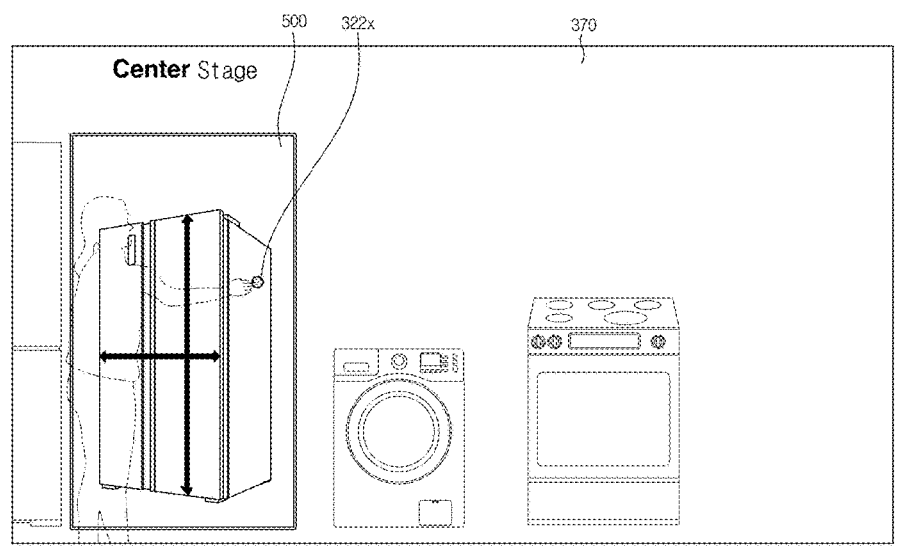

Referring to FIG. 6C, when the reproduction of the product video 500 is completed, the home icon 322*x* is displayed. A user performs a touch on the home icon 322*x*.

Figure 6D:
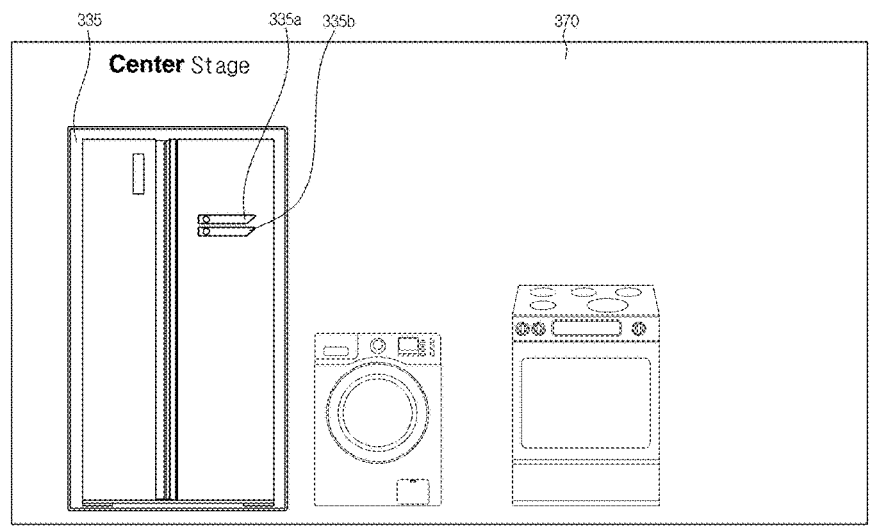

Referring to FIG. 6D, the control unit displays the product UI 335 and the product video 370 in response to the touch on the home icon. The control unit outputs the product UI 335 and product video 370 corresponding to the touch on a home icon 332*x* to the LFD apparatus 266 and the projector 280. FIG. 6D in which the product UI 335 and the product video 370 are displayed may be substantially the same as FIG. 6A, and thus repeated descriptions thereof will be omitted.

Figure 6E:
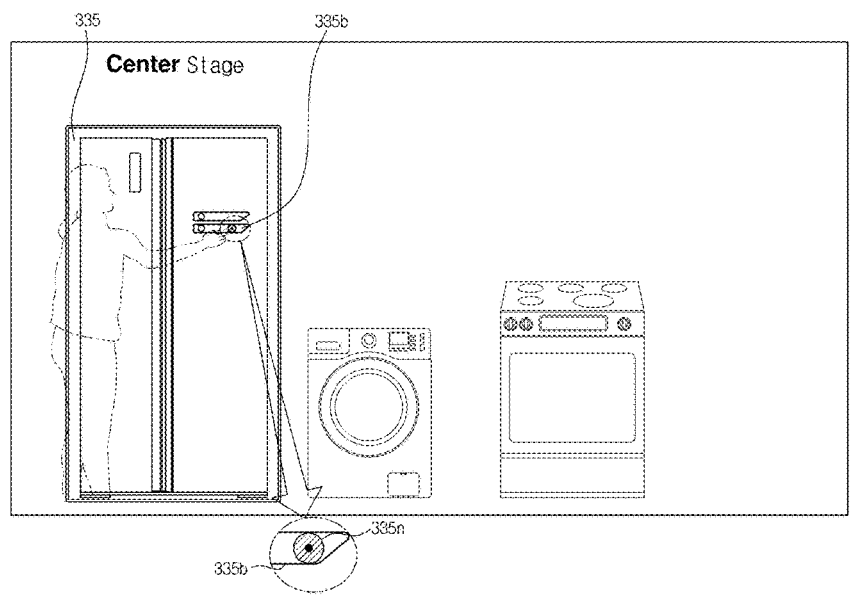

Referring to FIG. 6E, a user performs a touch 335*n* on an icon (for example, a gallery icon 335*b*) of the product UI 335. The control unit may detect the touch 335*n* using the touch panel 240 and the touch panel controller (not shown).

Figure 6F:
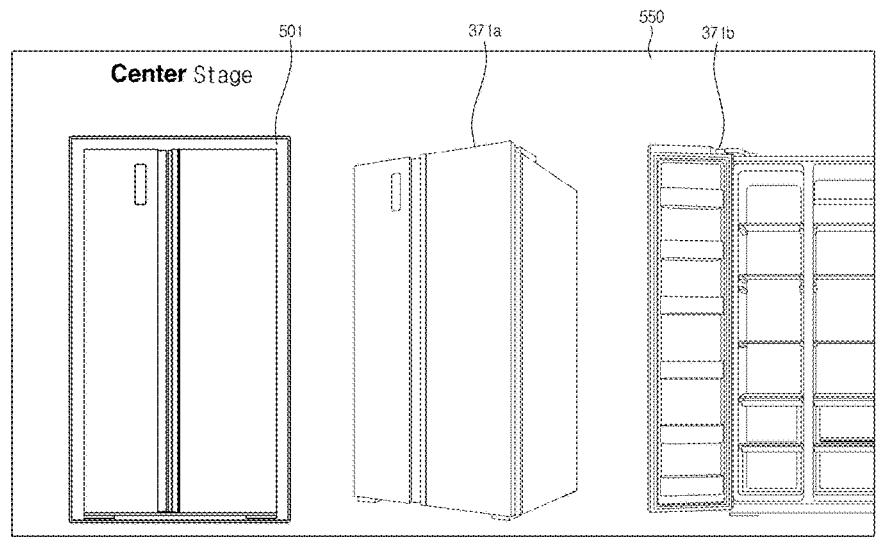

Referring to FIG. 6F, product videos 501 and 550 are output. The control unit outputs the product videos 501 and 550 corresponding to the touch 335*n* to the LFD apparatus 260 and the projector 280. The product videos 501 and 550 may include various images.

Figure 6G:
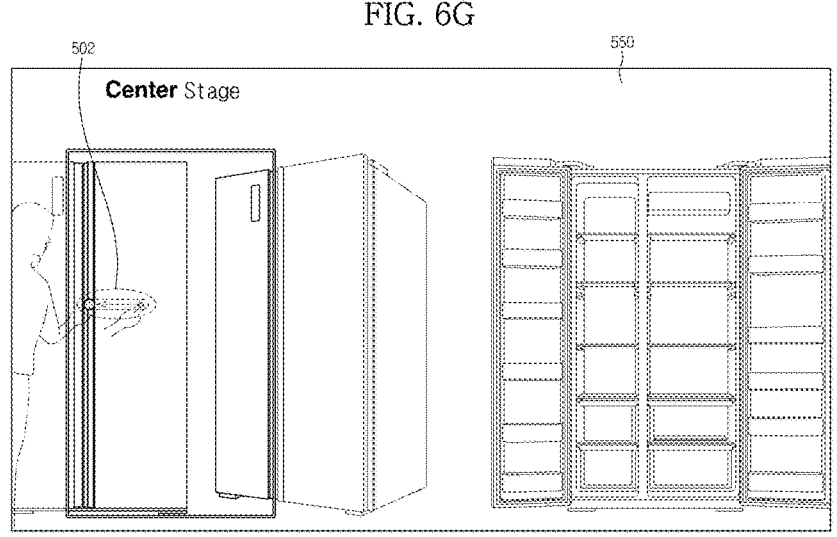
Figure 6H:
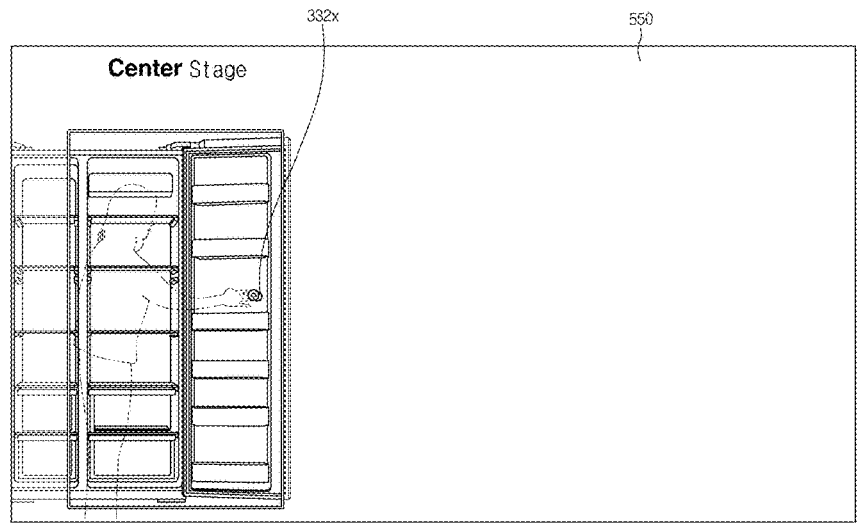

Referring to FIGS. 6G and 6H, a user inputs a consecutive movement of the touch in the product UI 501. The control unit may detect a consecutive movement 502 of the touch using the touch panel 240 and the touch panel controller (not shown). The control unit may output the product video 550 in which an image of the product is moved in response to the consecutive movement 502 of the second touch, to the LFD apparatus 260 and the projector 280.

When reaching the image of the final product, the home icon 332*x* is displayed. In addition, when the movement of the image of the product is stopped, the home icon 332*x* is displayed. The user performs a touch on the home icon 332*x* of the project UI.

Figure 6I:
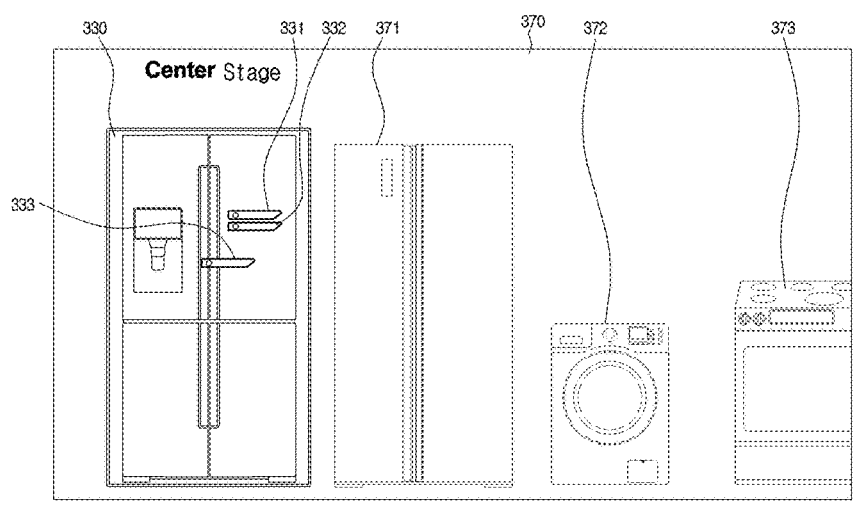

Referring to FIG. 6I, the control unit outputs the product UI 330 and the product video 370 to the LFD apparatus 260 and the projector 280.

When another product is not selected, the process returns to operation S308.

Figure 6J:
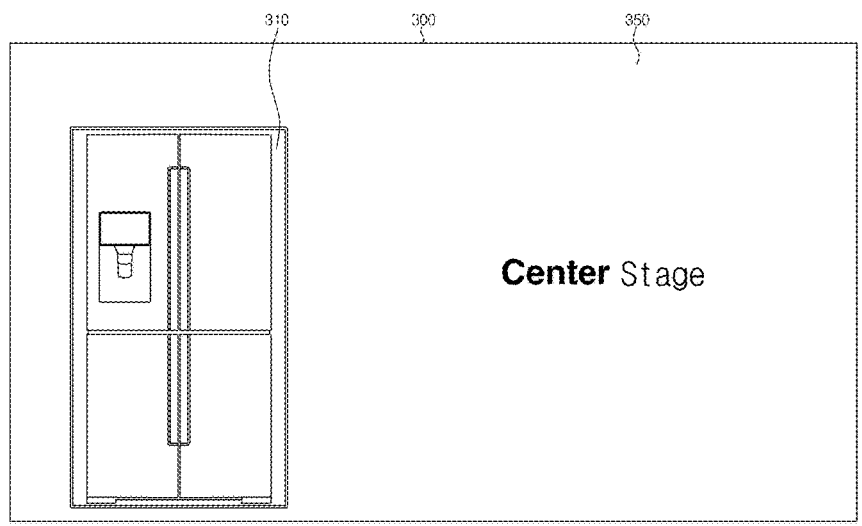

When a user's input is not detected within a set time (for example, one minute which is changeable) in the product UI, the control unit may change the product stage to the idle stage. Referring to FIG. 6J, an idle video of the idle stage is displayed. The control unit outputs the idle video to the LFD apparatus 260 and the projector 280.

In operation S308 of FIG. 3B, when the control unit stops the output of the product video, the screen display method of the electronic apparatus is completed.

Figure 7:
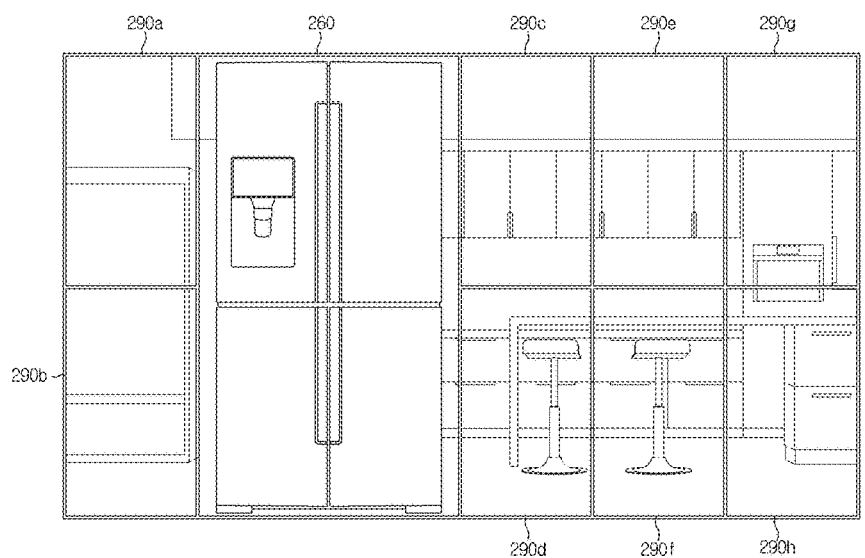
FIG. 7 is a diagram illustrating an example of a screen output in an electronic apparatus in accordance with another embodiment of the present invention.

FIG. 7 is a diagram illustrating an example of a screen output in an electronic apparatus in accordance with another embodiment of the present invention.

Referring to FIG. 7, the LFD apparatus 260 and the plurality of SFD apparatuses 290*a* to 290*h* are displayed. The SFD apparatus 290 may be constituted of a left array (m×n array, where m and n are positive integers) and a right array (m×n array, where m and n are positive integers) with respect to the LFD apparatus 260. In FIG. 7, the SFD apparatus 290 may be constituted of the left array (2×1 array) and the right array (2×3 array) with respect to the LFD apparatus 260, for example.

Unlike the output in the projector 280, the control unit may divide the synchronized idle video, hooking video, and product video in response to the number of the connected SFD apparatuses 290 and output the divided synchronized video to the SFD apparatuses 290. The control unit may output the synchronized idle video, hooking video, and product video to the LFD apparatus 260. In addition, the control unit may output the synchronized hooking UI and product UI to the LFD apparatus 260. The synchronized content in FIG. 7 may correspond to the LFD apparatus 260 and the plurality of SFD apparatuses 290, and include the synchronized content which is divided into the SFD apparatuses 290 to be output in response to the number of the SFD apparatuses 290. In addition, the synchronized content may include a first synchronized content and a second synchronized content. The control unit may output the first content to the LFD apparatus 260 having the first diagonal length, and divide the second content into the plurality of SFD apparatuses 290*a* to 290*h* having the display screen of the second diagonal length in response to the number of SFD apparatuses 290*a* to 290*h*, and output the divided content to the plurality of display apparatuses each having the screen of the second diagonal length.

The screen size of the first content output from the LFD apparatus 260 may be smaller than the screen size of the second content output to the plurality of SFD apparatuses. For example, the screen size of the first content output to the LFD apparatus 260 may be smaller than the screen size (corresponding to 290*a* to 290*h*) of the second content output to the SFD apparatuses 290*a* to 290*h*. In addition, the screen size of the first content output to the LFD apparatus 260 may be larger than a size of a partial screen of the second content output to the single SFD apparatus 290*a*.

The control unit may output a UHD resolution to the LFD apparatus 260. The control unit may output an FHD resolution to the SFD apparatuses 290*a* to 290*h*. In addition, the control unit may output the UHD resolution to the LFD apparatus 260 and the SFD apparatuses 290*a* to 290*h*.

Figure 8:
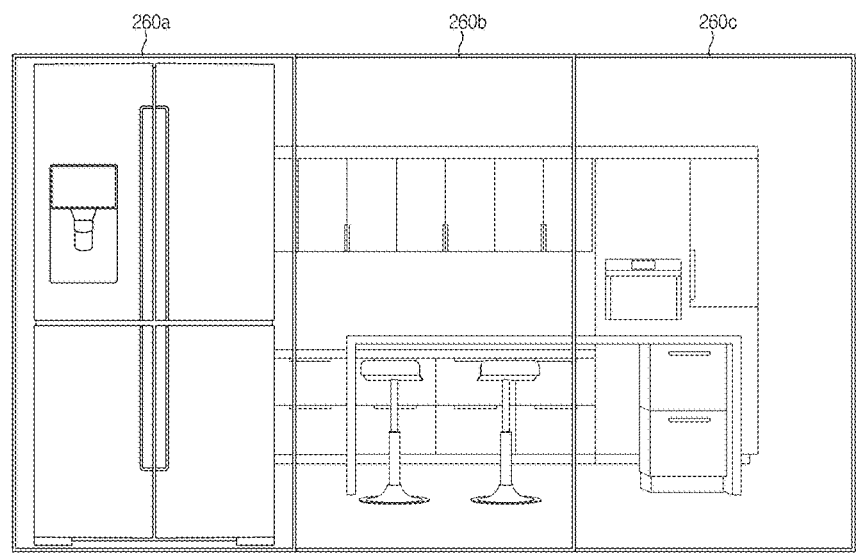
FIG. 8 is a diagram illustrating an example of a screen output in an electronic apparatus in accordance with still another embodiment of the present invention.

FIG. 8 is a diagram illustrating an example of a screen output in an electronic apparatus in accordance with still another embodiment of the present invention.

Referring to FIG. 8, a plurality of LFD apparatuses 260*a*, 260*b*, and 260*c* are displayed. For example, the plurality of LFD apparatuses each having the same diagonal length may be constituted of a 1×2 array, a 1×3 array, or a 1×4 array.

Unlike the output in the projector 280, the control unit may divide the synchronized idle video, hooking video, and product video in response to the number of the plurality of connected LFD apparatuses 260*b* and 260*c*, and output the divided videos to the plurality of LFD apparatuses 260. The control unit may output the synchronized idle video, hooking video, and product video to the LFD apparatus 260*a*.

The control unit may output the synchronized hooking UI and product UI to the LFD apparatus 260. The synchronized content may correspond to the LFD apparatus 260*a* and other LFD apparatuses 260*b* and 260*c*, and include the synchronized content which is divided into the other LFD apparatuses 260*b* and 260*c* to be output in response to the number of the other LFD apparatuses 260*b* and 260*c*. In addition, the synchronized content may include a first synchronized content and a second synchronized content. For example, when the number of the other LFD apparatuses positioned on one side of the LFD apparatus 260*a* is one, the screen size of the first content output from the LFD apparatus 260*a* may be the same as the screen size of the second content output from the projection-type display apparatus.

When a plurality of other LFD apparatuses positioned on one side of the LFD apparatus 260a are provided, the screen size of the first content output from the LFD apparatus 260a may be the same as or smaller than the screen size of the second content output from the projection-type display apparatus.

The control unit may output the UHD resolution to the LFD apparatus 260a. The control unit may output the FHD resolution to the plurality of LFD apparatuses 260b and 260c. In addition, the control unit may output the UHD resolution to the LFD apparatuses 260a to 260c.

As described above, according to the embodiments of the present invention, there are provided the electronic apparatus that outputs the synchronized contents having different resolutions to the display apparatus and the projection type display apparatus in the idle state, and a method of outputting the content of the electronic apparatus.

In addition, there are provided the electronic apparatus that outputs the synchronized contents having different resolutions to the display apparatus and the projection type display apparatus in response to the user's approach detected in the proximity sensor, and a method of outputting the content of the electronic apparatus.

In addition, there are provided the electronic apparatus that outputs the synchronized contents having different resolutions to the display apparatus and the projection type display apparatus in response to the user's touch detected in the touch panel, and a method of outputting the content of the electronic apparatus.

In addition, according to various embodiments of the present invention, there are provided the electronic apparatus that outputs the synchronized content to the display apparatus and the projection-type display apparatus in response to the user's approach and/or user's touch, and a method of outputting the content of the electronic apparatus.

The methods according to various embodiments of the present invention may be implemented in the form of software readable by various computer devices and recorded in a non-transitory computer-readable recording medium. The non-transitory computer-readable recording medium may separately include program commands, local data files, local data structures, etc., or include a combination thereof. For example, the computer-readable recording medium may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the memory that can be included in a mobile terminal is an example of a machine-readable storage medium appropriate for storing a program(s) including instructions for realizing the embodiments of the present invention.

As is apparent from the above description, a liquid crystal display in accordance with one embodiment of the present invention controls a magnitude of power applied to a heat generation unit according to a variation of resistance, thereby allowing liquid crystals to uniformly maintain a reference temperature or more.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. An electronic apparatus comprising:
a communication unit configured to communicate with a first flat-panel-type display apparatus, a second flat-panel-type display apparatus, and a touch panel which is only disposed on the first flat-panel-type display apparatus; and
a control unit configured to control the communication unit,
wherein the control unit is configured to transmit a synchronized content to the first flat-panel-type display apparatus and the second flat-panel-type display apparatus through the communication unit, so that the first flat-panel-type display apparatus displays one portion of the synchronized content and the second flat-panel-type display apparatus displays another portion of the synchronized content,
wherein in response to the touch panel detecting a touch of a user on the first flat-panel-type display apparatus, the control unit is configured to transmit an another synchronized content to the first flat-panel-type display apparatus through the communication unit so that the first flat-panel-type display apparatus displays one portion of the another synchronized content, and
wherein in response to the touch panel detecting the touch of the user on the first flat-panel-type display apparatus, the control unit is configured to transmit the another synchronized content to the second flat-panel-type display apparatus through the communication unit so that the second flat-panel-type display apparatus displays another portion of the another synchronized content.

2. The electronic apparatus according to claim 1, wherein the synchronized content includes a first synchronized content and a second synchronized content, and a screen size of the first synchronized content output from the first flat-panel-type display apparatus is smaller than a screen size of the second synchronized content output from the second flat-panel-type display apparatus.

3. The electronic apparatus according to claim 1, wherein the communication unit is further configured to communicate with a portable apparatus,
and the control unit receives control signals to control the electronic apparatus from the portable apparatus via the communication unit.

4. The electronic apparatus according to claim 1, wherein the control unit transmits a high resolution content among from the synchronized content to the display apparatus and transmits a low resolution content among from the synchronized content to the second flat-panel-type display apparatus, and the low resolution content has a lower resolution than the high resolution content.

5. The electronic apparatus according to claim 1, wherein the control unit outputs a first synchronized content to the first flat-panel-type display apparatus and the second flat-panel-type display apparatus during an idle state of the electronic apparatus, and the synchronized content includes the first synchronized content.

6. The electronic apparatus according to claim 5, wherein the communication unit is further configured to communicate with a proximity sensor, the control unit outputs a second synchronized content corresponding to an approach of a user detected by the proximity sensor to the first flat-panel-type display apparatus and the second flat-panel-type display apparatus during the idle state, and the synchronized content includes the second synchronized content.

7. A method of outputting a content of an electronic apparatus, the method comprising:
outputting a first synchronized content to a first flat-panel-type display apparatus and a second flat-panel-type display apparatus so that the first flat-panel-type display apparatus displays one portion of the first synchronized content and the second flat-panel-type display apparatus display another portion of the first synchronized content;
detecting an approach of a user;
outputting a second synchronized content to the first flat-panel-type display apparatus and the second flat-panel-type display apparatus in response to the detected approach, so that the fist flat-panel-type display apparatus displays one portion of the second synchronized content and the second flat-panel-type display apparatus display another portion of the second synchronized content;
detecting a touch of the user on the first flat-panel- type display apparatus; and outputting a third synchronized content to both the first flat-panel-type display apparatus and the second flat-panel-type display apparatus in response to the detected touch on the first flat-panel-type display apparatus, so that the first flat-panel-type display apparatus displays one portion of the third synchronized content and the second flat-panel-type display apparatus displays another portion of the third synchronized content.

8. The method according to claim 7, wherein the outputting of the second synchronized content includes outputting one of visual feedback and audio feedback to the first flat-panel-type display apparatus and the second flat-panel-type display apparatus in response to the detected approach.

9. The method according to claim 7, wherein the outputting of the first synchronized content includes:
transmitting a high resolution content among from the first synchronized content to the display apparatus; and
transmitting a low resolution content among from the first synchronized content to the second flat-panel-type display apparatus,
wherein the low resolution content has a lower resolution than the high resolution content.

10. The method according to claim 7, wherein a screen size of the one portion of the first synchronized content is smaller than a screen size of the another portion of the first synchronized content.

11. A system for displaying content, comprising:
an electronic apparatus comprising:
a communication unit, and
a control unit configured to control the communication unit;
a first flat-panel-type display apparatus configured to communicate with the electronic apparatus; and
a second flat-panel-type display apparatus configured to communicate with the electronic apparatus,
wherein the control unit is configured to transmit a synchronized content to the first flat-panel-type display apparatus and the second flat-panel-type display apparatus through the communication unit, so that the first flat-panel-type display apparatus displays one portion of the synchronized content and the second flat-panel-type display apparatus displays another portion of the synchronized content,
wherein in response to the touch panel detecting a touch of a user on the first flat-panel-type display apparatus, the control unit is configured to transmit an another synchronized content to the first flat-panel-type display apparatus through the communication unit so that the first flat-panel-type display apparatus displays one portion of the another synchronized content, and
wherein in response to the touch panel detecting the touch of the user on the first flat-panel-type display apparatus, the control unit is configured to transmit the another synchronized content to the second flat-panel-type display apparatus through the communication unit so that the second flat-panel-type display apparatus displays another portion of the another synchronized content.

12. The system according to claim 11, wherein the synchronized content includes a first synchronized content and a second synchronized content, and a screen size of the first synchronized content output from the first flat-panel-type display apparatus is smaller than a screen size of the second synchronized content output from the second flat-panel-type display apparatus.

13. The system according to claim 11, wherein the control unit transmits a high resolution content among from the synchronized content to the display apparatus and transmits a low resolution content among from the synchronized content to the second flat-panel-type display apparatus, and the low resolution content has a lower resolution than the high resolution content.

14. The system according to claim 11, further comprising:
a portable apparatus configured to communicate with the communication unit,
wherein the control unit receives control signals to control the electronic apparatus from the portable apparatus via the communication unit.

15. The system according to claim 11, wherein the control unit outputs a first synchronized content to the first flat-panel-type display apparatus and the second flat-panel-type display apparatus during an idle state of the electronic apparatus, and the synchronized content includes the first synchronized content.

16. The system according to claim 15, wherein the communication unit is further configured to communicate with a proximity sensor, the control unit outputs a second synchronized content corresponding to an approach of a user detected by the proximity sensor to the first flat-panel-type display apparatus and the second flat-panel-type display apparatus during the idle state, and the synchronized content includes the second synchronized content.

* * * * *

UNITED STATES PATENT AND TRADEMARK OFFICE
CERTIFICATE OF CORRECTION

PATENT NO. : 10,685,624 B2  
APPLICATION NO. : 15/591285  
DATED : June 16, 2020  
INVENTOR(S) : Jong Won Park et al.

Page 1 of 1

It is certified that error appears in the above-identified patent and that said Letters Patent is hereby corrected as shown below:

In the Claims

Column 35, Line 14:
In Claim 7, delete "fist" and insert -- first --, therefor.

Column 35, Line 19:
In Claim 7, delete "flat-panel- type" and insert -- flat-panel-type --, therefor.

Column 35, Line 36:
In Claim 9, delete "among from" and insert -- from among --, therefor.

Column 35, Line 38:
In Claim 9, delete "among from" and insert -- from among --, therefor.

Signed and Sealed this
Eleventh Day of August, 2020

Andrei Iancu
*Director of the United States Patent and Trademark Office*